US012262351B2

(12) United States Patent
Dong et al.

(10) Patent No.: US 12,262,351 B2
(45) Date of Patent: Mar. 25, 2025

(54) RESOURCE SELECTION METHOD AND APPARATUS

(71) Applicant: Huawei Technologies Co., Ltd., Shenzhen (CN)

(72) Inventors: Lei Dong, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 17/738,367

(22) Filed: May 6, 2022

(65) Prior Publication Data

US 2022/0264539 A1    Aug. 18, 2022

Related U.S. Application Data

(63) Continuation of application No. PCT/CN2019/116648, filed on Nov. 8, 2019.

(51) Int. Cl.
*H04W 4/00* (2018.01)
*H04W 72/02* (2009.01)
(Continued)

(52) U.S. Cl.
CPC ....... *H04W 72/02* (2013.01); *H04W 72/0446* (2013.01); *H04W 72/0453* (2013.01); *H04W 72/54* (2023.01); *H04W 72/56* (2023.01)

(58) Field of Classification Search
CPC ............. H04W 72/02; H04W 72/0446; H04W 72/0453; H04W 72/54; H04W 72/56;
(Continued)

(56) References Cited

U.S. PATENT DOCUMENTS

| 10,383,147 B2 * | 8/2019 | Rajagopal ......... H04W 28/0284 |
| 10,764,902 B2 * | 9/2020 | Seo ..................... H04W 72/02 |

(Continued)

FOREIGN PATENT DOCUMENTS

| CA | 3036351 C * | 8/2022 | ........ H04W 72/0446 |
| GB | 2546548 A | 7/2017 | |

(Continued)

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.0.0, Sep. 2019, 49 pages.

(Continued)

*Primary Examiner* — Phuongchau Ba Nguyen
(74) *Attorney, Agent, or Firm* — Slater Matsil, LLP

(57) ABSTRACT

This application relates to a resource selection method and an apparatus. A first resource is selected for first data from candidate resources in a resource pool. At least one resource is selected for the first data from the candidate resources other than the first resource based on the first resource and a first gap. A quantity of candidate resources is greater than or equal to X % of a quantity of all resources in the resource pool, where a value of X may be set based on a target quantity of resources, based on a target quantity of resources and a first time gap, based on a target quantity of resources, a first time gap, and a first frequency gap, or based on a service priority. The value of X may be set based on different factors, to meet a resource selection requirement.

20 Claims, 19 Drawing Sheets

(51) Int. Cl.
*H04W 72/0446* (2023.01)
*H04W 72/0453* (2023.01)
*H04W 72/54* (2023.01)
*H04W 72/56* (2023.01)

(58) Field of Classification Search
CPC ... H04W 72/044; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 12,069,611 B2 * | 8/2024 | Lee | H04B 7/0404 |
| 2018/0098322 A1 * | 4/2018 | Yoon | H04W 56/0005 |
| 2018/0279259 A1 | 9/2018 | Gulati et al. | |
| 2018/0332564 A1 * | 11/2018 | Lee | H04L 67/12 |
| 2019/0132818 A1 | 5/2019 | Yasukawa et al. | |
| 2019/0306835 A1 * | 10/2019 | Hoang | H04W 72/53 |
| 2020/0068534 A1 * | 2/2020 | Li | H04W 72/02 |
| 2021/0045089 A1 | 2/2021 | Yu et al. | |
| 2022/0200766 A1 * | 6/2022 | Khoryaev | H04L 1/1816 |
| 2022/0377748 A1 * | 11/2022 | He | H04W 4/70 |
| 2024/0155574 A1 * | 5/2024 | Hui | H04W 72/0446 |

FOREIGN PATENT DOCUMENTS

| | | |
|---|---|---|
| RU | 2693848 C1 | 7/2019 |
| WO | 2018031519 A1 | 2/2018 |
| WO | 2018145067 A1 | 8/2018 |
| WO | 2018175822 A1 | 9/2018 |
| WO | 2018201390 A1 | 11/2018 |
| WO | 2018203654 A1 | 11/2018 |
| WO | 2018204136 A1 | 11/2018 |
| WO | 2019031926 A1 | 2/2019 |
| WO | 2019153298 A1 | 8/2019 |

OTHER PUBLICATIONS

"3rd Generation Partnership Project; Technical Specification Group Radio Access Network; NR; Multiplexing and channel coding (Release 15)," 3GPP TS 38.212 V15.7.0, 101 pages.

"3rd Generation Partnership Project; Technical Specification Group Radio Access Network; NR; Physical layer procedures for control (Release 15)," 3GPP TS 38.213 V15.7.0, Sep. 2019, 108 pages.

"3rd Generation Partnership Project; Technical Specification Group Radio Access Network; NR; Physical layer procedures for data (Release 15)," 3GPP TS 38.214 V15.7.0, Sep. 2019, 106 pages.

"3rd Generation Partnership Project; Technical Specification Group Radio Access Network; NR; Layer 2—Measurements (Release 16)," 3GPP TS 38.314 V0.0.2, Sep. 2019, 8 pages.

"3rd Generation Partnership Project; Technical Specification Group Radio Access Network; NR; Medium Access Control (MAC) protocol specification (Release 15)," 3GPP TS 38.321 V15.7.0, Sep. 2019, 78 pages.

"On Resource Allocation for NR V2X Mode 2," Agenda item: 7.2.4.2.2, Source: Samsung, Document for: Discussion and Decision, 3GPP TSG RAN WG1 #98bis, R1-1910471, Chongqing, China, Oct. 14-20, 2019, 7 pages.

"Discussion on Sidelink Resource Allocation in Mode 2 for NR V2X," Source: Panasonic, Agenda Item: 7.2.4.2.2, Document for: Discussion, Decision, 3GPP TSG RAN WG1 #98bis, R1-1910842, Chongqing, China, Oct. 14-20, 2019, 7 pages.

* cited by examiner

RESOURCE SELECTION METHOD AND APPARATUS

CROSS-REFERENCE TO RELATED APPLICATIONS

This application is a continuation of International Application No. PCT/CN2019/116648, filed on Nov. 8, 2019, the disclosure of which is hereby incorporated by reference in its entirety.

TECHNICAL FIELD

This application relates to the field of mobile communication technologies, and in particular, to a resource selection method and an apparatus.

BACKGROUND

In new radio (NR)-vehicle to everything (V2X), there are two transmission modes for sidelink-related resource allocation: a mode-1 of allocating a resource by a base station and a mode-2 of autonomously selecting a resource by a user. The mode-1 is mainly applied to V2X communication with network coverage, and the base station centrally performs resource allocation based on a buffer status report (BSR) reported by a terminal device.

The mode-2 may be applied to V2X communication without network coverage. Certainly, the mode-2 may also be applied when network coverage exists. In the mode-2, a transmit end terminal device autonomously selects a resource from a resource selection window based on a resource monitoring result to perform communication. For example, the transmit end terminal device may measure a candidate resource included in the resource selection window to obtain reference signal received power (RSRP). If the RSRP obtained through measurement is greater than a preset RSRP threshold $Th_{RSRP}$, the candidate resource needs to be excluded from the resource selection window; otherwise, the candidate resource may be selected. In a resource selection process, if a quantity of remaining candidate resources in the resource selection window is less than X % of a quantity of all candidate resources included in the resource selection window, the transmit end terminal device needs to increase the preset RSRP threshold $Th_{RSRP}$ by 3 dB, and then compare a measurement result with a new RSRP threshold $Th_{RSRP}$.

Currently, a value of X is fixed to 20, where 20 is a value used by X in long term evolution (LTE)-V2X. The LTE-V2X supports only blind retransmission maximally including two transmissions. Therefore, usually, only two resources need to be selected for one transmission. When a small quantity of resources are selected, X=20 can usually meet a requirement. However, in the NR-V2X, a plurality of retransmissions may be performed, and a large quantity of resources are selected. In this case, if X is fixed to 20, the preset RSRP threshold $Th_{RSRP}$ is adjusted only when the quantity of remaining candidate resources in the resource selection window is less than 20% of the quantity of all candidate resources included in the resource selection window. Moreover, even if the RSRP threshold $Th_{RSRP}$ is adjusted, a quantity of available resources is also limited. In other words, the value of X limits a quantity of available resources. This reduces resource selection efficiency.

SUMMARY

Embodiments of this application provide a resource selection method and an apparatus, to improve resource selection efficiency.

According to a first aspect, a first resource selection method is provided. The method includes: selecting a first resource for first data from candidate resources included in a resource pool, where the candidate resources include resources whose reference signal received power is less than or equal to a first threshold; and selecting at least one resource for the first data from a candidate resource other than the first resource in the candidate resources based on the first resource and a first gap, where the first gap includes a first time gap satisfied by two adjacent resources in the selected first resource and the selected at least one resource, and/or includes a first frequency gap satisfied by two adjacent resources in the selected first resource and the at least one resource, where a quantity of candidate resources is greater than or equal to X % of a quantity of all resources included in the resource pool, and a value of X meets the following condition:

the value of X is set based on a target quantity of resources;

the value of X is set based on a target quantity of resources and the first time gap;

the value of X is set based on a target quantity of resources, the first time gap, and the first frequency gap; or the value of X is set based on a service priority.

A total quantity of the first resource and the at least one resource is less than or equal to the target quantity of resources.

The method may be performed by a first communication apparatus. The first communication apparatus may be a communication device, or may be a communication apparatus, for example, a chip, that can support the communication device to implement a function required in the method. For example, the first communication apparatus is a first terminal apparatus. For example, the first terminal apparatus may be a terminal device, may be a chip that is disposed in the terminal device to implement a function of the terminal device, or may be another component configured to implement a function of the terminal device. In the following description process, an example in which the first communication apparatus is the first terminal apparatus is used.

In this embodiment of this application, the quantity of available candidate resources included in the resource pool is greater than or equal to X % of the quantity of all candidate resources included in the resource pool. The value of X may be set based on different factors, for example, may be set based on a quantity of resources that need to be selected, may be set based on a quantity of resources that need to be selected and the first time gap, may be set based on a quantity of resources that need to be selected, the first time gap, and the first frequency gap, or may be set based on the service priority. For example, when the quantity of resources that need to be selected is large, X may be set to a large value. Alternatively, when the service priority is high, X may be set to a large value. If the value of X is large, a large quantity of resources are available, and a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate. Moreover, in this embodiment of this application, the value of X is not fixed, but may be set based on different requirements, so that the resource selection process is more flexible.

In a possible implementation, the first data is sent to a second terminal apparatus on selected resources. The selected resources include, for example, the first resource and the at least one resource.

After the resources are selected, the first data may be sent on the selected resources. For example, the total quantity of the first resource and the at least one resource is greater than or equal to the target quantity of resources. In this case, the resource selection process is stopped, and the first data may be sent to the second terminal apparatus on the first resource and the at least one resource. Alternatively, the total quantity of the first resource and the at least one resource is less than the target quantity of resources, but a quantity of resource reselection times has been greater than or equal to a preset quantity of times. In this case, the resource selection process is stopped, and the first data may be sent to the second terminal apparatus on the first resource and the at least one resource. The preset quantity of times is, for example, specified in a protocol, configured by a network device, or determined by the first terminal apparatus.

In an optional implementation, the target quantity of resources is related to QoS of the first data and/or configuration information of the resource pool.

In other words, the target quantity of resources may be related to QoS of a service to which the first data belongs. For example, if the QoS of the first data is high, a large target quantity of resources may be set, and transmission reliability may be improved by performing a plurality of transmissions. Alternatively, if the QoS of the first data is low, a small target quantity of resources may be set. In this way, transmission overheads can be reduced, and resources can be saved. Alternatively, the target quantity of resources may be related to the configuration information of the resource pool. For example, the configuration information of the resource pool may indicate a maximum quantity of resources to be selected once from the resource pool, and the target quantity of resources is also, for example, a quantity of resources to be selected once. In this case, the target quantity of resources may be less than or equal to the maximum quantity of resources that is indicated by the configuration information of the resource pool.

In an optional implementation, that the value of X is set based on a quantity of resources that need to be selected includes: a larger target quantity of resources indicates a larger value of X.

A larger target quantity of resources (in other words, a larger target quantity of resources) indicates a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, the resource selection requirement can be met as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate.

In an optional implementation, that the value of X is set based on a target quantity of resources and the first time gap includes: when the target quantity of resources is fixed, a smaller first time gap indicates a larger value of X.

When the target quantity of resources is fixed, a smaller first time gap may indicate a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, the resource selection requirement can be met as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate.

In an optional implementation, that the value of X is set based on a target quantity of resources, the first time gap, and the first frequency gap includes: when the target quantity of resources and the first time gap are fixed, a smaller first frequency gap indicates a larger value of X.

When the target quantity of resources and the first time gap are fixed, a smaller first frequency gap may indicate a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, the resource selection requirement can be met as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate.

In an optional implementation, that the value of X is set based on a service priority includes: a higher service priority indicates a larger value of X.

A higher service priority indicates that a resource selection success rate needs to be ensured as much as possible. In this case, the value of X may be increased, so that the quantity of candidate resources is large. A larger quantity of candidate resources indicates a larger selection range, and therefore indicates a higher probability that a resource can be selected. In this manner, the resource selection requirement can be met as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate.

In an optional implementation, the method further includes: determining that there is no available candidate resource other than the first resource and a third resource in the candidate resources, and that a total quantity of the first resource and the third resource is less than the target quantity of resources, where the third resource includes a selected resource other than the first resource in the candidate resources; selecting a second resource from the candidate resources; and selecting one or more resources for the first data from a candidate resource other than the second resource in the candidate resources based on the second resource and the first gap.

In this embodiment of this application, if the total quantity of the first resource and the at least one resource is greater than or equal to the target quantity of resources, the first terminal apparatus may stop the resource selection process, and send the first data on the selected resources. Alternatively, if the total quantity of the first resource and the at least one resource is less than the target quantity of resources, and a candidate resource that meets a selection condition exists in a remaining candidate resource (the selection condition may be understood as the first gap), the first terminal apparatus may continue to perform selection. Alternatively, if the total quantity of the first resource and the at least one resource is less than the target quantity of resources, but no candidate resource that meets a selection condition exists in a remaining candidate resource, the first terminal apparatus may stop the resource selection process. Although a quantity of selected resources is less than the target quantity of resources, the first terminal apparatus still sends the first data on the selected resources. Alternatively, in this case, the first terminal apparatus may perform reselection. A quantity of selected resources may be greater than or equal to the target quantity of resources as much as possible through resource selection, to meet a transmission requirement of the first data, and improve the resource selection success rate.

In a possible implementation, the first data is sent to the second terminal apparatus on selected resources. The selected resources include, for example, the second resource and the one or more resources.

After the resources are selected, the first data may be sent on the selected resources. For example, a total quantity of the second resource and the one or more resources is greater than or equal to the target quantity of resources. In this case, the resource selection process is stopped, and the first data may be sent to the second terminal apparatus on the second resource and the one or more resources. Alternatively, a total quantity of the second resource and the one or more resources is less than the target quantity of resources, but a quantity of resource reselection times has been greater than or equal to a preset quantity of times. In this case, the resource selection process is stopped, and the first data may be sent to the second terminal apparatus on the second resource and the one or more resources. The preset quantity of times is, for example, specified in a protocol, configured by the network device, or determined by the first terminal apparatus.

In an optional implementation, the selecting at least one resource from a candidate resource other than the first resource in the candidate resources based on the first resource and a first gap includes:

moving a time domain position of the first resource as a reference time domain position forward and/or backward in time domain for the first time gap, and using a candidate resource corresponding to a time domain position obtained through movement as a part or all of the at least one resource, where the first gap includes the first time gap;

moving a frequency domain position of the first resource as a reference frequency domain position upward and/or downward in frequency domain for the first frequency gap, and using a candidate resource corresponding to a frequency domain position obtained through movement as a part or all of the at least one resource, where the first gap includes the first frequency gap; or moving a time domain position of the first resource as a reference time domain position forward and/or backward in time domain for the first time gap, moving a frequency domain position of the first resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

This selection manner may enable a gap between two adjacent resources in the selected resources to be equal to the first gap, so that the selected resources can meet the selection condition.

In an optional implementation, the selecting at least one resource from a candidate resource other than the first resource in the candidate resources based on the first resource and a first gap includes:

moving a time domain position of the first resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;

moving a frequency domain position of the first resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or moving a time domain position of the first resource as a reference time domain position forward and/or backward in time domain for the first time gap, moving a frequency domain position of the first resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

In this selection manner, a requirement on a gap between the selected resources is low. For example, a time gap between adjacent resources does not need to be strictly the first time gap, but only needs to be greater than or equal to the first time gap. Alternatively, a frequency gap between adjacent resources does not need to be strictly the first frequency gap, but only needs to be greater than or equal to the first frequency gap. In this way, the selection condition is more relaxed, more facilitates resource selection, and helps improve the resource selection success rate.

According to a second aspect, a second resource selection method is provided. The method includes: selecting a first resource for first data from a first candidate resource included in a first resource pool, where the first candidate resource includes a resource whose reference signal received power is less than or equal to a first threshold; determining, based on the first resource and a first gap, that there is no available candidate resource in a candidate resource other than the first resource and a third resource in the first candidate resource, and that a total quantity of the first resource and the third resource is less than a target quantity of resources, where the third resource includes a selected resource other than the first resource in the candidate resource, and the first gap includes a first time gap satisfied by two adjacent resources in the selected first resource and the selected third resource, and/or includes a first frequency gap satisfied by two adjacent resources in the selected first resource and the selected third resource; replacing the first resource pool with a second resource pool; and selecting, based on a second resource in the second resource pool and the first gap, at least one resource from a candidate resource other than the second resource in a second candidate resource included in the second resource pool, where the second candidate resource includes a resource whose reference signal received power is less than or equal to the first threshold.

The method may be performed by a second communication apparatus. The second communication apparatus may be a communication device, or may be a communication apparatus, for example, a chip, that can support the communication device to implement a function required in the method. For example, the second communication apparatus is a first terminal apparatus. For example, the first terminal apparatus may be a terminal device, may be a chip that is disposed in the terminal device to implement a function of the terminal device, or may be another component configured to implement a function of the terminal device. In the following description process, an example in which the second communication apparatus is the first terminal apparatus is used.

In a resource selection process provided in this embodiment of this application, if a quantity of selected resources is less than the target quantity of resources, and no candidate resource that meets a selection condition is available, reselection may be performed. For example, a new candidate resource may be introduced by moving a resource pool, so that sufficient resources can be selected as much as possible, to improve a resource selection success rate. In addition, an overall resource allocation procedure and design in a mode-2 in NR-V2X are further improved in this embodiment of this application.

In a possible implementation, the first data is sent to a second terminal apparatus on selected resources. The selected resources include, for example, the second resource and the at least one resource.

After the resources are selected, the first data may be sent on the selected resources. For example, a total quantity of the second resource and the at least one resource is greater than or equal to the target quantity of resources. In this case, the resource selection process is stopped, and the first data may be sent to the second terminal apparatus on the second resource and the at least one resource. Alternatively, a total quantity of the second resource and the at least one resource is less than the target quantity of resources, but a quantity of resource reselection times has been greater than or equal to a preset quantity of times. In this case, the resource selection process is stopped, and the first data may be sent to the second terminal apparatus on the second resource and the at least one resource. The preset quantity of times is, for example, specified in a protocol, configured by a network device, or determined by the first terminal apparatus.

In an optional implementation, the target quantity of resources is related to QoS of the first data and/or configuration information of the first resource pool.

In other words, the target quantity of resources may be related to QoS of a service to which the first data belongs.

For example, if the QoS of the first data is high, a large target quantity of resources may be set, and transmission reliability may be improved by performing a plurality of transmissions. Alternatively, if the QoS of the first data is low, a small target quantity of resources may be set. In this way, transmission overheads can be reduced, and resources can be saved. Alternatively, the target quantity of resources may be related to configuration information of a resource pool (for example, related to the configuration information of the first resource pool). For example, the configuration information of the resource pool may indicate a maximum quantity of resources to be selected once from the first resource pool, and the target quantity of resources is also, for example, a quantity of resources to be selected once. In this case, the target quantity of resources may be less than or equal to the maximum quantity of resources that is indicated by the configuration information of the first resource pool.

In an optional implementation, the second resource and the first resource are a same resource; or the method further includes: selecting the second resource from the candidate resource included in the second resource pool.

The second resource and the first resource may be the same resource. This manner is applicable to a case in which the first resource exists in the second resource pool. That is, if the first resource exists in the second resource pool, the first terminal apparatus may not need to reselect the first resource, but continues to select a subsequent resource with reference to the first resource, thereby reducing a resource selection step. Alternatively, the second resource and the first resource may be different resources. For example, the first resource does not exist in the second resource pool. In this case, the first terminal apparatus may reselect a resource from the second resource pool. Alternatively, even if the first resource exists in the second resource pool, the first terminal apparatus may still reselect a resource from the second resource pool. Resource reselection helps improve a success rate of final resource selection.

In an optional implementation, the replacing the first resource pool with a second resource pool includes: moving a time domain end position of the first resource pool backward in time domain for first duration, to obtain the second resource pool; or moving a time domain start position of the first resource pool backward in time domain for second duration, and moving a time domain end position of the first resource pool backward in time domain for third duration, to obtain the second resource pool.

For example, the first terminal apparatus may move the time domain end position of the first resource pool backward in time domain for the first duration, to obtain the second resource pool. For example, the time domain start position of the first resource pool is T1, and the time domain end position of the first resource pool is T2. The first terminal apparatus may move the time domain end position of the first resource pool backward from T2 for the first duration to T3, to obtain the second resource pool, where a time domain start position of the second resource pool is T1, and a time domain end position of the second resource pool is T3. In other words, in this manner, the first resource pool is extended, so that an extended first resource pool (namely, the second resource pool) includes more candidate resources. This manner is equivalent to sliding a time domain position of the resource pool to increase candidate resources, to increase a minimum range that corresponds to X and that is for final and actual resource selection. Therefore, this manner may also be considered as a manner of implicitly configuring a value of X.

For another example, the first terminal apparatus may move the time domain start position of the first resource pool backward in time domain for the second duration, and move the time domain end position of the first resource pool backward in time domain for the third duration, to obtain the second resource pool. For example, the time domain start position of the first resource pool is T1, and the time domain end position of the first resource pool is T2. The first terminal apparatus may move the time domain start position of the first resource pool backward from T1 for the second duration to T4, and may move the time domain end position of the first resource pool backward from T2 for the third duration to T5, to obtain the second resource pool, where a time domain start position of the second resource pool is T4, and a time domain end position of the second resource pool is T5. In this manner, the first resource pool and the second resource pool may have an intersection, or may not have an intersection, and a time domain length of the first resource pool may be equal to or not equal to a time domain length of the second resource pool. This manner of replacing the resource pool is more flexible. In addition, a new candidate resource is introduced, or original candidate resources may be even completely replaced, so that the resource selection success rate can be improved.

In an optional implementation, the selecting, based on a second resource and the first gap, at least one resource from a candidate resource other than the second resource in a second candidate resource included in the second resource pool includes:

moving a time domain position of the second resource as a reference time domain position forward and/or backward in time domain for the first time gap, and using a candidate resource corresponding to a time domain position obtained through movement as a part or all of the at least one resource, where the first gap includes the first time gap;

moving a frequency domain position of the second resource as a reference frequency domain position upward and/or downward in frequency domain for the first frequency gap, and using a candidate resource corresponding to a frequency domain position obtained through movement as a part or all of the at least one resource, where the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

This selection manner may enable a gap between two adjacent resources in the selected resources to be equal to the first gap, so that the selected resources can meet the selection condition.

In an optional implementation, the selecting, based on a second resource and the first gap, at least one resource from a candidate resource other than the second resource in a second candidate resource included in the second resource pool includes:

moving a time domain position of the second resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;

moving a frequency domain position of the second resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

In this selection manner, a requirement on a gap between the selected resources is low. For example, a time gap between adjacent resources does not need to be strictly the first time gap, but only needs to be greater than or equal to the first time gap. Alternatively, a frequency gap between adjacent resources does not need to be strictly the first frequency gap, but only needs to be greater than or equal to the first frequency gap. In this way, the selection condition is more relaxed, more facilitates resource selection, and helps improve the resource selection success rate.

According to a third aspect, a communication apparatus is provided. For example, the communication apparatus is the first communication apparatus described above. The first communication apparatus is configured to perform the method according to any one of the first aspect or the possible implementations. Specifically, the first communication apparatus may include a module configured to perform the method according to any one of the first aspect or the possible implementations, for example, include a processing module and a transceiver module. For example, the transceiver module may include a sending module and a receiving module. The sending module and the receiving module may be different functional modules, or may be a same functional module but can implement different functions. For example, the first communication apparatus is a first terminal apparatus. For example, the first terminal apparatus is a communication device, or is a chip or another component disposed in the communication device. For example, the communication device is a terminal device. The following uses an example in which the first communication apparatus is the first terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. Optionally, the first communication apparatus may further include a storage module. For example, the storage module may be implemented by using a memory. The memory may be configured to store computer instructions. The processor may invoke and execute the computer instructions, to implement the method according to any one of the first aspect or the possible implementations. The memory may be a part of the first communication apparatus. Alternatively, the first communication apparatus may not include a memory, the memory is located outside the first communication apparatus, and the processor may invoke computer instructions stored in the external memory. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component. In a description process of the third aspect, an example in which the first communication apparatus is the first terminal apparatus and includes the processing module and the transceiver module continues to be used for description.

The processing module is configured to select a first resource for first data from candidate resources included in a resource pool, where the candidate resources include resources whose reference signal received power is less than or equal to a first threshold.

The processing module is further configured to select at least one resource for the first data from a candidate resource other than the first resource in the candidate resources based on the first resource and a first gap, where the first gap includes a first time gap satisfied by two adjacent resources in the selected first resource and the selected at least one resource, and/or includes a first frequency gap satisfied by two adjacent resources in the selected first resource and the selected at least one resource.

A quantity of candidate resources is greater than or equal to X % of a quantity of all resources included in the resource pool, and a value of X meets the following condition:
  the value of X is set based on a target quantity of resources;
  the value of X is set based on a target quantity of resources and the first time gap;
  the value of X is set based on a target quantity of resources, the first time gap, and the first frequency gap; or
  the value of X is set based on a service priority.

A total quantity of the first resource and the at least one resource is less than or equal to the target quantity of resources.

In a possible implementation, the transceiver module is configured to send the first data to a second terminal apparatus on selected resources. The selected resources include, for example, the first resource and the at least one resource.

In an optional implementation, the target quantity of resources is related to QoS of the first data and/or configuration information of the resource pool.

In a possible implementation, that the value of X is set based on a quantity of resources that need to be selected includes: a larger target quantity of resources indicates a larger value of X.

In a possible implementation, that the value of X is set based on a target quantity of resources and the first time gap includes: when the target quantity of resources is fixed, a smaller first time gap indicates a larger value of X.

In a possible implementation, that the value of X is set based on a target quantity of resources, the first time gap, and the first frequency gap includes: when the target quantity of resources and the first time gap are fixed, a smaller first frequency gap indicates a larger value of X.

In a possible implementation, that the value of X is set based on a service priority includes: a higher service priority indicates a larger value of X.

In a possible implementation, the processing module is further configured to: determine that there is no available candidate resource other than the first resource and a third resource in the candidate resources, and that a total quantity of the first resource and the third resource is less than the target quantity of resources, where the third resource includes a selected resource other than the first resource in the candidate resources; select a second resource from the candidate resources; and select one or more resources for the first data from a candidate resource other than the second resource in the candidate resources based on the second resource and the first gap.

In a possible implementation, the transceiver module is further configured to send the first data to the second terminal apparatus on selected resources. The selected resources include, for example, the second resource and the one or more resources.

In a possible implementation, the processing module is configured to select the at least one resource from the candidate resource other than the first resource in the candidate resources in the following manner based on the first resource and the first gap:
  moving a time domain position of the first resource as a reference time domain position forward and/or backward in time domain for the first time gap, and using a candidate resource corresponding to a time domain position obtained through movement as a part or all of the at least one resource, where the first gap includes the first time gap;
  moving a frequency domain position of the first resource as a reference frequency domain position upward and/or downward in frequency domain for the first frequency gap, and using a candidate resource corresponding to a frequency domain position obtained through movement as a part or all of the at least one resource, where the first gap includes the first frequency gap; or
  moving a time domain position of the first resource as a reference time domain position forward and/or backward in time domain for the first time gap, moving a frequency domain position of the first resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

In a possible implementation, the processing module is configured to select the at least one resource from the candidate resource other than the first resource in the candidate resources in the following manner based on the first resource and the first gap:

moving a time domain position of the first resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;

moving a frequency domain position of the first resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or moving a time domain position of the first resource as a reference time domain position forward and/or backward in time domain for the first time gap, moving a frequency domain position of the first resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

For technical effects achieved in the third aspect or the possible implementations, refer to the description of the technical effects achieved in the first aspect or the corresponding implementations.

According to a fourth aspect, a communication apparatus is provided. For example, the communication apparatus is the second communication apparatus described above. The second communication apparatus is configured to perform the method according to any one of the second aspect or the possible implementations. Specifically, the second communication apparatus may include a module configured to perform the method according to any one of the second aspect or the possible implementations, for example, include a processing module and a transceiver module. For example, the transceiver module may include a sending module and a receiving module. The sending module and the receiving module may be different functional modules, or may be a same functional module but can implement different functions. For example, the second communication apparatus is a first terminal apparatus. For example, the first terminal apparatus is a communication device, or is a chip or another component disposed in the communication device. For example, the communication device is a terminal device. The following uses an example in which the second communication apparatus is the first terminal apparatus. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. Optionally, the second communication apparatus may further include a storage module. For example, the storage module may be implemented by using a memory. The memory may be configured to store computer instructions. The processor may invoke and execute the computer instructions, to implement the method according to any one of the second aspect or the possible implementations. The memory may be a part of the second communication apparatus. Alternatively, the second communication apparatus may not include a memory, the memory is located outside the second communication apparatus, and the processor may invoke computer instructions stored in the external memory. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component. In a description process of the fourth aspect, an example in which the second communication apparatus is the first terminal apparatus and includes the processing module and the transceiver module continues to be used for description.

The processing module is configured to select a first resource for first data from a first candidate resource included in a first resource pool, where the first candidate resource includes a resource whose reference signal received power is less than or equal to a first threshold.

The processing module is further configured to determine, based on the first resource and a first gap, that there is no available candidate resource in a resource other than the first resource and a third resource in the first candidate resource, and that a total quantity of the first resource and the third resource is less than a target quantity of resources, where the third resource includes a selected resource other than the first resource in the candidate resource, and the first gap includes a first time gap satisfied by two adjacent resources in the selected first resource and the selected third resource, and/or includes a first frequency gap satisfied by two adjacent resources in the selected first resource and the selected third resource.

The processing module is further configured to replace the first resource pool with a second resource pool.

The processing module is further configured to select, based on a second resource in the second resource pool and the first gap, at least one resource from a candidate resource other than the second resource in a second candidate resource included in the second resource pool, where the second candidate resource includes a resource whose reference signal received power is less than or equal to the first threshold.

In a possible implementation, the transceiver module is further configured to send the first data to a second terminal apparatus on selected resources. The selected resources include, for example, the second resource and the at least one resource.

In an optional implementation, the target quantity of resources is related to QoS of the first data and/or configuration information of the first resource pool.

In a possible implementation, the second resource and the first resource are a same resource; or the processing module is further configured to select the second resource from the candidate resource included in the second resource pool.

In a possible implementation, the processing module is configured to replace the first resource pool with the second resource pool in the following manner: moving a time domain end position of the first resource pool backward in time domain for first duration, to obtain the second resource pool; or moving a time domain start position of the first resource pool backward in time domain for second duration, and moving a time domain end position of the first resource pool backward in time domain for third duration, to obtain the second resource pool.

In a possible implementation, the processing module is configured to select, in the following manner based on the second resource and the first gap, the at least one resource from the candidate resource other than the second resource in the second candidate resource included in the second resource pool:

moving a time domain position of the second resource as a reference time domain position forward and/or backward in time domain for the first time gap, and using a candidate resource corresponding to a time domain position obtained through movement as a part or all of the at least one resource, where the first gap includes the first time gap;

moving a frequency domain position of the second resource as a reference frequency domain position upward and/or downward in frequency domain for the first frequency gap, and using a candidate resource corresponding to a frequency domain position obtained through movement as a part or all of the at least one resource, where the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

In a possible implementation, the processing module is configured to select, in the following manner based on the second resource and the first gap, the at least one resource from the candidate resource other than the second resource in the second candidate resource included in the second resource pool:

moving a time domain position of the second resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;

moving a frequency domain position of the second resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

For technical effects achieved in the fourth aspect or the possible implementations, refer to the description of the technical effects achieved in the second aspect or the corresponding implementations.

According to a fifth aspect, a communication apparatus is provided. For example, the communication apparatus is the first communication apparatus described above. The communication apparatus includes one or more processors. Optionally, the communication apparatus may further include a memory, configured to store computer instructions. The one or more processors are coupled to the memory, to implement the method according to any one of the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to any one of the first aspect or the possible implementations. For example, when the processor executes the computer instructions stored in the memory, the first communication apparatus is enabled to perform the method according to any one of the first aspect or the possible implementations. For example, the first communication apparatus is a first terminal apparatus. For example, the first terminal apparatus is a communication device, or is a chip or another component disposed in the communication device. For example, the communication device is a terminal device.

If the first communication apparatus is the communication device, the communication interface is implemented by using, for example, a transceiver (or a transmitter and a receiver) in the communication device. For example, the transceiver is implemented by using an antenna, a feeder, and a codec in the communication device. Alternatively, if the first communication apparatus is the chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to a sixth aspect, a communication apparatus is provided. For example, the communication apparatus is the second communication apparatus described above. The communication apparatus includes one or more processors. Optionally, the communication apparatus may further include a memory, configured to store computer instructions. The one or more processors are coupled to the memory, to implement the method according to any one of the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to any one of the second aspect or the possible implementations. For example, when the processor executes the computer instructions stored in the memory, the second communication apparatus is enabled to perform the method according to any one of the second aspect or the possible implementations. For example, the second communication apparatus is a first terminal apparatus. For example, the first terminal apparatus is a communication device, or is a chip or another component disposed in the communication device. For example, the communication device is a terminal device.

If the second communication apparatus is the communication device, the communication interface is implemented by using, for example, a transceiver (or a transmitter and a receiver) in the communication device. For example, the transceiver is implemented by using an antenna, a feeder, and a codec in the communication device. Alternatively, if the second communication apparatus is the chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to a seventh aspect, a communication system is provided. The communication system includes the communication apparatus according to the third aspect or the communication apparatus according to the fifth aspect.

According to an eighth aspect, a communication system is provided. The communication system includes the communication apparatus according to the fourth aspect or the communication apparatus according to the sixth aspect.

According to a ninth aspect, a computer-readable storage medium or a nonvolatile storage medium is provided. The computer-readable storage medium or the nonvolatile storage medium is configured to store computer instructions or a program. When the computer instructions or the program are/is run on a computer, the computer is enabled to perform the method according to any one of the first aspect or the possible implementations.

According to a tenth aspect, a computer-readable storage medium or a nonvolatile storage medium is provided. The computer-readable storage medium or the nonvolatile storage medium is configured to store computer instructions or a program. When the computer instructions or the program are/is run on a computer, the computer is enabled to perform the method according to any one of the second aspect or the possible implementations.

According to an eleventh aspect, a computer program product including instructions is provided. The computer program product is configured to store computer instructions. When the computer instructions are run on a computer, the computer is enabled to perform the method according to any one of the first aspect or the possible implementations.

According to a twelfth aspect, a computer program product including instructions is provided. The computer program product is configured to store computer instructions. When the computer instructions are run on a computer, the computer is enabled to perform the method according to any one of the second aspect or the possible implementations.

In embodiments of this application, the value of X may be set based on different factors, to meet the resource selection requirement as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate. Moreover, in embodiments of this application, the value of X is not fixed, but may be set based on different requirements, so that the resource selection process is more flexible.

DETAILED DESCRIPTION OF ILLUSTRATIVE EMBODIMENTS

Figure 1:
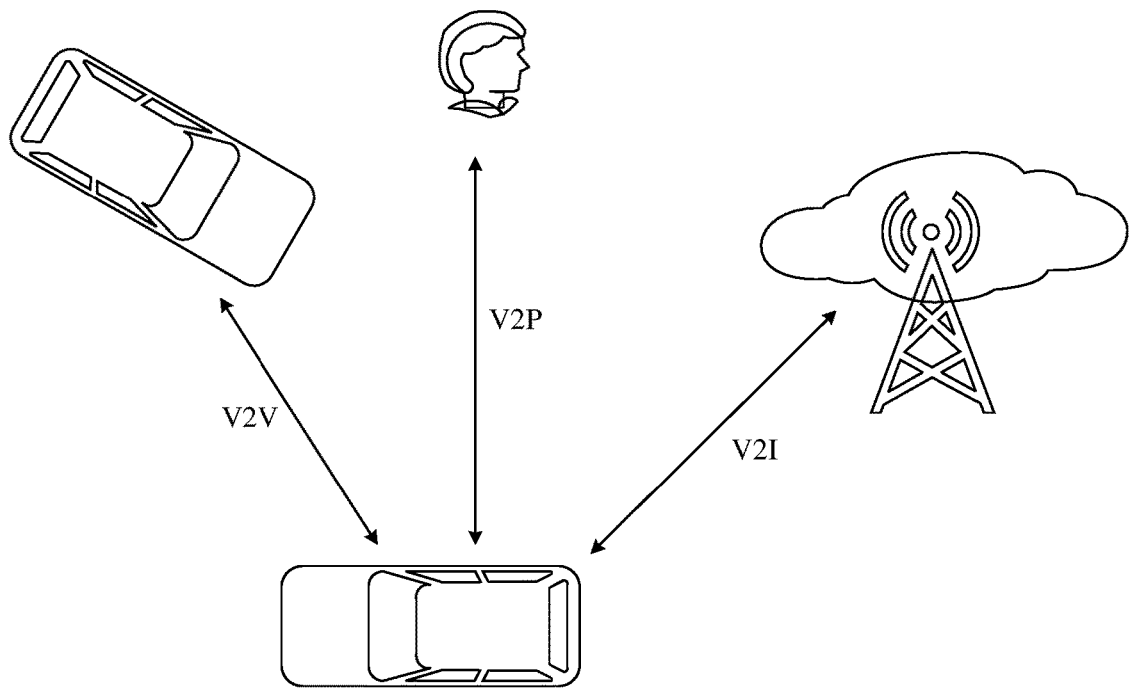
FIG. 1 is a schematic diagram of several types of V2X.

To make objectives, technical solutions, and advantages of embodiments of this application clearer, the following further describes embodiments of this application in detail with reference to accompanying drawings.

In the following description, some terms in embodiments of this application are explained and described, to help a person skilled in the art have a better understanding.

(1) A terminal device includes a device that provides a voice and/or data connectivity for a user. Specifically, the terminal device includes a device that provides the voice for the user, includes the device that provides the data connectivity for the user, or includes a device that provides the voice and the data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an Internet of Things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively operate with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be all considered as vehicle-mounted terminal devices. For example, the vehicle-mounted terminal devices are also referred to as on-board units (OBU).

In embodiments of this application, the terminal device may further include a relay. Alternatively, it may be understood that any device that can perform data communication with a base station may be considered as the terminal device.

In embodiments of this application, an apparatus for implementing functions of the terminal device may be a terminal device, or may be an apparatus, for example, a chip system, that can support the terminal device to implement the functions. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the apparatus for implementing the functions of the terminal is the terminal device.

(2) A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to perform conversion between a received over-the-air frame and an Internet Protocol (IP) packet, and serve as a router between the terminal device and other parts of the access network, where the other parts of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in an LTE system or a long term evolution-advanced (LTE-A) system, may include a next generation NodeB (next generation nodeB, gNB) in a 5th generation mobile communication technology (5th generation, 5G) NR system (also referred to as an NR system for short), or may include a centralized unit (CU) and a distributed unit (DU) in a cloud access network (cloud radio access network, Cloud RAN) system. This is not limited in embodiments of this application.

The network device may further include a core network device, and the core network device includes, for example, an access and mobility management function (AMF). Embodiments of this application mainly relate to the access network. Therefore, the network device below is the access network device unless otherwise specified.

In embodiments of this application, an apparatus for implementing functions of the network device may be a network device, or may be an apparatus, for example, a chip system, that can support the network device to implement the functions. The apparatus may be mounted in the network device. In the technical solutions provided in embodiments of this application, the technical solutions provided in embodiments of this application are described by using an example in which the apparatus for implementing the functions of the network device is the network device.

(3) V2X refers to interconnection between a vehicle and the outside, and is a basic and key technology of future intelligent vehicles, autonomous driving, and intelligent transportation systems. In the V2X, a specific application requirement of the V2X is to be optimized based on an existing device-to-device (D2D) technology, to further reduce an access latency of a V2X device and resolve a resource conflict problem.

The V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction, as shown in FIG. 1. V2V refers to communication between vehicles. V2P refers to communication between a vehicle and a person (including a pedestrian, a bicycle rider, a driver, or a passenger). V2I refers to communication between a vehicle and a network device, for example, an RSU. In addition, V2N may be included in the V2I. The V2N refers to communication between a vehicle and a base station/network.

The V2P may be used for safety warning for a pedestrian or a non-motor vehicle on a road. A vehicle may communicate, through the V2I, with a road or even other infrastructure such as a traffic light or a roadblock, to obtain road management information such as a traffic light signal time sequence. The V2V may be used for information exchange and reminding between vehicles, and most typically, is applied to a safety system for preventing collision between vehicles. Currently, the V2N is an Internet-of-Vehicles form that is most widely used. A main function of the V2N is to connect a vehicle to a cloud server through a mobile network, to use application functions such as navigation, entertainment, or anti-theft that are provided by the cloud server.

In the V2X, communication is mainly performed between terminal devices. For transmission modes between terminal devices, a current standard protocol supports a broadcast mode, a multicast mode, and a unicast mode.

Broadcast mode: The broadcast mode means that a terminal device serving as a transmit end sends data in a broadcast mode, and a plurality of terminal devices can receive sidelink control information (SCI) or a sidelink shared channel (SSCH) from the transmit end.

On a sidelink, a manner of ensuring that all the terminal devices parse the control information from the transmit end is: The transmit end does not scramble the control information, or scrambles the control information by using a scrambling code known to all the terminal devices.

Multicast mode: The multicast mode is similar to the broadcast mode. A terminal device serving as a transmit end sends data in a broadcast mode. A group of terminal devices can parse SCI or an SSCH.

Unicast mode: In the unicast mode, a terminal device sends data to another terminal device, and the another terminal device does not need to or cannot parse the data.

(4) Terms "system" and "network" in embodiments of this application may be used interchangeably. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural.

Unless otherwise stated on the contrary, ordinal terms such as "first" and "second" mentioned in embodiments of this application are used to distinguish between a plurality of objects, and are not intended to limit sizes, content, a sequence, a time sequence, priorities, importance degrees, or the like of the plurality of objects. For example, a first resource and a second resource are merely used to distinguish between different resources, but do not indicate a difference in priorities, importance degrees, or the like of the two resources.

The foregoing describes some noun concepts in embodiments of this application. The following describes technical features in embodiments of this application.

With development of wireless communication technologies, people have increasing demands for a high data rate and user experience, and have increasing demands for a proximity service for knowing people or things around and communicating with them. Therefore, a D2D technology emerges. Application of the D2D technology can lighten load of a cellular network, reduce battery power consumption of user equipment, improve a data rate, and better meet the demands for the proximity service. The D2D technology allows a plurality of UEs that support a D2D function to perform direct discovery and direct communication regardless of whether there is network infrastructure. In view of features and advantages of the D2D technology, a D2D technology-based Internet-of-Vehicles application scenario is proposed. However, considering security, a latency requirement is quite high in this scenario, and cannot be met by using the existing D2D technology.

Therefore, a V2X Internet-of-Vehicles technology is proposed in a network that uses an LTE technology and that is proposed by the 3rd generation partnership project (3GPP). V2X communication is communication between a vehicle and anything outside, and includes V2V communication, V2P communication, V2I communication, and V2N communication. Refer to FIG. 1.

The V2X communication is intended for high-speed devices represented by vehicles, and is a basic and key technology to be used in future scenarios that have a quite high communication latency requirement, such as scenarios of intelligent vehicles, autonomous driving, and intelligent transportation systems. LTE-V2X communication may support a communication scenario with network coverage and a communication scenario without network coverage, and a resource allocation manner in the LTE V2X communication may be a network access device scheduling mode, for example, an evolved universal terrestrial radio access network NodeB (E-UTRAN NodeB, eNB) scheduling mode, and a UE autonomous-selection mode. Based on a V2X technology, vehicle user equipment (vehicle UE, V-UE) may send some information of the V-UE, for example, a location, a speed, or an intention (turning, paralleling, or reversing), to other V-UE around in a periodic or aperiodic triggering manner. Similarly, the V-UE receives information from surrounding users in real time.

With development of 5G NR technologies in the 3GPP standards organization, 5G NR-V2X further develops. For example, the 5G NR-V2X can support a lower transmission latency, more reliable communication transmission, a higher throughput, and better user experience, to meet wider application scenario requirements.

In the NR-V2X, there are mainly two modes for sidelink-related resource allocation: a mode of allocating a resource by a base station (mode-1) and a mode of autonomously selecting a resource by a user (mode-2). The mode-1 is mainly applied to V2X communication with network coverage. The base station centrally performs resource allocation based on a BSR reporting status of a terminal device. In the mode-1, a resource may be allocated in a dynamic mode or a preconfiguration mode. The resource allocated by the base station includes an initial resource or a retransmission resource, or includes an initial resource and a retransmission resource.

Figure 2:
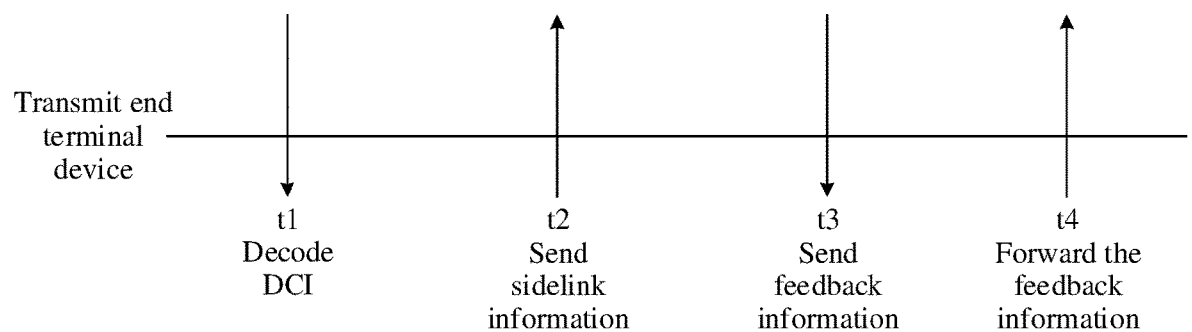
FIG. 2 is a schematic diagram of a dynamic mode in a mode of allocation by a base station, namely, a mode-1.

In the dynamic mode of the mode-1, the base station allocates a resource to a transmit end terminal device by using downlink control information (DCI). After receiving the DCI, the transmit end terminal device sends data to a receive end terminal device on the resource. After decoding the data from the transmit end terminal device, the receive end terminal device sends feedback information corresponding to the data to the transmit end terminal device. For example, the feedback information is a positive acknowledgment (ACK) or a negative acknowledgment (NACK). Then, the transmit end terminal device forwards the feedback information to the base station. For this process, refer to FIG. 2. In FIG. 2, at a moment t1, the transmit end terminal device receives the DCI from the base station, and decodes the DCI. The transmit end terminal device sends a physical sidelink shared channel (PSSCH) or a physical sidelink control channel (PSCCH) to the receive end terminal device at a moment t2. The receive end terminal device sends hybrid automatic repeat request (HARQ) information (namely, the feedback information) corresponding to the PSSCH or the PSCCH to the transmit end terminal device at a moment t3. The transmit end terminal device forwards the HARQ information to the base station at a moment t4.

In the preconfiguration mode of the mode-1, the base station configures, by using higher layer signaling, a related time-frequency resource used for sending on the sidelink. A transmit end terminal device may directly send sidelink data on the resource configured by using the higher layer signaling (type-1). Alternatively, the base station sends DCI to activate the configured resource. After receiving the DCI, a transmit end terminal device may send sidelink data on the resource configured by using the higher layer signaling (type-2). After receiving the sidelink data from the transmit end terminal device, a receive end terminal device decodes the sidelink data, and then sends HARQ information (namely, feedback information) for the sidelink data to the transmit end terminal device. Then, the transmit end terminal device forwards, to the base station, the HARQ information from the receive end terminal device.

In the mode-2, a transmission resource for a transmit end terminal device does not rely on a base station. This mode is not limited by network coverage, and the transmit end terminal device may perform communication in this mode regardless of whether there is network coverage. The resource autonomously selected by the user includes an initial resource or a retransmission resource, or includes an initial resource and a retransmission resource.

In the mode-2, the transmit end terminal device autonomously selects a resource from a resource selection window based on a resource monitoring result to send data. It is assumed that the transmit end terminal device triggers resource selection in a slot n, a resource monitoring window may be defined as T slots followed by the slot in which the resource selection is triggered, and the resource selection window is slots corresponding to [n+Q1, n+Q2] following the slot in which the resource selection is triggered. The resource selection window includes a plurality of slots. For one slot, a maximum quantity of sub-channels included in a frequency domain resource corresponding to the slot is $N_{subCH}$, and a sub-channel set corresponding to the sub-channels included in the frequency domain resource corresponding to the slot is $S = \{S_0, S_1, \ldots, S_{N_{subCH}-1}\}$. A set that includes all resources corresponding to each slot in the resource selection window [n+Q1, n+Q2] is defined as $C = \{C_0, C_1, \ldots, C_{N_{subCH}-L_{subCH}}\}$, where each resource is a consecutive sub-channel set whose length is $L_{subCH}$, and $L_{subCH}$ is a quantity of sub-channels occupied by a PSSCH and a PSCCH that correspond to to-be-transmitted data. In the resource selection window [n+Q1, n+Q2], a total quantity of resources corresponding to each slot is $N_{subCH} - L_{subCH} + 1$.

Figure 3:
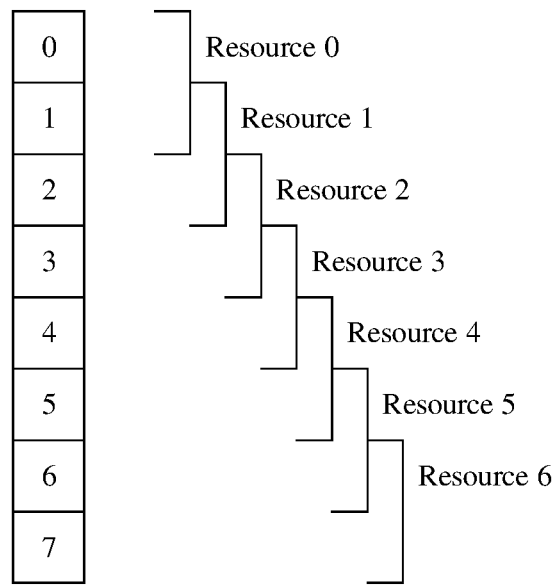
FIG. 3 is a schematic diagram of a frequency domain resource corresponding to one slot.

For example, FIG. 3 is a schematic diagram of a frequency domain resource corresponding to one slot. A block 0 to a block 8 in FIG. 3 represent all sub-channels corresponding to one slot, in other words, $N_{subCH} = 8$, and a sub-channel set corresponding to the eight sub-channels is $S = \{S_0, S_1, \ldots, S_7\}$. A quantity of sub-channels occupied by a PSSCH corresponding to to-be-transmitted data is $L_{subCH}$, and $L_{subCH}$ is, for example, 2. In this case, a total quantity of resources corresponding to the slot is 8−2+1=7, and the resources are a resource 0 to a resource 7 in FIG. 3. A set including the seven resources corresponding to the slot is $C = \{C_0, C_1, C_2, C_3, C_4, C_5, C_6\}$.

The following describes a process in which the transmit end terminal device performs resource selection in the mode-2.

Step 1: In a resource monitoring window, the transmit end terminal device monitors SCI in a resource pool that is sent by another terminal device.

Figure 4:
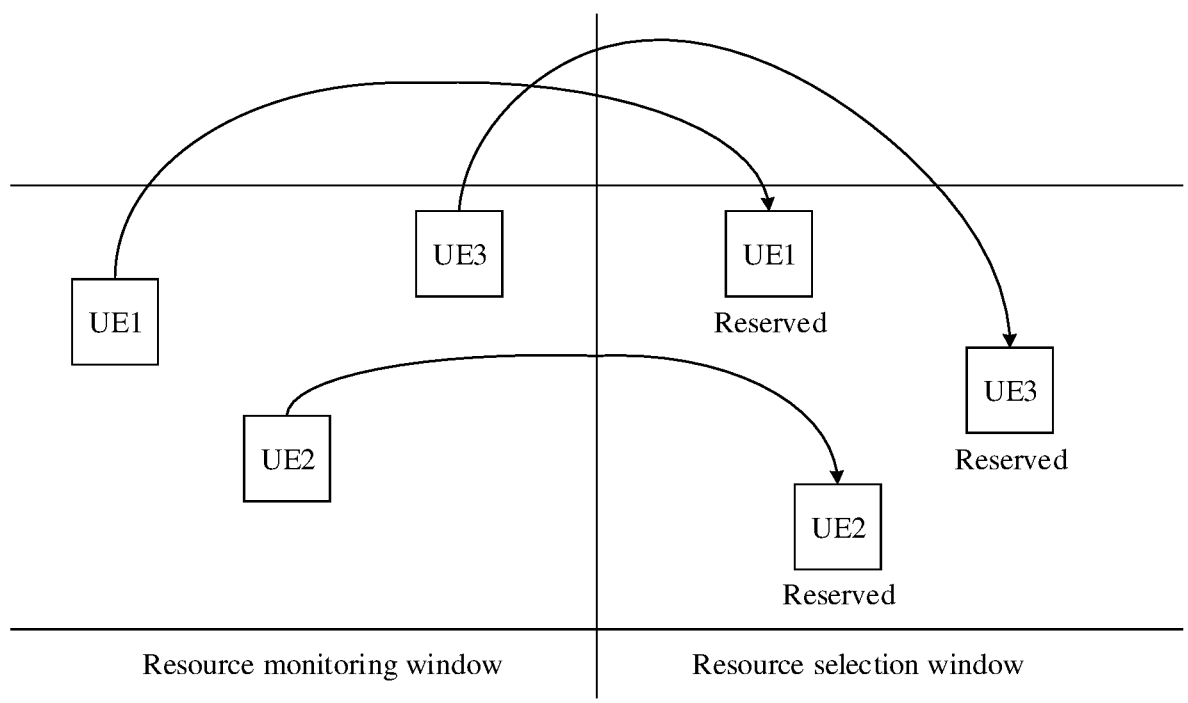
FIG. 4 is a schematic diagram of a reserved resource of a terminal device.

Step 2: If the monitored SCI includes a resource that has been reserved by the another terminal device, and the reserved resource is located in a resource selection window [n+Q1, n+Q2], the transmit end terminal device measures a resource corresponding to the reserved resource, to obtain RSRP of the resource. For example, as shown in FIG. 4, a left time window represents a resource monitoring window, and a right time window represents a resource selection window; in the resource monitoring window, UE1 represents a resource used by UE 1, UE2 represents a resource used by UE 2, and UE3 represents a resource used by UE 3; in the resource selection window, UE1 represents a reserved resource of the UE 1, UE2 represents a reserved resource of the UE 2, and UE3 represents a reserved resource of the UE 3.

If the RSRP obtained through measurement is greater than a preset RSRP threshold $Th_{RSRP}$, the transmit end terminal device excludes the resource from the resource selection window; otherwise, the transmit end terminal device may select the resource from the resource selection window. In this case, the resource may be referred to as a candidate resource.

$Th_{RSRP}$ is a function between a priority corresponding to data indicated in the received SCI and a priority corresponding to to-be-sent data of the transmit end terminal device.

Step 3: If a quantity of candidate resources in the resource selection window is less than X % of a quantity of all resources included in the resource selection window, increase $Th_{RSRP}$ by 3 dB, and then repeat step 2.

Step 4: The transmit end terminal device selects a resource from candidate resources.

It can be learned that, in step 3 of the resource selection process in the mode-2, if the quantity of candidate resources in the resource selection window is less than X % of the quantity of all resources, the preset RSRP threshold $Th_{RSRP}$ is increased by 3 dB, where a value of X is preset and fixed to 20. For example, when 30% of resources are excluded from the resource selection window, a quantity of remaining candidate resources is 70% of the quantity of all resources, where 70% is greater than the preset RSRP threshold 20%, and the transmit end terminal device may finally select the resource from 70% of all the resources. When 90% of resources are excluded from the resource selection window, a quantity of remaining candidate resources is 10% of the quantity of all resources, where 10% is less than the preset RSRP threshold 20%. In this case, the preset RSRP threshold $Th_{RSRP}$ needs to be increased until the quantity of remaining candidate resources is greater than 20% of the quantity of all candidate resources, and the transmit end terminal device may finally select the transmission resource from 20% of all the resources.

The value of X corresponds to a lower limit proportion of the resource that is finally actually selected by the transmit end terminal device. The resource includes an initial transmission resource and/or a retransmission resource, and a total quantity of resources is $N_{MAX}$. X=20 herein is a value of X used in LTE-V2X. The LTE-V2X supports only blind retransmission maximally including two transmissions, that is, one initial transmission and one retransmission, where $N_{MAX}=2$. When performing resource selection, the transmit end terminal device first selects one resource, and then selects the other resource from a remaining candidate resource. In addition, a time gap between the two resources in time domain is a preset time gap $T_{gap}$, and is measured in slots. If the transmit end terminal device cannot find, from the remaining candidate resource, the other transmission resource that meets a requirement of the preset time gap $T_{gap}$, the transmit end terminal device performs only initial transmission, and does not perform retransmission.

When a small quantity of resources are selected, X=20 can usually meet a requirement. However, in the NR-V2X, a plurality of retransmissions may be performed, and a large quantity of resources need to be selected. In this case, if X is fixed to 20, the preset RSRP threshold $Th_{RSRP}$ is adjusted only when the quantity of remaining candidate resources in the resource selection window is less than 20% of the quantity of all candidate resources included in the resource selection window. Moreover, even if the RSRP threshold $Th_{RSRP}$ is adjusted, a quantity of available resources is also limited. In other words, the value of X limits a quantity of available resources. This reduces resource selection efficiency.

Figure 5:
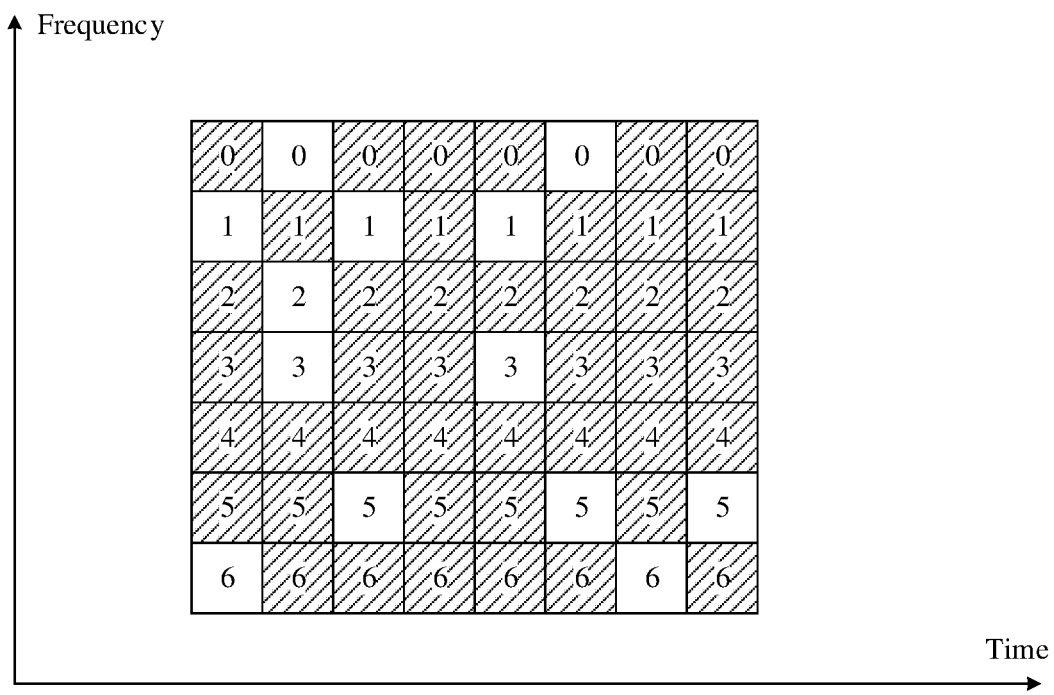
FIG. 5 is a schematic diagram of a candidate resource in a resource selection window.

For example, a maximum quantity $N_{subCH}$ of sub-channels that corresponds to each slot in the resource selection window is 8, a corresponding sub-channel set is $\mathcal{S} = \{S_0, S_1, \ldots, S_7\}$, a quantity $L_{subCH}$ of sub-channels occupied by a PSSCH corresponding to to-be-transmitted data of the transmit end terminal device is 2, and a set including all resources in each slot is $\mathcal{C} = \{C_0, C_1, C_2, C_3, C_4, C_5, C_6\}$. If a length of the resource selection window is eight slots, a quantity of all resources corresponding to each slot is 56. Refer to FIG. 5. Blocks marked by slashes are excluded resources, and there are 43 excluded resources in total. There are 13 remaining available resources, accounting for 23% of all resources, where 23% is greater than 20%. It is assumed that a quantity $N_{MAX}$ of resources that currently need to be selected is 4, that is, one initial transmission and three retransmissions are to be performed, a time gap $T_{gap}$ between two adjacent resources is 2, and a frequency gap $F_{gap}$ between two adjacent resources is 0. Because the 43 excluded resources are randomly distributed among all the 56 resources, four resources among which a time gap $T_{gap}$ is 2 and a frequency gap $F_{gap}$ is 0 cannot be selected from the remaining 13 resources.

In view of this, the technical solutions in embodiments of this application are provided. In embodiments of this application, a quantity of available candidate resources included in a resource pool is greater than or equal to X % of a quantity of all candidate resources included in the resource pool. A value of X may be set based on different factors, for example, may be set based on a quantity of resources that need to be selected, may be set based on a quantity of resources that need to be selected and a first time gap, may be set based on a quantity of resources that need to be selected, a first time gap, and a first frequency gap, or may be set based on a service priority. For example, when the quantity of resources that need to be selected is large, X may be set to a large value. Alternatively, when the service priority is high, X may be set to a large value. If the value of X is large, a large quantity of resources are available, and a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate. Moreover, in embodiments of this application, the value of X is not fixed, but may be set based on different requirements, so that the resource selection process is more flexible.

The technical solutions provided in embodiments of this application may be applied to D2D scenarios such as an NR D2D scenario or an LTE D2D scenario, or may be applied to V2X scenarios such as an NR V2X scenario or an LTE V2X scenario. For example, the technical solutions may be applied to the Internet of Vehicles such as V2X, LTE-V, or V2V, or may be applied to fields such as intelligent driving and intelligent connected vehicles. Alternatively, the technical solutions may be applied to other scenarios or other communication systems, for example, may be applied to resource selection over a Uu interface in an LTE system or an NR system. This is not specifically limited.

Figure 6:
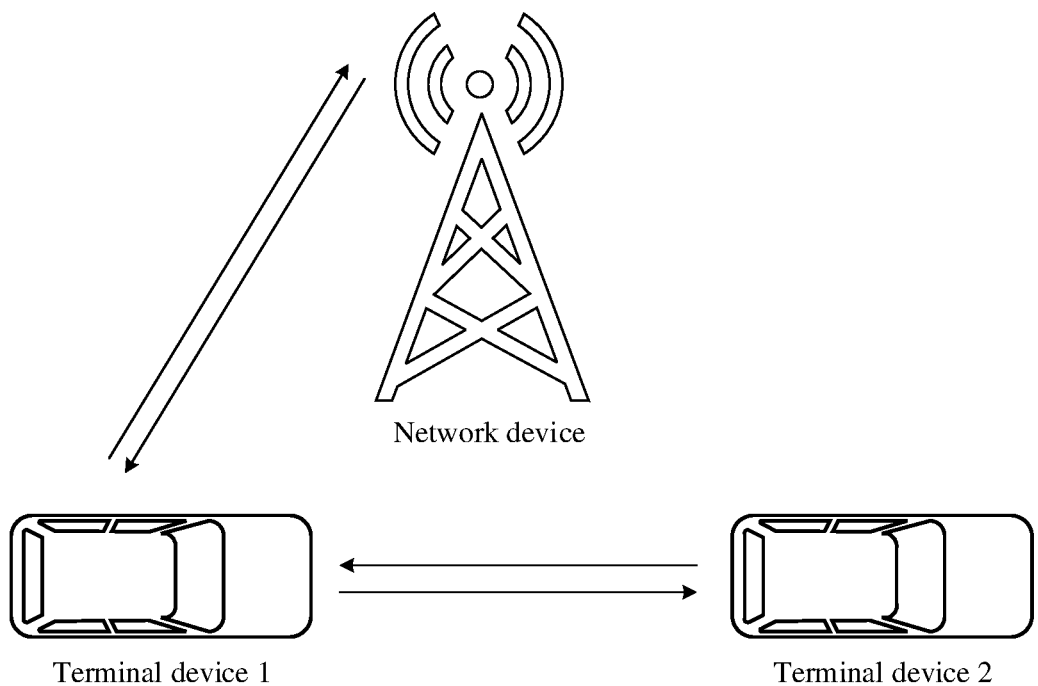
FIG. 6 is a schematic diagram of an application scenario according to an embodiment of this application.

The following describes a network architecture to which embodiments of this application are applied. FIG. 6 shows a network architecture to which an embodiment of this application is applied.

FIG. 6 includes a network device and two terminal devices, namely, a terminal device 1 and a terminal device 2. Both the two terminal devices may be connected to the network device; only the terminal device 1 in the two terminal devices may be connected to the network device, and the terminal device 2 is not connected to the network device; or neither of the two terminal devices is connected to the network device. The two terminal devices may perform communication with each other through a sidelink. FIG. 6 uses an example in which only the terminal device 1 is connected to the network device. Certainly, a quantity of terminal devices in FIG. 6 is merely an example. During actual application, the network device may serve a plurality of terminal devices.

The network device in FIG. 6 is, for example, an access network device such as a base station. The access network device corresponds to different devices in different systems. For example, the access network device may correspond to an eNB in a 4th generation mobile communication technology (4th generation, 4G) system and correspond to a 5G access network device, for example, a gNB, in a 5G system, or is an access network device in a subsequent evolved communication system.

For example, the terminal device in FIG. 6 is a vehicle-mounted terminal device or a vehicle. However, the terminal device in embodiments of this application is not limited thereto.

The following describes the technical solutions in embodiments of this application with reference to the accompanying drawings.

Figure 7:
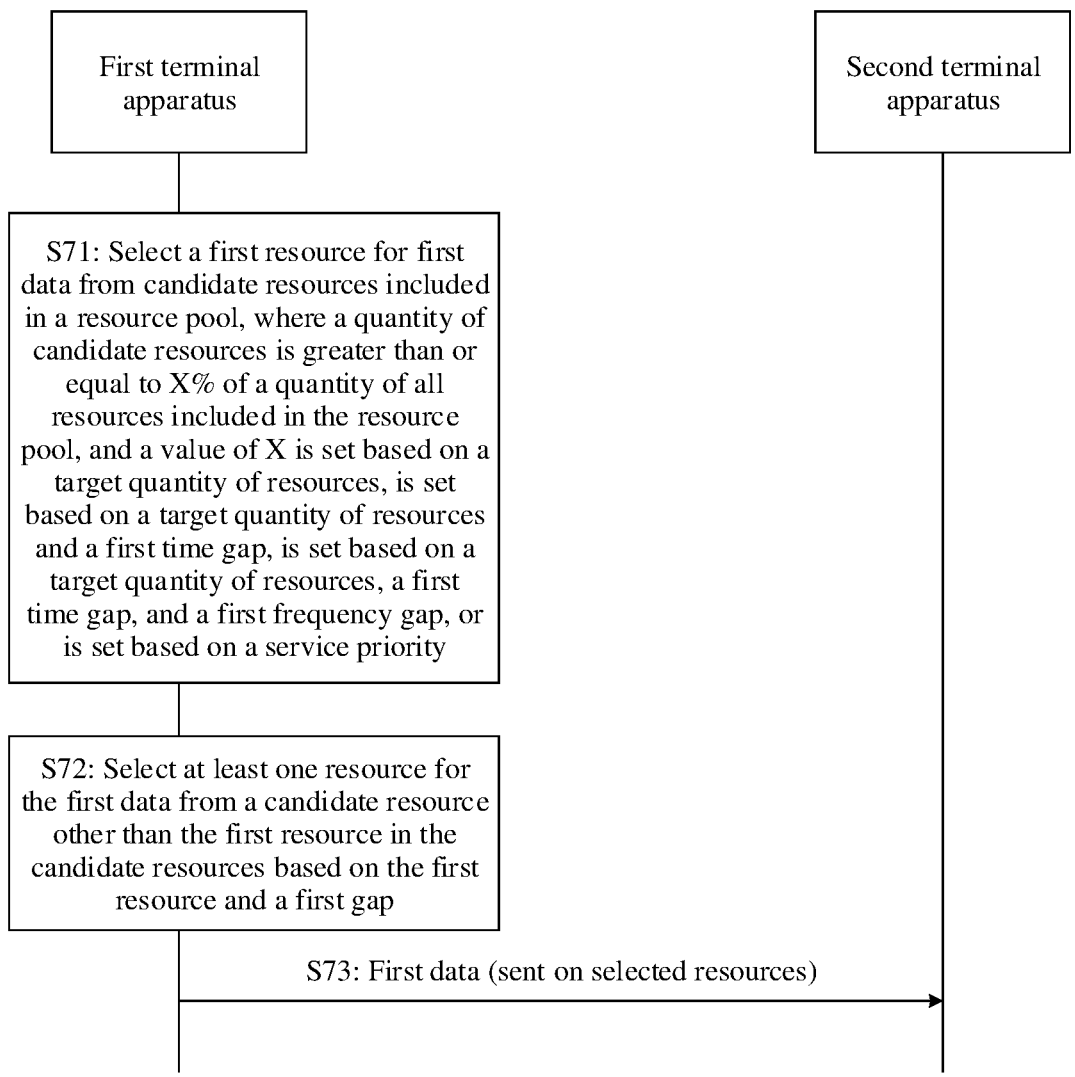
FIG. 7 is a flowchart of a first resource selection method according to an embodiment of this application.

An embodiment of this application provides a first resource selection method. FIG. 7 is a flowchart of the method. In the following description process, an example in which the method is applied to the network architecture shown in FIG. 6 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device to implement functions required in the method, may be a terminal device or a communication apparatus that can support the terminal device to implement functions required in the method, or certainly may be another communication apparatus, for example, a chip system. In addition, an implementation of the first communication apparatus or the second communication apparatus is not limited. For example, the two communication apparatuses may be implemented in a same form, for example, implemented in a device form. Alternatively, the two communication apparatuses may be implemented in different forms. For example, the first communication apparatus is implemented in a device form, and the second communication apparatus is implemented in a chip system form. The network device is, for example, a base station.

For ease of description, the following uses an example in which the method is performed by terminal apparatuses, to be specific, an example in which the first communication apparatus is a terminal apparatus (for example, referred to as a first terminal apparatus) and the second communication apparatus is also a terminal apparatus (for example, referred to as a second terminal apparatus). The example in which this embodiment is applied to the network architecture shown in FIG. 6 is used. Therefore, the first terminal apparatus below may implement functions of the terminal device 1 in the network architecture shown in FIG. 6, and the second terminal apparatus below may implement functions of the terminal device 2 in the network architecture shown in FIG. 6. For example, the first terminal apparatus is a signal transmit end, and the second terminal apparatus is a signal receive end.

S71: The first terminal apparatus selects a first resource for first data from candidate resources included in a resource pool, where the candidate resources include resources whose reference signal received power is less than or equal to a first threshold.

The first terminal apparatus is to transmit data, for example, the first data, and may select a resource for the first data from the candidate resources included in the resource pool. The candidate resources herein are available resources in resources included in the resource pool, for example, are the resources whose RSRP obtained by the first terminal apparatus through measurement is less than or equal to the first threshold. The first threshold is, for example, $Th_{RSRP}$ described above, or may be another threshold. The resource pool is, for example, the resource selection window described above.

In this embodiment of this application, a quantity of candidate resources may be greater than or equal to X % of a quantity of all resources included in the resource pool. For example, X may be configured by a network device, may be preconfigured in the first terminal apparatus, or may be specified in a protocol.

In this embodiment of this application, a value of X may meet different conditions, for example, meet one or more of the following first condition, second condition, third condition, or fourth condition. The following uses examples to describe the four conditions.

1. First Condition that the Value of X Meets:

The value of X may be set based on a target quantity of resources. The target quantity of resources may be a total quantity of resources that need to be selected to transmit the first data. Alternatively, a large quantity of resources may be required to transmit the first data, but the resource pool may be limited. For example, for one resource pool, a maximum of H resources are selected once, where H is an integer greater than or equal to 0, and is less than a total quantity of resources required by the first data. In this case, a plurality of times of selection may need to be performed to meet a transmission requirement of the first data. In this case, the target quantity of resources in this embodiment of this application may alternatively be a total quantity of resources to be selected once. For example, if the first data requires one initial transmission and a maximum of three retransmissions, the target quantity of resources for the first data may be 4.

In an optional manner, the target quantity of resources for the first data may be related to quality of service (QoS) of the first data, may be related to configuration information of the resource pool, or may be related to QoS of the first data and configuration information of the resource pool. That the target quantity of resources is related to the QoS of the first data may also be understood as: The target quantity of resources is related to QoS of a service corresponding to the first data. The configuration information of the resource pool is, for example, determined by the network device, and may be sent by the network device to a terminal device; or the configuration information may be specified in a protocol. The configuration information of the resource pool may indicate a maximum quantity of resources that can be selected once from the resource pool, and the resource pool is a resource pool from which the resource for the first data is selected. For example, for one resource pool, a maximum of H resources are selected once. In this case, the configuration information of the resource pool may indicate a value of H.

For example, a larger target quantity of resources may indicate a larger value of X. Table 1 lists examples of a correspondence between the target quantity of resources and the value of X.

TABLE 1

| Target quantity of resources | X |
| --- | --- |
| 2 | 20 |
| 3 | 30 |
| 4 | 40 |
| >4 | 50 |

For example, in Table 1, when the target quantity of resources is 2, the value of X may be 20; when the target quantity of resources is 3, the value of X may be 30. Certainly, Table 1 is merely an example. In the first condition, the target quantity of resources and the value of X are not limited to the several correspondences listed in Table 1, provided that the value of X is set based on the target quantity of resources.

A larger target quantity of resources indicates a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate.

2. Second Condition that the Value of X Meets:

The value of X may be set based on a target quantity of resources and a first time gap. The first time gap may be a time gap satisfied by two adjacent resources in resources that need to be selected. For example, the first time gap may be $T_{gap}$ described above, or may be a time gap that is set in this embodiment of this application.

For example, when the target quantity of resources is fixed, a smaller first time gap may indicate a larger value of X. Table 2 lists examples of a correspondence among the target quantity of resources, the first time gap, and the value of X.

TABLE 2

| Target quantity of resources | First time gap | X |
| --- | --- | --- |
| 2 | $\leq T_c$ | 30 |
| 2 | $>T_c$ | 20 |
| 3 | $\leq T_c$ | 40 |
| 3 | $>T_c$ | 30 |
| 4 | $\leq T_c$ | 50 |
| 4 | $>T_c$ | 40 |
| >4 | $\leq T_c$ | 60 |
| >4 | $>T_c$ | 50 |

In Table 2, $T_c$ has a value range of, for example, {3, 4, 5}, and is measured, for example, in slots. Certainly, $T_c$ is not limited thereto. For example, in Table 2, when the target quantity of resources is 2, if the first time gap is less than or equal to $T_c$, the value of X may be 30; or if the first time gap is greater than $T_c$, the value of X may be 20. It can be learned that when the target quantity of resources is fixed, a smaller first time gap indicates a larger value of X. Certainly, Table 2 is merely an example. In the first condition, the target quantity of resources, the first time gap, and the value of X are not limited to the several correspondences listed in Table 2, provided that the value of X is set based on the target quantity of resources and the first time gap.

When the target quantity of resources is fixed, a smaller first time gap may indicate a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate.

3. Third Condition that the Value of X Meets:

The value of X may be set based on a target quantity of resources, a first time gap, and a first frequency gap. The first frequency gap may be a frequency gap satisfied by two adjacent resources in resources that need to be selected.

For example, when both the target quantity of resources and the first time gap are fixed, a smaller first frequency gap may indicate a larger value of X. Table 3 lists examples of a correspondence among the target quantity of resources, the first time gap, the first frequency gap, and the value of X.

TABLE 3

| Target quantity of resources | First time gap | First frequency gap | X |
| --- | --- | --- | --- |
| 2 | $\leq T_c$ | $\leq F_c$ | 35 |
|   |   | $>F_c$ | 30 |
| 2 | $>T_c$ | $\leq F_c$ | 25 |
|   |   | $>F_c$ | 20 |
| 3 | $\leq T_c$ | $\leq F_c$ | 45 |
|   |   | $>F_c$ | 40 |
| 3 | $>T_c$ | $\leq F_c$ | 35 |
|   |   | $>F_c$ | 30 |
| 4 | $\leq T_c$ | $\leq F_c$ | 55 |
|   |   | $>F_c$ | 50 |
| 4 | $>T_c$ | $\leq F_c$ | 45 |
|   |   | $>F_c$ | 40 |
| >4 | $\leq T_c$ | $\leq F_c$ | 65 |
|   |   | $>F_c$ | 60 |
| >4 | $>T_c$ | $\leq F_c$ | 55 |
|   |   | $>F_c$ | 50 |

In Table 3, $T_c$ has a value range of, for example, {3, 4, 5}, and is measured, for example, in slots. $F_c$ has a value range of, for example, {3, 4, 5}, and is measured, for example, in sub-channels or resource blocks (RBs). Certainly, $T_c$ and $F_c$ are not limited thereto. For example, in Table 3, when the target quantity of resources is 2 and the first time gap is less than or equal to $T_c$, if the first frequency gap is less than or equal to $F_c$, the value of X may be 35; or if the first time gap is greater than $F_c$, the value of X may be 30. It can be learned that when both the target quantity of resources and the first time gap are fixed, a smaller first frequency gap indicates a larger value of X. Certainly, Table 3 is merely an example. In the first condition, the target quantity of resources, the first time gap, the first frequency gap, and the value of X are not limited to the several correspondences listed in Table 3, provided that the value of X is set based on the target quantity of resources, the first time gap, and the first frequency gap.

When the target quantity of resources and the first time gap are fixed, a smaller first frequency gap may indicate a larger quantity of resources that need to be selected. In this case, the value of X may be increased, so that the quantity of candidate resources is large. A larger quantity of candidate resources indicates a larger selection range, and therefore indicates a higher probability that a resource can be selected. In this manner, a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate.

4. Fourth Condition that the Value of X Meets:

The value of X may be set based on a service priority. For example, a higher service priority may indicate a larger value of X. Table 4 lists examples of a correspondence between the service priority and the value of X.

TABLE 4

| Service priority | X |
|---|---|
| High | 40 |
| Medium | 30 |
| Low | 20 |

For example, in Table 4, when the service priority is high, the value of X may be 40; when the service priority is low, the value of X may be 20. Certainly, Table 4 is merely an example. In the first condition, the service priority and the value of X are not limited to the several correspondences listed in Table 4, provided that the value of X is set based on the service priority.

A higher service priority indicates that a resource selection success rate needs to be ensured as much as possible. In this case, the value of X may be increased, so that the quantity of candidate resources is large. A larger quantity of candidate resources indicates a larger selection range, and therefore indicates a higher probability that a resource can be selected. In this manner, a resource selection requirement can be met as much as possible, thereby improving resource selection efficiency, and reducing complexity in a resource selection process. In addition, as sufficient resources as possible are selected, to avoid that some transmission processes cannot be performed due to a lack of resources, thereby improving a transmission success rate.

The value of X may alternatively meet a condition other than the foregoing four conditions, in other words, may alternatively be set based on another factor. This is not specifically limited.

In this embodiment of this application, when needing to select resources, the first terminal apparatus may first select one resource, for example, the first resource. After being selected, the first resource may be used as a reference to perform subsequent resource selection.

S72: The first terminal apparatus selects at least one resource for the first data from a candidate resource other than the first resource in the candidate resources based on the first resource and a first gap.

The first gap may include the foregoing first time gap, include the foregoing first frequency gap, or include the first time gap and the first frequency gap. The first time gap may be the time gap satisfied by two adjacent resources in the resources that need to be selected. For example, the first terminal apparatus selects the first resource and the at least one resource. In this case, the first time gap may be a time gap satisfied by two adjacent resources in the first resource and the at least one resource. The first frequency gap may be the frequency gap satisfied by two adjacent resources in the resources that need to be selected. For example, the first terminal apparatus selects the first resource and the at least one resource. In this case, the first frequency gap may be a frequency gap satisfied by two adjacent resources in the first resource and the at least one resource.

In this embodiment of this application, if a total quantity of the first resource and the at least one resource is greater than or equal to the target quantity of resources, the first terminal apparatus may stop the resource selection process, and send the first data on selected resources. Alternatively, if a total quantity of the first resource and the at least one resource is less than the target quantity of resources, and a candidate resource that meets a selection condition exists in a remaining candidate resource (the selection condition may be understood as the first gap), the first terminal apparatus may continue to perform selection. Alternatively, if a total quantity of the first resource and the at least one resource is less than the target quantity of resources, but no candidate resource that meets a selection condition exists in a remaining candidate resource, the first terminal apparatus may stop the resource selection process. Although a quantity of selected resources is less than the target quantity of resources, the first terminal apparatus still sends the first data on selected resources. Alternatively, in this case, the first terminal apparatus may perform reselection.

For example, if the first terminal apparatus determines that there is no available candidate resource other than the first resource and a third resource in the candidate resources, and a total quantity of the first resource and the third resource is less than the target quantity of resources, the first terminal apparatus may abandon an originally selected resource (for example, the first resource), and reselect a second resource from the candidate resources. After selecting the second resource, the first terminal apparatus may select one or more resources for the first data from a candidate resource other than the second resource in the candidate resources based on the second resource and the first gap. A selection manner herein is similar to the manner in which the first terminal apparatus selects the resource for the first data based on the first resource and the first gap. The third resource may include a selected resource other than the first resource in the candidate resources. For example, the third resource may be the at least one resource, or may include the at least one resource and a resource other than the at least one resource. In addition, after the first terminal apparatus selects the resource for the first data based on the second resource and the first gap, if a quantity of resources that can be selected is greater than or equal to the target quantity of resources, the first terminal apparatus may stop the resource selection process, and send the first data on selected resources. Alternatively, after the first terminal apparatus selects the resource for the first data based on the second resource and the first gap, if a quantity of resources that can be selected is less than the target quantity of resources, the first terminal apparatus may stop the resource selection process. Although the quantity of selected resources is less than the target quantity of resources, the first terminal apparatus still sends the first data on selected resources. Alternatively, the first terminal apparatus may perform reselection. A subsequent process in which the first terminal apparatus reselects a resource and sends the first data is similar and can be deduced.

In this embodiment of this application, if the quantity of resources that can be selected by the first terminal apparatus is less than the target quantity of resources, the first terminal apparatus may perform reselection, so that the quantity of selected resources may be greater than or equal to the target quantity of resources as much as possible, thereby meeting the transmission requirement of the first data.

There may be a plurality of selection manners in which the first terminal apparatus selects the at least one resource for the first data from the candidate resource other than the first resource in the candidate resources based on the first resource and the first gap. Examples are used for description below.

1. First Selection Manner

In the first selection manner, a gap between two adjacent resources in the selected resources needs to be equal to the first gap. The first selection manner is further classified into three cases.

In a first case, the first gap includes only the first time gap and does not include the first frequency gap; or the first gap includes the first time gap and the first frequency gap, but the first frequency gap is 0. This case may mean that frequencies of two adjacent resources in the resources that need to be selected are the same. In this case, the first terminal apparatus may move a time domain position of the first resource as a reference time domain position forward and/or backward in time domain for the first time gap, where a candidate resource corresponding to a time domain position obtained through movement may be used as a part or all of the at least one resource. In embodiments of this application, in an example in which a horizontal axis represents time, forward movement in time domain may be movement to the left, and backward movement in time domain may be movement to the right.

If the candidate resource corresponding to the time domain position obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If the candidate resource corresponding to the time domain position obtained through movement is a part of the at least one resource, it indicates that a current resource selection process of the first terminal apparatus has not ended. For example, the first terminal apparatus moves the time domain position of the first resource as the reference time domain position forward in time domain for the first time gap. If a candidate resource exists in the time domain position obtained through movement, and for example, is a resource 2, the first terminal apparatus may select the resource 2, in other words, the resource 2 may be used as one of the at least one resource. If a quantity of currently selected resources is less than the target quantity of resources, the first terminal apparatus may further move a time domain position of the resource 2 as the reference time domain position forward in time domain for the first time gap. If a candidate resource exists in a time domain position obtained through movement, and for example, is a resource 3, the first terminal apparatus may select the resource 3, in other words, the resource 3 may be used as one of the at least one resource. If a quantity of currently selected resources is less than the target quantity of resources, the first terminal apparatus may further move a time domain position of the resource 3 as the reference time domain position forward in time domain for the first time gap. The rest can be deduced by analogy until a quantity of selected resources is greater than or equal to the target quantity of resources, or until no candidate resource exists in a time domain position obtained through movement. A manner in which the first terminal apparatus selects a resource by moving the time domain position of the first resource as the reference time domain position backward in time domain for the first time gap is the same as the foregoing manner of selecting the resource by moving the time domain position of the first resource forward for the first time gap.

Figure 8:
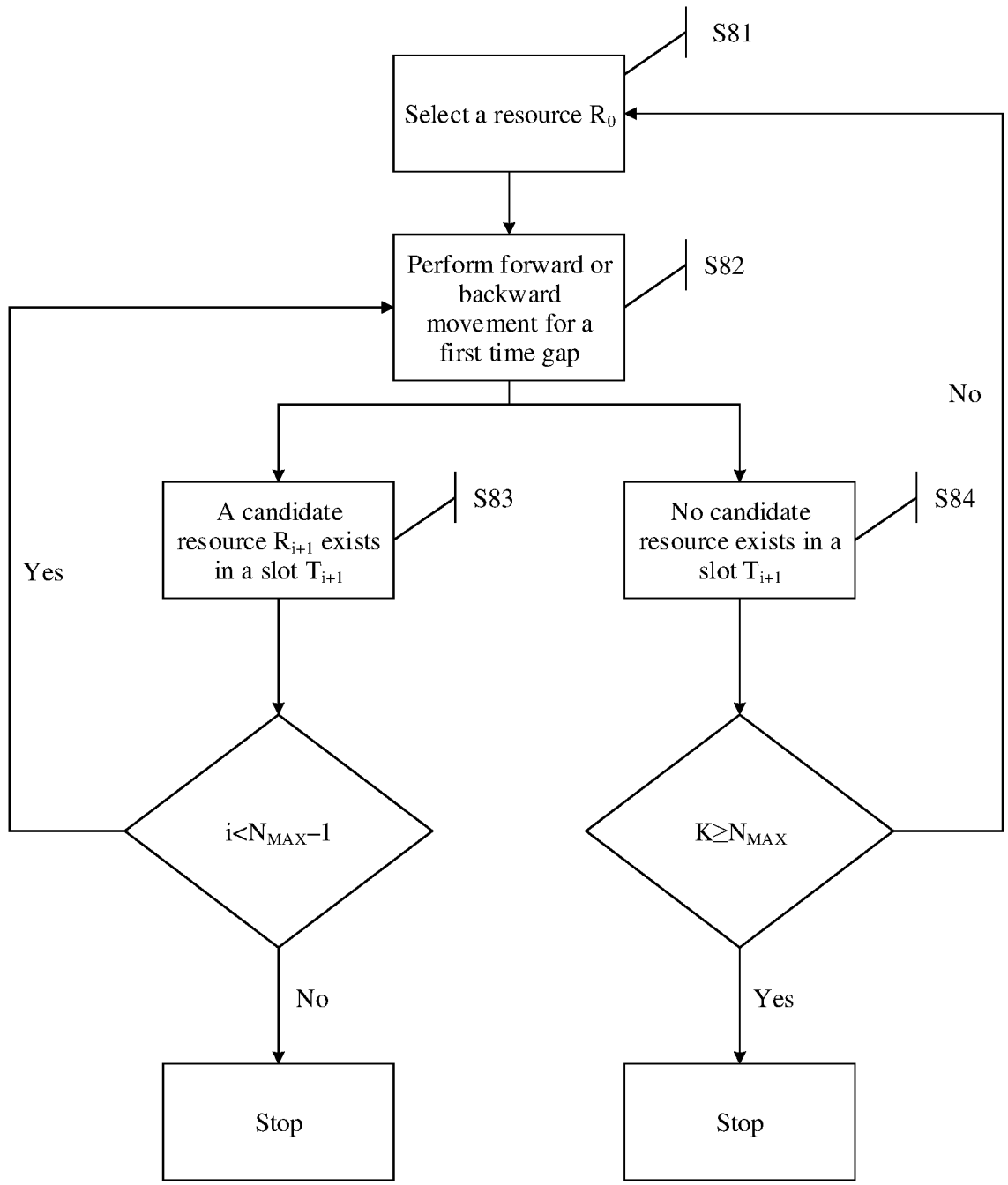
FIG. 8 is a flowchart of a resource selection method used by a first terminal apparatus if a first frequency gap is 0 according to an embodiment of this application.

For example, it is assumed that the first frequency gap is 0. For a procedure for a resource selection method used by the first terminal apparatus under the selection condition of the first time gap, refer to FIG. 8.

S81: The first terminal apparatus selects an initial resource $R_i$ for the first data from the candidate resources included in the resource pool. For example, a slot corresponding to the initial resource $R_i$ is $T_i$.

For example, the first terminal apparatus may randomly select the initial resource $R_i$, where i is, for example, 0. The initial resource $R_i$ is the first resource.

S82: The first terminal apparatus moves $T_i$ forward or backward for the first time gap (for example, $T_{gap}$) based on $T_{gap}$ to obtain $T_{i+1}$, where $T_{i+1}$ is a time domain position obtained through movement, for example, a slot obtained through movement.

S83: A candidate resource $R_{i+1}$ exists in the slot $T_{i+1}$.

$N_{MAX}$ indicates the target quantity of resources. If $i+1<N_{MAX}-1$, $i=i+1$, and S82 is repeatedly performed. Alternatively, if $i+1 \geq N_{MAX}-1$, it indicates that a quantity of selected resources is greater than or equal to the target quantity of resources, new resource selection may be stopped, and final resources are determined from selected candidate resources.

S84: No candidate resource $R_{i+1}$ exists in the slot $T_{i+1}$.

If $K \geq N_{MAX}$, it indicates that a quantity of selected resources is greater than or equal to the target quantity of resources, new resource selection may be stopped, and final resources are determined from selected candidate resources. Alternatively, if $K<N_{MAX}$, S81 is repeatedly performed. K represents the quantity of selected candidate resources.

In a second case, the first gap includes only the first frequency gap and does not include the first time gap; or the first gap includes the first time gap and the first frequency gap, but the first time gap is 0. This case may mean that a time gap between two adjacent resources in the resources that need to be selected is 0. In this case, the first terminal apparatus may move a frequency domain position of the first resource as a reference frequency domain position upward and/or downward in frequency domain for the first frequency gap, where a candidate resource corresponding to a frequency domain position obtained through movement may be used as a part or all of the at least one resource. Upward movement in frequency domain is understood as, for example, movement toward a high frequency direction, and downward movement in frequency domain is understood as, for example, movement toward a low frequency direction.

If the candidate resource corresponding to the frequency domain position obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If the candidate resource corresponding to the frequency domain position obtained through movement is a part of the at least one resource, it indicates that a current resource selection process of the first terminal apparatus has not ended. For example, the first terminal apparatus moves the frequency domain position of the first resource as the reference frequency domain position upward in frequency domain for the first frequency gap. If a candidate resource exists in the frequency domain position obtained through movement, and for example, is a resource 4, the first terminal apparatus may select the resource 4, in other words, the resource 4 may be used as one of the at least one resource. If a quantity of currently selected resources is less than the target quantity of resources, the first terminal apparatus may further move a frequency domain position of the resource 4 as the reference frequency domain position upward in frequency domain for the first frequency gap. If a candidate resource exists in a frequency domain position obtained through movement, and for example, is a resource 5, the first terminal apparatus may select the resource 5, in other words, the resource 5 may be used as one of the at least one resource. If a quantity of currently selected resources is less than the target quantity of resources, the first terminal apparatus may further move a frequency domain position of the resource 5 as the reference frequency domain position upward in frequency domain for the first frequency gap. The rest can be deduced by analogy until a quantity of selected resources is greater than or equal to the target quantity of resources, or until no candidate resource exists in a frequency domain position obtained through movement. A manner in which the first terminal apparatus selects a resource by moving the frequency domain position of the first resource as the reference frequency domain position downward in frequency domain for the first frequency gap is the same as the foregoing manner of selecting the resource by moving the frequency domain position of the first resource upward for the first frequency gap.

In a third case, the first gap includes both the first frequency gap and the first time gap, and neither the first time gap nor the first frequency gap is 0. In this case, the first terminal apparatus needs to consider both a time domain condition and a frequency domain condition during resource selection. For example, the first terminal apparatus may move a time domain position of the first resource as a reference time domain position forward and/or backward in time domain for the first time gap, and move a frequency domain position of the first resource as a reference frequency domain position upward and/or downward in frequency domain for the first frequency gap, where a candidate resource corresponding to both a time domain position and a frequency domain position that are obtained through movement may be used as a part or all of the at least one resource.

Forward and/or backward movement for the first time gap includes, for example, forward movement for the first time gap, backward movement for the first time gap, or forward and backward movement for the first time gap. Similarly, upward and/or downward movement for the first frequency gap includes, for example, upward movement for the first frequency gap, downward movement for the first frequency gap, or upward and downward movement for the first frequency gap.

If the candidate resource corresponding to both the time domain position and the frequency domain position that are obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If the candidate resource corresponding to both the time domain position and the frequency domain position that are obtained through movement is a part of the at least one resource, it indicates that a current resource selection process of the first terminal apparatus has not ended. For example, the first terminal apparatus moves the frequency domain position of the first resource as the reference frequency domain position upward in frequency domain for the first frequency gap, and moves the time domain position of the first resource as the reference time domain position forward in time domain for the first time domain gap. If a candidate resource exists in both the time domain position and the frequency domain position that are obtained through movement, and for example, is a resource 6, the first terminal apparatus may select the resource 6, in other words, the resource 6 may be used as one of the at least one resource. If a quantity of currently selected resources is less than the target quantity of resources, the first terminal apparatus may further move a frequency domain position of the resource 6 as the reference frequency domain position upward in frequency domain for the first frequency gap, and move a time domain position of the resource 6 as the reference time domain position forward in time domain for the first time gap. If a candidate resource exists in both a time domain position and a frequency domain position that are obtained through movement, and for example, is a resource 7, the first terminal apparatus may select the resource 7, in other words, the resource 7 may be used as one of the at least one resource. If a quantity of currently selected resources is less than the target quantity of resources, the first terminal apparatus may further move a frequency domain position of the resource 7 as the reference frequency domain position upward in frequency domain for the first frequency gap, and move a time domain position of the resource 7 as the reference time domain position forward in time domain for the first time gap. The rest can be deduced by analogy until a quantity of selected resources is greater than or equal to the target quantity of resources, or until no candidate resource exists in both a time domain position and a frequency domain position that are obtained through movement. A manner in which the first terminal apparatus selects a resource by moving the frequency domain position of the first resource as the reference frequency domain position downward in frequency domain for the first frequency gap and moving the time domain position of the first resource as the reference time domain position forward in time domain for the first time gap, selects a resource by moving the frequency domain position of the first resource as the reference frequency domain position upward in frequency domain for the first frequency gap and moving the time domain position of the first resource as the reference time domain position backward in time domain for the first time gap, or selects a resource by moving the frequency domain position of the first resource as the reference frequency domain position downward in frequency domain for the first frequency gap and moving the time domain position of the first resource as the reference time domain position backward in time domain for the first time gap is the same as the foregoing manner of selecting the resource by moving the frequency domain position of the first resource upward for the first frequency gap and moving the time domain position of the first resource forward for the first time gap.

The following uses the foregoing first case (that is, the first gap includes only the first time gap and does not include the first frequency gap; or the first gap includes the first time gap and the first frequency gap, but the first frequency gap is 0) as an example to describe several cases occurring in the first selection manner when the target quantity of resources varies. $N_{MAX}$ indicates the target quantity of resources.

When $N_{MAX}=2$, the first terminal apparatus may select an initial resource $R_0$, namely, the first resource, and a slot corresponding to the initial resource $R_0$ is $T_0$.

Then, based on the first time gap $T_{gap}$, the first terminal apparatus moves the slot $T_0$ forward for $T_{gap}$ to obtain a slot $T_{1\_l}$, and moves $T_0$ backward for $T_{gap}$ to obtain a slot $T_{1\_r}$. Both the slot $T_{1\_l}$ and the slot $T_{1\_r}$ are time domain positions obtained through movement.

Figure 9A:
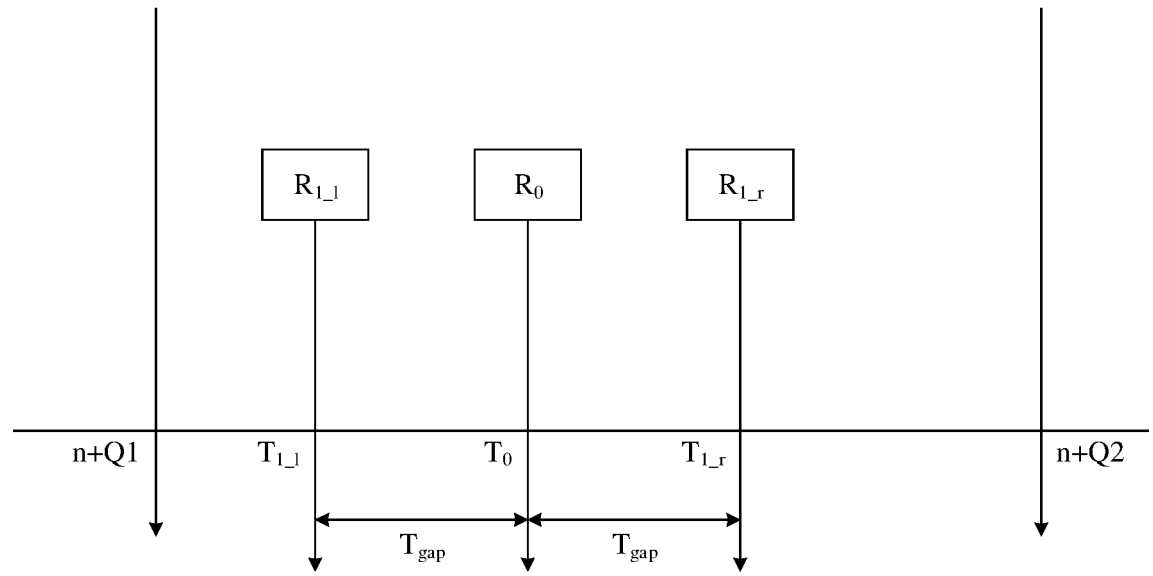
FIG. 9A and FIG. 9B are schematic diagrams of resource selection performed by a first terminal apparatus when a target quantity of resources is 2 according to an embodiment of this application.

As shown in FIG. 9A, if a candidate resource $R_{1\_l}$ exists in the slot $T_{1\_l}$, and a candidate resource $R_{1\_r}$ exists in the slot $T_{1\_r}$, the first terminal apparatus may determine final resources from $R_0$, $R_{1\_l}$, and $R_{1\_r}$. In this case, a quantity of selected resources is greater than the target quantity of resources. For example, the first terminal apparatus may randomly select two adjacent resources from the three resources as resources for sending the first data. For example, the first terminal apparatus selects $R_0$ and $R_{1\_r}$.

Alternatively, a quantity of selected resources may be equal to the target quantity of resources. For example, the first terminal apparatus may move the slot $T_0$ forward for $T_{gap}$ to obtain the slot $T_{1\_l}$ without moving $T_0$ backward for $T_{gap}$. Alternatively, the first terminal apparatus may move $T_0$ backward for $T_{gap}$ to obtain the slot $T_{1\_r}$ without moving $T_0$ forward. Alternatively, the first terminal apparatus moves the slot $T_0$ forward for $T_{gap}$ to obtain the slot $T_{1\_l}$, and moves $T_0$ backward for $T_{gap}$ to obtain the slot $T_{1\_r}$, but there may be no candidate resource in the slot $T_{1\_l}$ or the slot $T_{1\_r}$. In all these cases, the quantity of selected resources may be equal to the target quantity of resources.

Figure 9B:
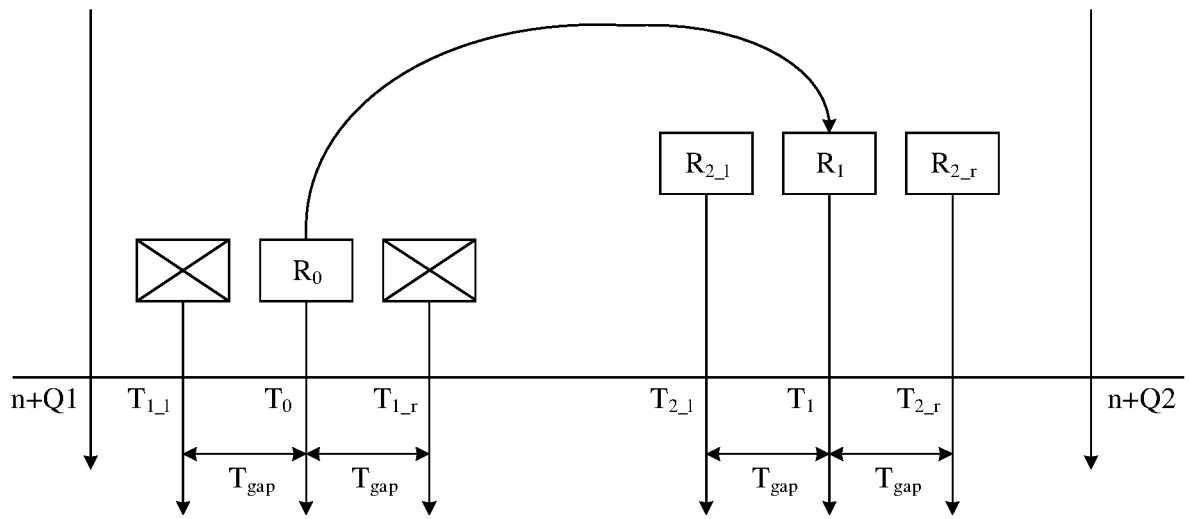

As shown in FIG. 9B, if no candidate resource exists in the slot $T_{1\_l}$, and no candidate resource exists in the slot $T_{1\_r}$, the first terminal apparatus may abandon the selected resource $R_0$, and reselect a resource from the resource pool. For example, the first terminal apparatus reselects a resource $R_1$.

After selecting the resource $R_1$, the first terminal apparatus may continue to select a resource for the first data based on the first time gap $T_{gap}$. For example, for the resource $R_1$ selected for the second time, a slot $T_1$ in which the resource $R_1$ is located is moved forward for $T_{gap}$ to obtain a slot $T_{2\_l}$, and is moved backward for $T_{gap}$ to obtain a slot $T_{2\_r}$. For example, if a candidate resource $R_{2\_l}$ exists in the slot $T_{2\_l}$, and a candidate resource $R_{2\_r}$ exists in the slot $T_{2\_r}$, the first terminal apparatus may determine final resources from $R_1$, $R_{2\_l}$, and $R_{2\_r}$. For example, the first terminal apparatus selects $R_1$ and $R_{2\_l}$.

When $N_{MAX}=3$, the first terminal apparatus may select an initial resource $R_0$, namely, the first resource. A slot corresponding to the initial resource $R_0$ is $T_0$.

Then, based on the first time gap $T_{gap}$, the first terminal apparatus moves the slot $T_0$ forward for $T_{gap}$ to obtain a slot $T_{1\_l}$, and moves $T_0$ backward for $T_{gap}$ to obtain a slot $T_{1\_r}$. Both the slot $T_{1\_l}$ and the slot $T_1$, are time domain positions obtained through movement.

Figure 10A:
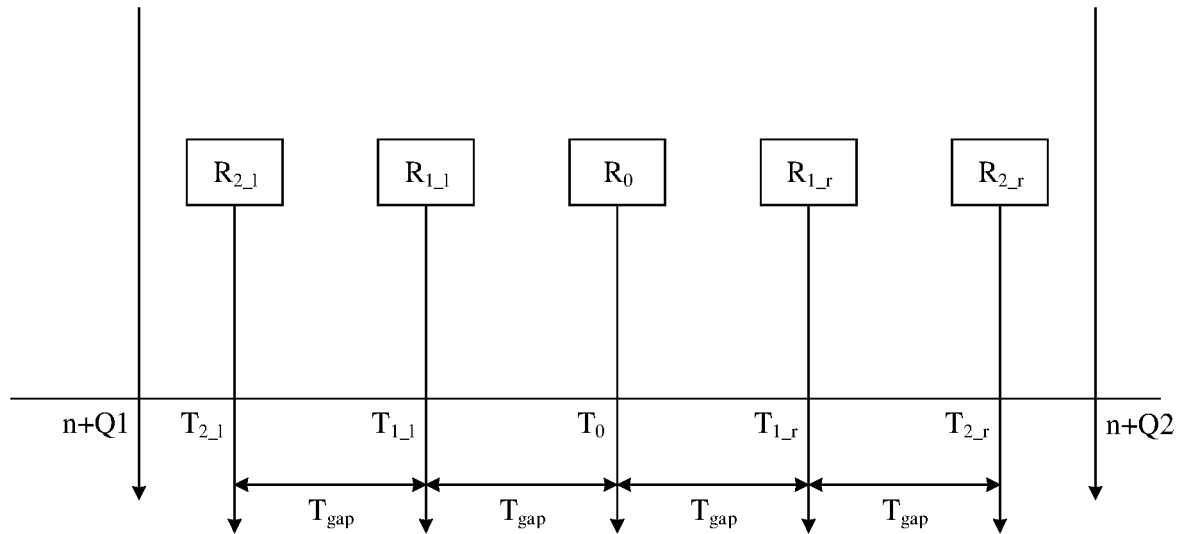
FIG. 10A and FIG. 10B are schematic diagrams of resource selection performed by a first terminal apparatus when a target quantity of resources is 3 according to an embodiment of this application.

As shown in FIG. 10A, if a candidate resource $R_{1\_l}$ exists in the slot $T_{1\_l}$, and a candidate resource $R_1$, exists in the slot $T_{1\_r}$, the first terminal apparatus may move $T_{1\_l}$ forward for $T_{gap}$ to obtain a slot $T_{2\_l}$, and move $T_{1\_r}$ backward for $T_{gap}$ to obtain a slot $T_{2\_r}$.

If a candidate resource $R_{2\_l}$ exists in the slot $T_{2\_l}$, and a candidate resource $R_{2\_r}$ exists in the slot $T_{2\_r}$, the first terminal apparatus may determine final resources from $R_0$, $R_{1\_l}$, $R_{1\_r}$, $R_{2\_l}$, and $R_{2\_r}$. In this case, a quantity of selected resources is greater than the target quantity of resources. For example, the first terminal apparatus may randomly select two adjacent resources from the five resources as resources for sending the first data. For example, the first terminal apparatus selects $R_0$, $R_{1\_l}$, and $R_{2\_l}$. Alternatively, a quantity of selected resources may be equal to the target quantity of resources. Details are not described.

Figure 10B:
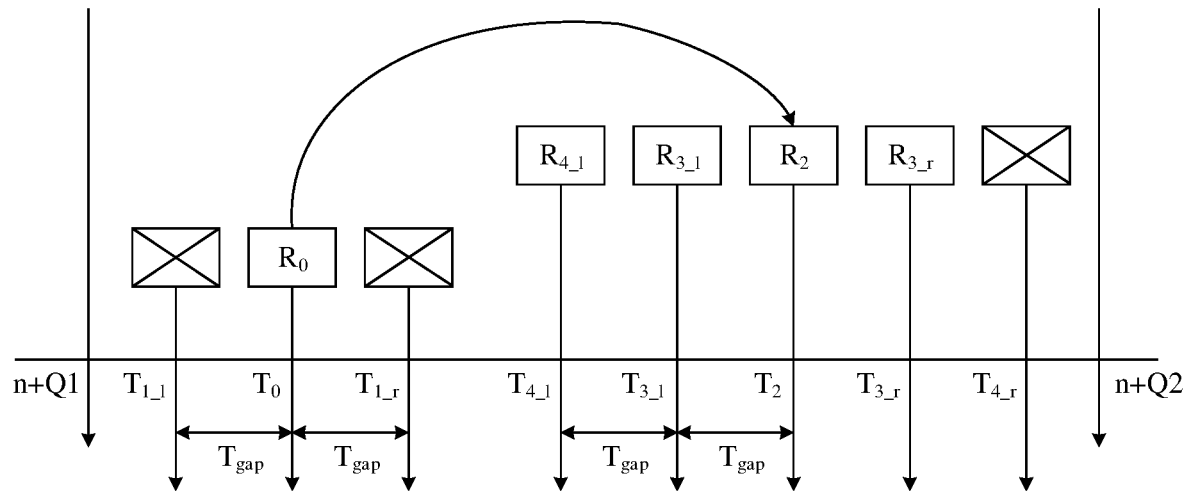

As shown in FIG. 10B, if no candidate resource exists in the slot $T_{2\_l}$, and no candidate resource exists in the slot $T_{2\_r}$, the first terminal apparatus may reselect an initial resource. In this case, the first terminal apparatus may abandon the selected resource $R_0$, and reselect a resource from the resource pool. For example, the first terminal apparatus reselects a resource $R_2$.

After selecting the resource $R_2$, the first terminal apparatus may continue to select a resource for the first data based on the first time gap $T_{gap}$. For example, for the resource $R_2$ selected for the second time, a slot $T_2$ in which the resource $R_2$ is located is moved forward for $T_{gap}$ to obtain a slot $T_{3\_l}$, and is moved backward for $T_{gap}$ to obtain a slot $T_{3\_r}$. For example, if a candidate resource $R_{3\_l}$ exists in the slot $T_{3\_l}$, and a candidate resource $R_{3\_r}$ exists in the slot $T_{3\_r}$, the first terminal apparatus may move the slot $T_{3\_l}$ forward for $T_{gap}$ to obtain a slot $T_{4\_l}$, and move the slot $T_{3\_r}$ backward for $T_{gap}$ to obtain a slot $T_{4\_r}$. For example, if a candidate resource $R_{4\_l}$ exists in the slot $T_{4\_l}$, and no candidate resource exists in the slot $T_{4\_r}$, the first terminal apparatus may determine final resources from $R_2$, $R_{3\_l}$, $R_{3\_r}$, and $R_{4\_l}$. For example, the first terminal apparatus selects $R_2$, $R_{3\_l}$, and $R_{3\_r}$.

When $N_{MAX}=4$, the first terminal apparatus may select an initial resource $R_0$, namely, the first resource. A slot corresponding to the initial resource $R_0$ is $T_0$. Based on the first time gap $T_{gap}$, the first terminal apparatus moves the slot $T_0$ forward for $T_{gap}$ to obtain a slot $T_{1\_l}$, and moves $T_0$ backward for $T_{gap}$ to obtain a slot $T_{1\_r}$. Both the slot $T_{1\_l}$ and the slot $T_{1\_r}$ are time domain positions obtained through movement.

Figure 11A:
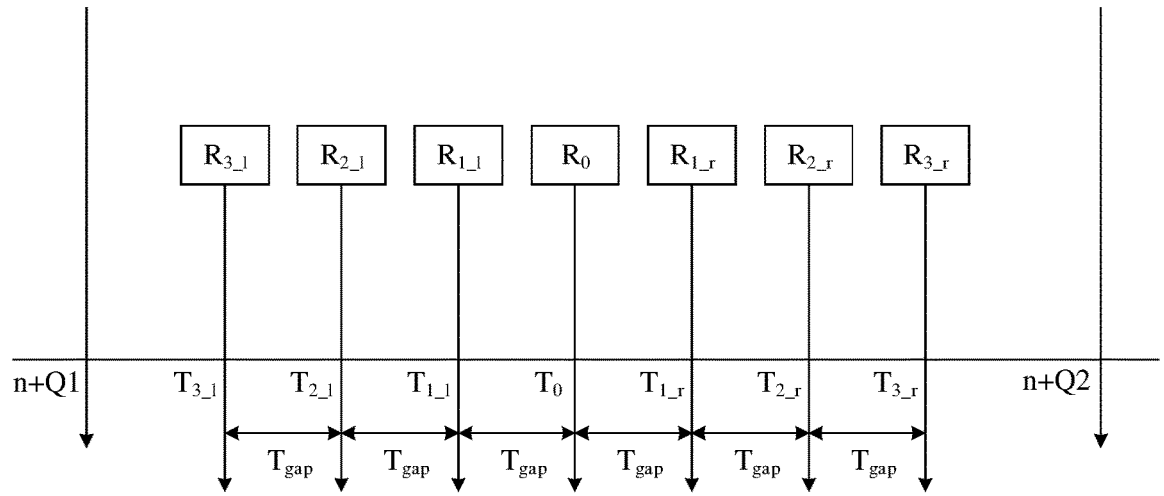
FIG. 11A and FIG. 11B are schematic diagrams of resource selection performed by a first terminal apparatus when a target quantity of resources is 4 according to an embodiment of this application.

As shown in FIG. 11A, if a candidate resource $R_{1\_l}$ exists in the slot $T_{1\_l}$, and a candidate resource $R_{1\_r}$ exists in the slot $T_{1\_r}$, the first terminal apparatus may move $T_{1\_l}$ forward for $T_{gap}$ to obtain a slot $T_{2\_l}$, and move $T_{1\_r}$ backward for $T_{gap}$ to obtain a slot $T_{2\_r}$.

If a candidate resource $R_{2\_l}$ exists in the slot $T_{2\_l}$, and a candidate resource $R_{2\_r}$ exists in the slot $T_{2\_r}$, the first terminal apparatus may move $T_{2\_l}$ forward for $T_{gap}$ to obtain a slot $T_{3\_l}$, and move $T_{2\_r}$ backward for $T_{gap}$ to obtain a slot $T_{3\_r}$. If a candidate resource $R_{3\_l}$ exists in the slot $T_{3\_l}$, and a candidate resource $R_{3\_r}$ exists in the slot $T_{3\_r}$, the first terminal apparatus may determine final resources from $R_0$, $R_{1\_l}$, $R_{1\_r}$, $R_{2\_l}$, $R_{2\_r}$, $R_{3\_l}$ and $R_{3\_r}$. In this case, a quantity of selected resources is greater than the target quantity of resources. For example, the first terminal apparatus may randomly select four adjacent resources from the seven resources as resources for sending the first data. For example, the first terminal apparatus selects $R_0$, $R_{1\_r}$, $R_{2\_r}$, and $R_{3\_r}$. Alternatively, a quantity of selected resources may be equal to the target quantity of resources. Details are not described.

Figure 11B:
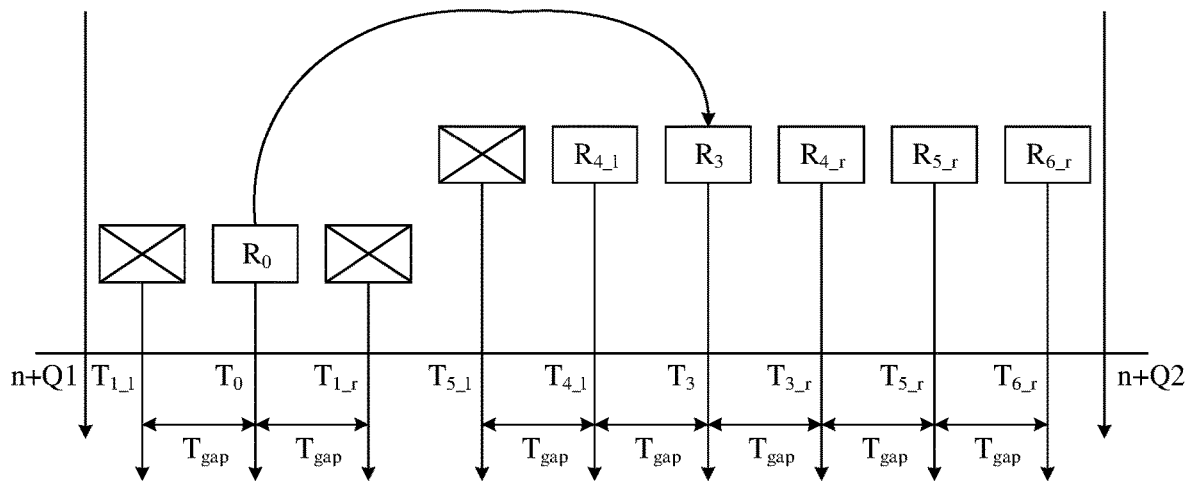

As shown in FIG. 11B, if no candidate resource $R_{1\_l}$ exists in the slot $T_{1\_l}$, and no candidate resource $R_{1\_r}$ exists in the slot $T_{1\_r}$, the first terminal apparatus may reselect an initial resource. In this case, the first terminal apparatus may abandon the selected resource $R_0$, and reselect a resource from the resource pool. For example, the first terminal apparatus reselects a resource $R_3$.

After selecting the resource $R_3$, the first terminal apparatus may continue to select a resource for the first data based on the first time gap $T_{gap}$. For example, for the resource $R_3$ selected for the second time, a slot $T_3$ in which the resource $R_3$ is located is moved forward for $T_{gap}$ to obtain a slot $T_{4\_l}$, and is moved backward for $T_{gap}$ to obtain a slot $T_{4\_r}$. For example, if a candidate resource $R_{4\_l}$ exists in the slot $T_{4\_l}$, and a candidate resource $R_{4\_r}$ exists in the slot $T_{4\_r}$, the first terminal apparatus may move the slot $T_{4\_l}$ forward for $T_{gap}$ to obtain a slot $T_{5\_l}$, and move the slot $T_{4\_r}$ backward for $T_{gap}$ to obtain a slot $T_{5\_r}$. For example, if no candidate resource exists in the slot $T_{5\_l}$, and a candidate resource $R_5$, exists in the slot $T_{5\_r}$, the first terminal apparatus may move the slot $T_{5\_r}$ backward for $T_{gap}$ to obtain a slot $T_{6\_r}$. For example, if a candidate resource $R_{6\_r}$ exists in the slot $T_{6\_r}$, the first terminal apparatus may determine final resources from $R_3$, $R_{4\_l}$, $R_{4\_r}$, $R_{5\_r}$, and $R_{6\_r}$. For example, the first terminal apparatus determines $R_3$, $R_{4\_r}$, $R_{5\_r}$, and $R_{6\_r}$.

The foregoing is some examples of the first case in the first selection manner. There may be a second selection manner in which the first terminal apparatus selects the at least one resource for the first data from the candidate resource other than the first resource in the candidate resources based on the first resource and the first gap. The second selection manner is described below.

2. Second Selection Manner:

In the second selection manner, a requirement on a gap between selected resources is low. For example, a time gap between adjacent resources does not need to be strictly the first time gap, but only needs to be greater than or equal to the first time gap. Alternatively, a frequency gap between adjacent resources does not need to be strictly the first frequency gap, but only needs to be greater than or equal to the first frequency gap. In this way, the selection condition is more relaxed, more facilitates the resource selection, and helps improve the resource selection success rate. In addition, the second selection manner is also classified into three cases.

In a first case, the first gap includes only the first time gap and does not include the first frequency gap; or the first gap includes the first time gap and the first frequency gap, but the first frequency gap is 0. This case may mean that frequencies of two adjacent resources in the resources that need to be selected are the same. In this case, the first terminal apparatus may move a time domain position of the first resource as a reference time domain position forward and/or backward in time domain for the first time gap, and may select a resource from a first range corresponding to a time domain position obtained through movement, where the selected resource is a part or all of the at least one resource. The first range does not include a time domain position between the reference time domain position and the time domain position obtained through movement.

If a candidate resource corresponding to the time domain position obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If a candidate resource corresponding to the time domain position obtained through movement is a part of the at least one resource, it indicates that a current resource selection process of the first terminal apparatus has not ended. For example, the first terminal apparatus moves the time domain position of the first resource as the reference time domain position forward in time domain for the first time gap, and may select a resource from a first range corresponding to a time domain position obtained through movement. The first range corresponding to the time domain position obtained through movement may include one or more candidate resources, and the first terminal apparatus has a larger selection range. For example, if the first terminal apparatus selects a resource 8 from the first range corresponding to the time domain position obtained through movement, the first terminal apparatus may select the resource 8, in other words, the resource 8 may be used as one of the at least one resource. If a quantity of currently selected resources is less than the target quantity of resources, the first terminal apparatus may further move a time domain position of the resource 8 as the reference time domain position forward in time domain for the first time gap, and select a resource from a first range corresponding to a time domain position obtained through movement. For example, the first terminal apparatus selects a resource 9 from the first range corresponding to the time domain position obtained through movement, in other words, the resource 9 may be used as one of the at least one resource. If a quantity of currently selected resources is less than the target quantity of resources, the first terminal apparatus may further move a time domain position of the resource 9 as the reference time domain position forward in time domain for the first time gap. The rest can be deduced by analogy until a quantity of selected resources is greater than or equal to the target quantity of resources, or until no candidate resource exists in a time domain position obtained through movement. A manner in which the first terminal apparatus selects a resource by moving the time domain position of the first resource as the reference time domain position backward in time domain for the first time gap is the same as the foregoing manner of selecting the resource by moving the time domain position of the first resource forward for the first time gap.

Figure 12:
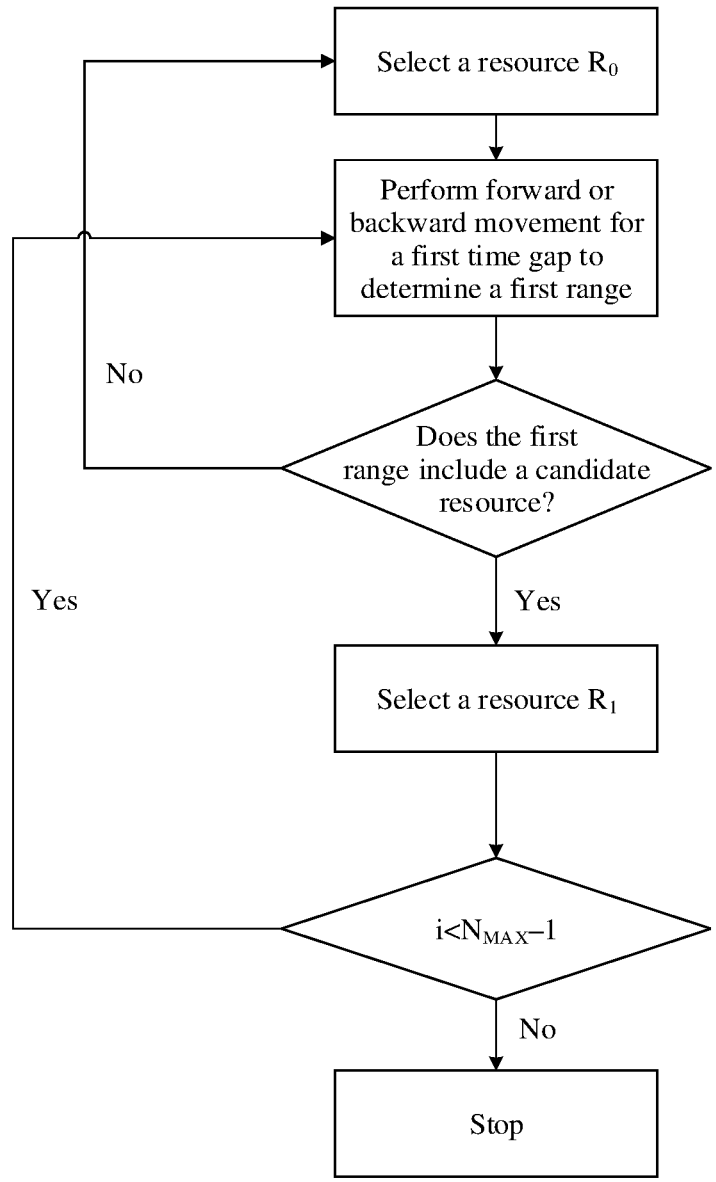
FIG. 12 is a flowchart of a resource selection method used by a first terminal apparatus if a first frequency gap is 0 according to an embodiment of this application.

It is assumed that the first frequency gap is 0. For a procedure for a resource selection method used by the first terminal apparatus under the selection condition of the first time gap, refer to FIG. 12.

The first terminal apparatus selects an initial resource $R_i$ for the first data from the candidate resources included in the resource pool. For example, a slot corresponding to the initial resource $R_i$ is $T_i$.

For example, the first terminal apparatus may randomly select the initial resource $R_i$, where i is, for example, 0. The initial resource $R_i$ is the first resource.

The first terminal apparatus moves $T_i$ forward or backward for the first time gap (for example, $T_{gap}$) based on $T_{gap}$ to obtain $T_{i+1}$, where $T_{i+1}$ is a time domain position obtained through movement, for example, a slot obtained through movement.

The first terminal apparatus may determine a first range. In this case, the first range does not include a candidate resource between $T_i$ and $T_{i+1}$.

If the first range includes no candidate resource, the first step is repeatedly performed, that is, an initial resource $R_i$ is selected for the first data from the candidate resources included in the resource pool, where for example, i is 1. This is equivalent to resource reselection.

Alternatively, if the first range includes a candidate resource, the first terminal apparatus may select a next resource $R_{i+1}$ from the first range, where a slot corresponding to the resource $R_{i+1}$ is $T_{i+1}$.

If $i+1<N_{MAX}-1$, $i=i+1$, and the first step is repeatedly performed. If $i+1 \geq N_{MAX}-1$, it indicates that a quantity of selected resources is greater than or equal to the target quantity of resources, new resource selection may be stopped, and final resources are determined from selected candidate resources.

In a second case, the first gap includes only the first frequency gap and does not include the first time gap; or the first gap includes the first time gap and the first frequency gap, but the first time gap is 0. This case may mean that a time gap between two adjacent resources in the resources that need to be selected is 0. In this case, the first terminal apparatus may move a frequency domain position of the first resource as a reference frequency domain position upward and/or downward in frequency domain for the first frequency gap, and may select a resource from a second range corresponding to a frequency domain position obtained through movement, where the selected resource is a part or all of the at least one resource. The second range does not include a frequency domain position between the reference frequency domain position and the frequency domain position obtained through movement. Upward movement in frequency domain is understood as, for example, movement toward a high frequency direction, and downward movement in frequency domain is understood as, for example, movement toward a low frequency direction.

If a candidate resource corresponding to the frequency domain position obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If a candidate resource corresponding to the frequency domain position obtained through movement is a part of the at least one resource, it indicates that a current resource selection process of the first terminal apparatus has not ended. For example, the first terminal apparatus moves the frequency domain position of the first resource as the reference frequency domain position upward in frequency domain for the first frequency gap, and may select a resource from a second range corresponding to a frequency domain position obtained through movement. The second range corresponding to the frequency domain position obtained through movement may include one or more candidate resources, and the first terminal apparatus has a larger selection range. For example, if the first terminal apparatus selects a resource 10 from the second range corresponding to the frequency domain position obtained through movement, the first terminal apparatus may select the resource 10, in other words, the resource 10 may be used as one of the at least one resource. If a quantity of currently selected resources is less than the target quantity of resources, the first terminal apparatus may further move a frequency domain position of the resource 10 as the reference frequency domain position upward in frequency domain for the first frequency gap, and select a resource from a second range corresponding to a frequency domain position obtained through movement. For example, the first terminal apparatus selects a resource 11 from the second range corresponding to the frequency domain position obtained through movement, in other words, the resource 11 may be used as one of the at least one resource. If a quantity of currently selected resources is less than the target quantity of resources, the first terminal apparatus may further move a frequency domain position of the resource 11 as the reference frequency domain position upward in frequency domain for the first frequency gap. The rest can be deduced by analogy until a quantity of selected resources is greater than or equal to the target quantity of resources, or until no candidate resource exists in a frequency domain position obtained through movement. A manner in which the first terminal apparatus selects a resource by moving the frequency domain position of the first resource as the reference frequency domain position downward in frequency domain for the first frequency gap is the same as the foregoing manner of selecting the resource by moving the frequency domain position of the first resource upward for the first frequency gap.

In a third case, the first gap includes both the first frequency gap and the first time gap, and neither the first time gap nor the first frequency gap is 0. In this case, the first terminal apparatus needs to consider both a time domain condition and a frequency domain condition during resource selection. For example, the first terminal apparatus may move a time domain position of the first resource as a reference time domain position forward and/or backward in time domain for the first time gap, move a frequency domain position of the first resource as a reference frequency domain position upward and/or downward in frequency domain for the first frequency gap, and select a resource from a third range corresponding to both a time domain position and a frequency domain position that are obtained through movement, where the selected resource is a part or all of the at least one resource. The third range includes neither a time domain position between the reference time domain position and the time domain position obtained through movement nor a frequency domain position between the reference frequency domain position and the frequency domain position obtained through movement.

Forward and/or backward movement for the first time gap includes, for example, forward movement for the first time gap, backward movement for the first time gap, or forward and backward movement for the first time gap. Similarly, upward and/or downward movement for the first frequency gap includes, for example, upward movement for the first frequency gap, downward movement for the first frequency gap, or upward and downward movement for the first frequency gap.

If a candidate resource corresponding to both the time domain position and the frequency domain position that are obtained through movement is all of the at least one resource, it indicates that a current resource selection process of the first terminal apparatus ends. The reason may be as follows: The quantity of selected resources (namely, the total quantity of the first resource and the at least one resource) has been greater than or equal to the target quantity of resources; or no candidate resource that meets the selection condition exists in the remaining candidate resource, and the quantity of selected resources is less than the target quantity of resources. If a candidate resource corresponding to both the time domain position and the frequency domain position that are obtained through movement is a part of the at least one resource, it indicates that a current resource selection process of the first terminal apparatus has not ended. For example, the first terminal apparatus moves the frequency domain position of the first resource as the reference frequency domain position upward in frequency domain for the first frequency gap, moves the time domain position of the first resource as the reference time domain position forward in time domain for the first time domain gap, and selects a resource from a candidate resource included in a third range corresponding to both a time domain position and a frequency domain position that are obtained through movement. For example, the first terminal apparatus selects a resource 12, in other words, the resource 12 may be used as one of the at least one resource. If a quantity of currently selected resources is less than the target quantity of resources, the first terminal apparatus may further move a frequency domain position of the resource 12 as the reference frequency domain position upward in frequency domain for the first frequency gap, move a time domain position of the resource 12 as the reference time domain position forward in time domain for the first time gap, and select a resource from a candidate resource included in a third range (the third range in this case may be different from the previous third range) corresponding to both a time domain position and a frequency domain position that are obtained through movement. For example, if the candidate resource is a resource 13, the first terminal apparatus may select the resource 13, in other words, the resource 13 may be used as one of the at least one resource. If a quantity of currently selected resources is less than the target quantity of resources, the first terminal apparatus may further move a frequency domain position of the resource 13 as the reference frequency domain position upward in frequency domain for the first frequency gap, and move a time domain position of the resource 13 as the reference time domain position forward in time domain for the first time gap, to continue to select a resource. The rest can be deduced by analogy until a quantity of selected resources is greater than or equal to the target quantity of resources, or until no candidate resource exists in a third range corresponding to both a time domain position and a frequency domain position that are obtained through movement. A manner in which the first terminal apparatus selects a resource by moving the frequency domain position of the first resource as the reference frequency domain position downward in frequency domain for the first frequency gap and moving the time domain position of the first resource as the reference time domain position forward in time domain for the first time gap, selects a resource by moving the frequency domain position of the first resource as the reference frequency domain position upward in frequency domain for the first frequency gap and moving the time domain position of the first resource as the reference time domain position backward in time domain for the first time gap, or selects a resource by moving the frequency domain position of the first resource as the reference frequency domain position downward in frequency domain for the first frequency gap and moving the time domain position of the first resource as the reference time domain position backward in time domain for the first time gap is the same as the foregoing manner of selecting the resource by moving the frequency domain position of the first resource upward for the first frequency gap and moving the time domain position of the first resource forward for the first time gap.

The following uses the foregoing first case (that is, the first gap includes only the first time gap and does not include the first frequency gap; or the first gap includes the first time gap and the first frequency gap, but the first frequency gap is 0) and $N_{MAX}=3$ as an example. $N_{MAX}$ indicates the target quantity of resources.

Figure 13:
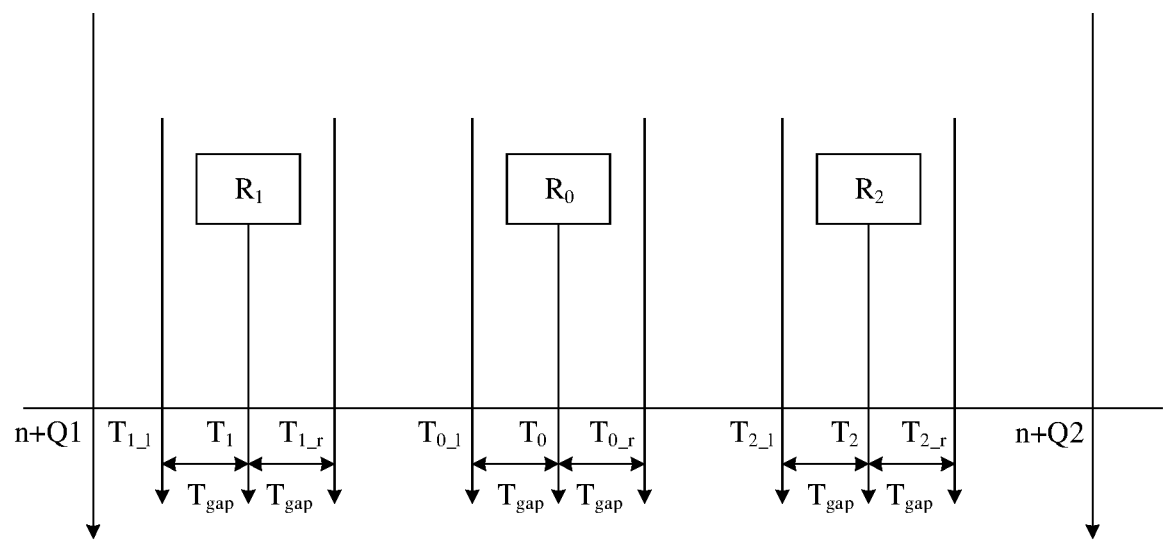
FIG. 13 is a schematic diagram of resource selection performed by a first terminal apparatus when a target quantity of resources is 3 according to an embodiment of this application.

Refer to FIG. 13. The first terminal apparatus may select an initial resource $R_0$, namely, the first resource, from the resource pool, where a slot corresponding to the initial resource $R_0$ is $T_0$. Based on the first time gap $T_{gap}$, the first terminal apparatus moves the slot $T_0$ forward for $T_{gap}$ to obtain a slot $T_{0\_l}$, and moves $T_0$ backward for $T_{gap}$ to obtain a slot $T_{0\_r}$. Both the slot $T_{0\_l}$ and the slot $T_{0\_r}$ are time domain positions obtained through movement. The first terminal apparatus may determine a first range. In this case, the first range includes neither a candidate resource between the slot $T_0$ and the slot $T_{0\_r}$ nor a candidate resource between the slot $T_0$ and the slot $T_{0\_l}$.

If the first range in this case includes a candidate resource, the first terminal apparatus may select a next resource $R_1$ from the first range, where a slot corresponding to the resource $R_1$ is $T_1$. Based on the first time gap $T_{gap}$, the first terminal apparatus moves the slot $T_1$ forward for $T_{gap}$ to obtain a slot $T_{1\_l}$, and moves $T_1$ backward for $T_{gap}$ to obtain a slot $T_{1\_r}$. Both the slot $T_{1\_l}$ and the slot $T_{1\_r}$ are time domain positions obtained through movement. The first terminal apparatus may determine a first range. In this case, the first range includes neither a candidate resource between the slot $T_1$ and the slot $T_{1\_r}$ nor a candidate resource between the slot $T_1$ and the slot $T_{1\_l}$.

If the first range in this case includes a candidate resource, the first terminal apparatus may select a next resource $R_2$ from the first range. Therefore, the first terminal apparatus has selected three resources, namely, $R_0$, $R_1$, and $R_2$. Alternatively, after selecting the three resources, the first terminal apparatus may further continue to perform selection. For example, based on the first time gap $T_{gap}$, the first terminal apparatus may move the slot $T_2$ in which the resource $R_2$ is located forward for $T_{gap}$ to obtain a slot $T_{2\_l}$, and move $T_2$ backward for $T_{gap}$ to obtain a slot $T_{2\_r}$. Both the slot $T_{2\_l}$ and the slot $T_{2\_r}$ are time domain positions obtained through movement. The first terminal apparatus may determine a first range. In this case, the first range includes neither a candidate resource between the slot $T_2$ and the slot $T_{2\_r}$ nor a candidate resource between the slot $T_2$ and the slot $T_{2\_l}$. The first terminal apparatus may continue to select a resource from the first range in this case. In this way, a quantity of selected resources may be greater than the target quantity of resources, and then the first terminal apparatus selects $N_{MAX}$ resources from the selected resources.

The foregoing examples of the first selection manner and the second selection manner are merely for ease of understanding the technical solution in this embodiment of this application, but are not intended to limit the solution provided in this embodiment of this application. For example, a value of $N_{MAX}$ may be larger or smaller, and only forward movement instead of backward movement may be performed during time domain movement. This is not limited in this embodiment of this application.

S73: The first terminal apparatus sends the first data to the second terminal apparatus on the selected resources, and the second terminal apparatus receives the first data from the first terminal apparatus on the selected resources.

After selecting the resources, the first terminal apparatus may send the first data to the second terminal apparatus on the selected resources. A quantity of resources used by the first terminal apparatus to send the first data may be equal to or less than the target quantity of resources. S73 is an optional step.

In this embodiment of this application, the quantity of available candidate resources included in the resource pool is greater than or equal to X % of the quantity of all candidate resources included in the resource pool. The value of X may be set based on different factors, for example, may be set based on the quantity of resources that need to be selected, may be set based on the quantity of resources that need to be selected and the first time gap, may be set based on the quantity of resources that need to be selected, the first time gap, and the first frequency gap, or may be set based on the service priority. For example, when the quantity of resources that need to be selected is large, X may be set to a large value. Alternatively, when the service priority is high, X may be set to a large value. If the value of X is large, a large quantity of resources are available, and the resource selection requirement can be met as much as possible, thereby improving the resource selection efficiency, and reducing the complexity in the resource selection process. In addition, as sufficient resources as possible are selected, to avoid that some transmission processes cannot be performed due to a lack of resources, thereby improving the transmission success rate. Moreover, in this embodiment of this application, the value of X is not fixed, but may be set based on different requirements, so that the resource selection process is more flexible.

Furthermore, in the resource selection process, if the quantity of selected resources is less than the target quantity of resources, and no candidate resource that meets the selection condition is available, reselection may be performed. In this reselection manner, sufficient resources may be selected as much as possible, thereby improving the resource selection success rate.

An overall resource allocation procedure and design in a mode-2 in NR-V2X are further improved in this embodiment of this application.

Figure 14:
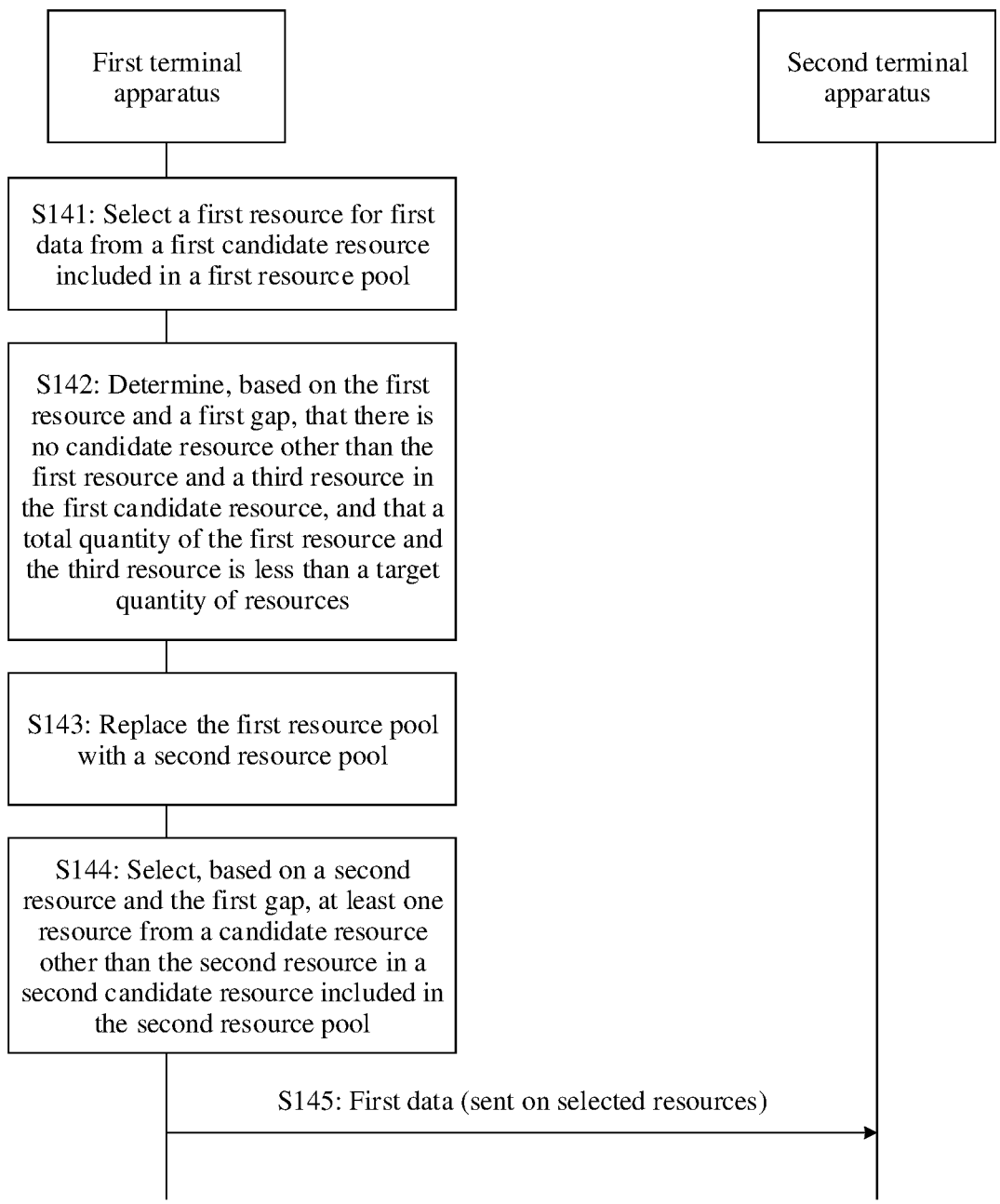
FIG. 14 is a flowchart of a second resource selection method according to an embodiment of this application.

To resolve the same technical problem, an embodiment of this application provides a second resource selection method. FIG. 14 is a flowchart of the method. In the following description process, an example in which the method is applied to the network architecture shown in FIG. 6 is used. In addition, the method may be performed by two communication apparatuses. The two communication apparatuses are, for example, a first communication apparatus and a second communication apparatus. The first communication apparatus or the second communication apparatus may be a network device or a communication apparatus that can support the network device to implement functions required in the method, may be a terminal device or a communication apparatus that can support the terminal device to implement functions required in the method, or certainly may be another communication apparatus, for example, a chip system. In addition, an implementation of the first communication apparatus or the second communication apparatus is not limited. For example, the two communication apparatuses may be implemented in a same form, for example, implemented in a device form. Alternatively, the two communication apparatuses may be implemented in different forms. For example, the first communication apparatus is implemented in a device form, and the second communication apparatus is implemented in a chip system form. The network device is, for example, a base station.

For ease of description, the following uses an example in which the method is performed by terminal apparatuses, to be specific, an example in which the first communication apparatus is a terminal apparatus (for example, referred to as a first terminal apparatus) and the second communication apparatus is also a terminal apparatus (for example, referred to as a second terminal apparatus). The example in which this embodiment is applied to the network architecture shown in FIG. 6 is used. Therefore, the first terminal apparatus below may implement functions of the terminal device 1 in the network architecture shown in FIG. 6, and the second terminal apparatus below may implement functions of the terminal device 2 in the network architecture shown in FIG. 6 For example, the first terminal apparatus is a signal transmit end, and the second terminal apparatus is a signal receive end.

S141: The first terminal apparatus selects a first resource for first data from a first candidate resource included in a resource pool, where the candidate resource includes a resource whose reference signal received power is less than or equal to a first threshold.

The first terminal apparatus is to transmit data, for example, the first data, and may select a resource for the first data from the candidate resource included in the first resource pool. The first candidate resource herein is an available resource in resources included in the first resource pool, for example, is the resource whose RSRP obtained by the first terminal apparatus through measurement is less than or equal to the first threshold. The first candidate resource may include one or more candidate resources. The first threshold is, for example, $Th_{RSRP}$ described above, or may be another threshold. The first resource pool is, for example, the resource selection window described above.

In this embodiment of this application, a current value, for example, 20, may continue to be used for X. Alternatively, a value of X may be the same as that in the embodiment shown in FIG. 7. For details, refer to related description of S71 in the embodiment shown in FIG. 7.

In this embodiment of this application, when needing to select resources, the first terminal apparatus may first select one resource, for example, the first resource. After being selected, the first resource may be used as a reference to perform subsequent resource selection.

S142: The first terminal apparatus determines, based on the first resource and a first gap, that there is no candidate resource other than the first resource and a third resource in the first candidate resource (that is, determines that there is no available resource other than the first resource and the third resource in the first candidate resource), and that a total quantity of the first resource and the third resource is less than a target quantity of resources.

The third resource includes a selected resource other than the first resource in the first candidate resource. The first gap needs to be met during resource selection. The first gap may include a first time gap, include a first frequency gap, or include a first time gap and a first frequency gap. The third resource may include one or more resources. The first time gap may be a time gap satisfied by two adjacent resources in resources that need to be selected. For example, the first time gap may be $T_{gap}$ above, or may be a time gap that is set in this embodiment of this application. The first frequency gap may be a frequency gap satisfied by two adjacent resources in the resources that need to be selected. For example, if both the first resource and the third resource are selected resources, the first time gap may be a time gap satisfied by two adjacent resources in the first resource and the third resource, and the first frequency gap may be a frequency gap satisfied by two adjacent resources in the first resource and the third resource. In other words, a quantity of resources selected by the first terminal apparatus is less than the target quantity of resources, but no candidate resource that meets a selection condition is available for selection.

In an optional manner, the target quantity of resources for the first data may be related to QoS of the first data, may be related to configuration information of a resource pool (for example, related to configuration information of the first resource pool), or may be related to QoS of the first data and configuration information of a resource pool (for example, configuration information of the first resource pool). That the target quantity of resources is related to the QoS of the first data may also be understood as: The target quantity of resources is related to QoS of a service corresponding to the first data. For the configuration information of the resource pool and the like, refer to the description of S71 in the embodiment shown in FIG. 7.

S143: The first terminal apparatus may replace the first resource pool with a second resource pool.

In this embodiment of this application, if a total quantity of the first resource and at least one resource is greater than or equal to the target quantity of resources, the first terminal apparatus may stop a resource selection process, and send the first data on the selected resources. Alternatively, if a total quantity of the first resource and at least one resource is less than the target quantity of resources, and a candidate resource that meets the selection condition exists in a remaining candidate resource (the selection condition may be understood as the first gap), the first terminal apparatus may continue to perform selection. Alternatively, if a total quantity of the first resource and at least one resource is less than the target quantity of resources, but no candidate resource that meets the selection condition exists in a remaining candidate resource, the first terminal apparatus may stop a resource selection process. Although a quantity of selected resources is less than the target quantity of resources, the first terminal apparatus still sends the first data on the selected resources. Alternatively, in this case, the first terminal apparatus may perform reselection. If the first terminal apparatus performs reselection, the first terminal apparatus may replace the first resource pool with the second resource pool.

The first terminal apparatus may replace the first resource pool with the second resource pool in different manners.

For example, in a manner, the first terminal apparatus may move a time domain end position of the first resource pool backward in time domain for first duration, to obtain the second resource pool. For example, a time domain start position of the first resource pool is T1, and the time domain end position is T2. The first terminal apparatus may move the time domain end position of the first resource pool backward from T2 for the first duration to T3, to obtain the second resource pool, where a time domain start position of the second resource pool is T1, and a time domain end position of the second resource pool is T3. In other words, in this manner, the first resource pool is extended, so that an extended first resource pool (namely, the second resource pool) includes more candidate resources.

This manner is equivalent to sliding a time domain position of the resource pool to increase candidate resources, to increase a minimum range that corresponds to X and that is for final and actual resource selection. Therefore, this manner may also be considered as a manner of implicitly configuring the value of X.

For another example, in another manner, the first terminal apparatus may move a time domain start position of the first resource pool backward in time domain for second duration, and move a time domain end position of the first resource pool backward in time domain for third duration, to obtain the second resource pool. For example, the time domain start position of the first resource pool is T1, and the time domain end position of the first resource pool is T2. The first terminal apparatus may move the time domain start position of the first resource pool backward from T1 for the second duration to T4, and may move the time domain end position of the first resource pool backward from T2 for the third duration to T5, to obtain the second resource pool, where a time domain start position of the second resource pool is T4, and a time domain end position of the second resource pool is T5. In this manner, the first resource pool and the second resource pool may have an intersection, or may not have an intersection, and a time domain length of the first resource pool may be equal to or not equal to a time domain length of the second resource pool.

The first duration, the second duration, or the third duration may be configured by a network device, may be preconfigured in the first terminal apparatus, may be specified in a protocol, or may be set in another manner. The first duration, the second duration, and the third duration may be equal, or may not be equal; or any two of the first duration, the second duration, and the third duration are equal. This is not specifically limited.

In either of the foregoing manners, a new candidate resource may be introduced, thereby improving a resource selection success rate.

S144: The first terminal apparatus may select, based on a second resource in the second resource pool and the first gap, at least one resource from a candidate resource other than the second resource in a second candidate resource included in the second resource pool.

The second candidate resource herein is an available resource in resources included in the second resource pool, for example, is a resource whose RSRP obtained by the first terminal apparatus through measurement is less than or equal to the first threshold. The second candidate resource may include one or more candidate resources.

After the resource pool is changed, the first terminal apparatus may reselect a resource for the first data from the second resource pool.

The second resource and the first resource may be a same resource. This manner is applicable to a case in which the first resource exists in the second resource pool. That is, if the first resource exists in the second resource pool, the first terminal apparatus may not need to reselect the first resource, but continues to select a subsequent resource with reference to the first resource.

Alternatively, the second resource and the first resource may be different resources. For example, the first resource does not exist in the second resource pool. In this case, the first terminal apparatus may reselect a resource from the second resource pool. Alternatively, even if the first resource exists in the second resource pool, the first terminal apparatus may still reselect a resource from the second resource pool.

Figure 15:
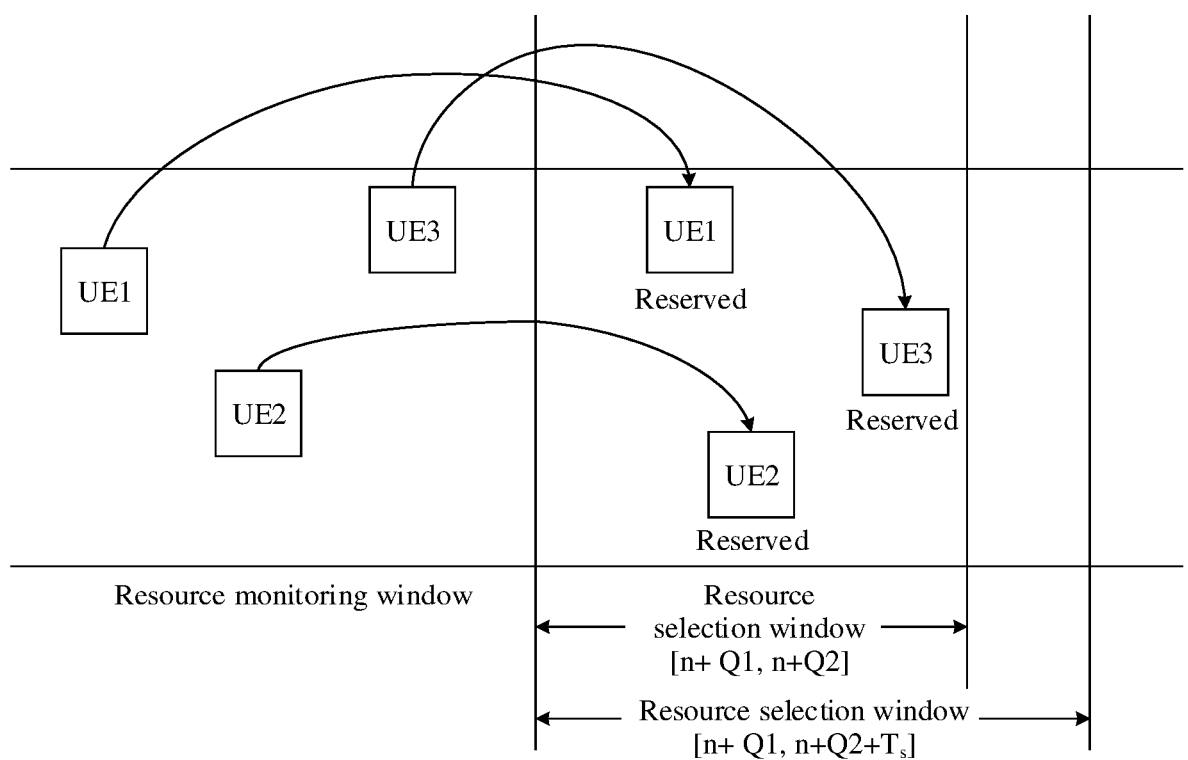
FIG. 15 is a schematic diagram of a manner of replacing a resource pool by a first terminal apparatus according to an embodiment of this application.

For example, as shown in FIG. 15, if $N_{MAX}$ resources that meet requirements of the first time gap $T_{gap}$ and/or the first frequency gap $F_{gap}$ cannot be found when the target quantity $N_{MAX}$ of resources is fixed and the first time gap $T_{gap}$ and/or the first frequency gap $F_{gap}$ are/is fixed, the first terminal apparatus may slide a first resource pool [n+Q1, n+Q2] to [n+Q1, n+Q2+$T_s$], where $T_s$ is a window sliding interval. The first terminal apparatus performs resource reselection in the second resource pool [n+Q1, n+Q2+$T_s$]. If $N_{MAX}$ resources that meet the requirements of the first time gap $T_{gap}$ and/or the first frequency gap $F_{gap}$ still cannot be found in the second resource pool, the first terminal apparatus may continue to slide the second resource pool, for example, to [n+Q1, n+Q2+2×$T_s$], where for example, [n+Q1, n+Q2+2×$T_s$] is referred to as a third resource pool. The foregoing process is repeated, and sliding is not stopped until an upper limit (for example, a time domain end position) of an obtained resource pool is greater than a latency requirement of the resource selection or until $N_{MAX}$ resources are selected, and the selected resources are used as a final resource selection result.

There may also be different selection manners in which the first terminal apparatus selects the at least one resource for the first data from the candidate resource other than the second resource in the second candidate resource based on the second resource and the first gap. Examples are used for description below.

1. First Selection Manner:

In the first selection manner, a gap between two adjacent resources in the selected resources needs to be equal to the first gap. The first selection manner is further classified into three cases.

In a first case, the first gap includes only the first time gap and does not include the first frequency gap; or the first gap includes the first time gap and the first frequency gap, but the first frequency gap is 0. This case may mean that frequencies of two adjacent resources in the resources that need to be selected are the same. In this case, the first terminal apparatus may move a time domain position of the second resource as a reference time domain position forward and/or backward in time domain for the first time gap, where a candidate resource corresponding to a time domain position obtained through movement may be used as a part or all of the at least one resource. For specific description of this case, refer to related description of S72 in the embodiment shown in FIG. 7.

Figure 16:
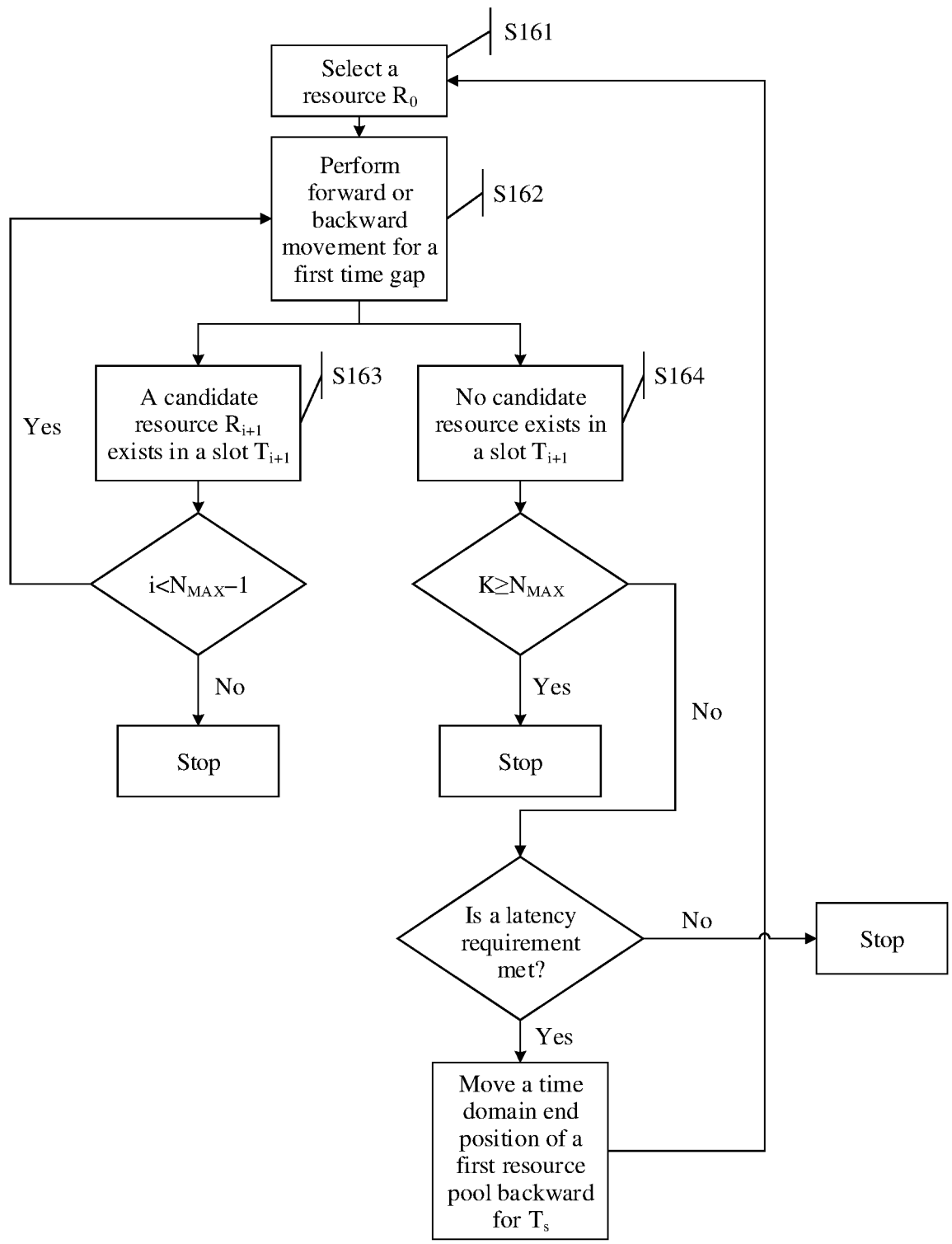
FIG. 16 is a flowchart of a resource selection method used by a first terminal apparatus if a first frequency gap is 0 according to an embodiment of this application.

For example, it is assumed that the first frequency gap is 0. For a procedure for a resource selection method used by the first terminal apparatus under the selection condition of the first time gap, refer to FIG. 16.

S161: The first terminal apparatus selects an initial resource $R_i$ for the first data from the candidate resource included in the resource pool. For example, a slot corresponding to the initial resource $R_i$ is $T_i$.

For example, the first terminal apparatus may randomly select the initial resource $R_i$, where i is, for example, 0. The initial resource $R_i$ is the first resource.

S162: The first terminal apparatus moves $T_i$ forward or backward for the first time gap (for example, $T_{gap}$) based on $T_{gap}$ to obtain $T_{i+1}$, where $T_{i+1}$ is a time domain position obtained through movement, for example, a slot obtained through movement.

S163: A candidate resource $R_{i+1}$ exists in the slot $T_{i+1}$.

$N_{MAX}$ indicates the target quantity of resources. If i+1<$N_{MAX}$−1, i=i+1, and S162 is repeatedly performed. Alternatively, if i+1≥$N_{MAX}$−1, it indicates that a quantity of selected resources is greater than or equal to the target quantity of resources, new resource selection may be stopped, and final resources are determined from selected candidate resources.

S164: No candidate resource $R_{1+1}$ exists in the slot $T_{i+1}$.

If $N_{MAX}$, it indicates that a quantity of selected resources is greater than or equal to the target quantity of resources, new resource selection may be stopped, and final resources are determined from selected candidate resources. Alternatively, if K<$N_{MAX}$, and the latency requirement is met after the time domain end position of the first resource pool is moved backward, the first resource pool may be replaced with the second resource pool. For example, the time domain end position of the first resource pool is moved backward for $T_s$ to obtain the second resource pool. After the second resource pool is obtained, S161 or S162 may be repeatedly performed. K represents the quantity of selected candidate resources.

In a second case, the first gap includes only the first frequency gap and does not include the first time gap; or the first gap includes the first time gap and the first frequency gap, but the first time gap is 0. This case may mean that a time gap between two adjacent resources in the resources that need to be selected is 0. In this case, the first terminal apparatus may move a frequency domain position of the second resource as a reference frequency domain position upward and/or downward in frequency domain for the first frequency gap, where a candidate resource corresponding to a frequency domain position obtained through movement may be used as a part or all of the at least one resource. Upward movement in frequency domain is understood as, for example, movement toward a high frequency direction, and downward movement in frequency domain is understood as, for example, movement toward a low frequency direction. For specific description of this case, refer to related description of S72 in the embodiment shown in FIG. 7.

In a third case, the first gap includes both the first frequency gap and the first time gap, and neither the first time gap nor the first frequency gap is 0. In this case, the first terminal apparatus needs to consider both a time domain condition and a frequency domain condition during resource selection. For example, the first terminal apparatus may move a time domain position of the second resource as a reference time domain position forward and/or backward in time domain for the first time gap, and move a frequency domain position of the second resource as a reference frequency domain position upward and/or downward in frequency domain for the first frequency gap, where a candidate resource corresponding to both a time domain position and a frequency domain position that are obtained through movement may be used as a part or all of the at least one resource.

Forward and/or backward movement for the first time gap includes, for example, forward movement for the first time gap, backward movement for the first time gap, or forward and backward movement for the first time gap. Similarly, upward and/or downward movement for the first frequency gap includes, for example, upward movement for the first frequency gap, downward movement for the first frequency gap, or upward and downward movement for the first frequency gap.

For specific description of this case, refer to related description of S72 in the embodiment shown in FIG. 7.

The following describes the resource selection process by using the foregoing first case (that is, the first gap includes only the first time gap and does not include the first frequency gap; or the first gap includes the first time gap and the first frequency gap, but the first frequency gap is 0) and $N_{MAX}=4$ as an example. $N_{MAX}$ indicates the target quantity of resources.

Figure 17:
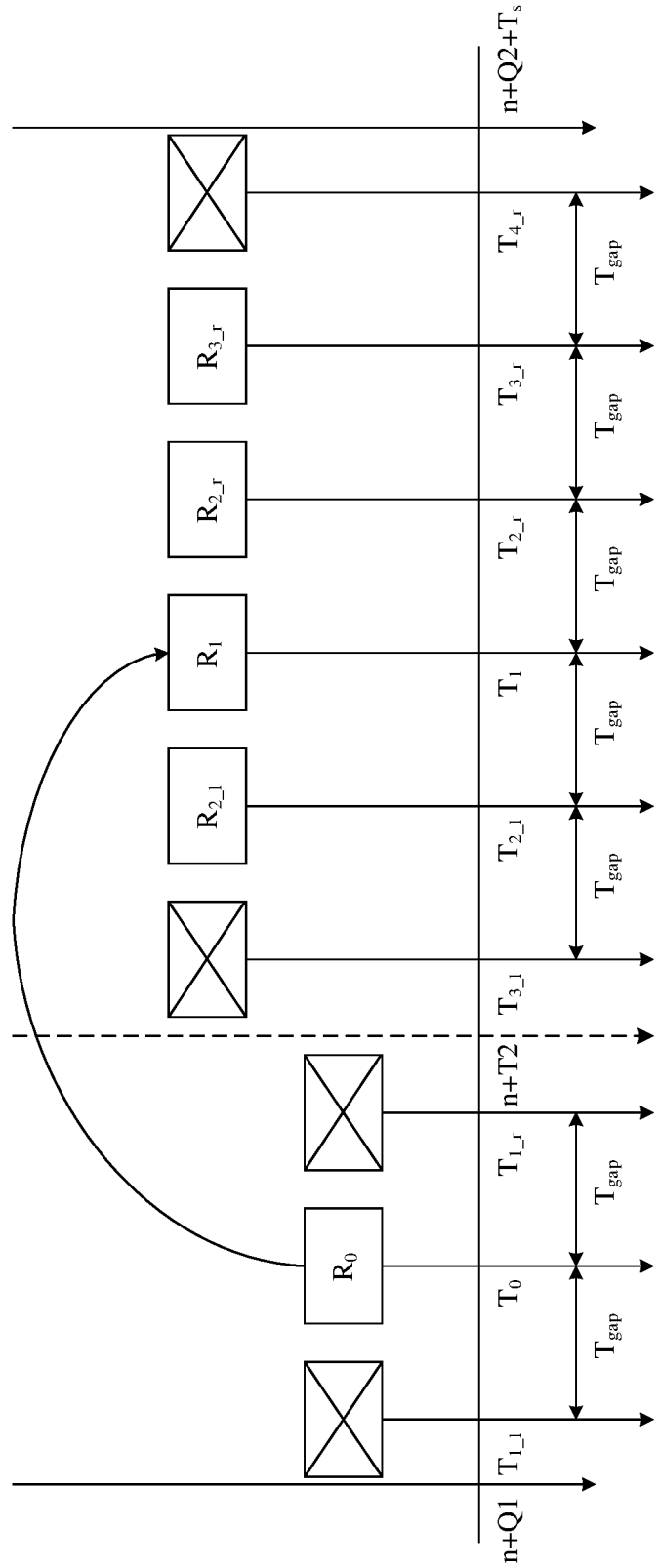
FIG. 17 is a schematic diagram of resource selection performed by a first terminal apparatus when a target quantity of resources is 4 according to an embodiment of this application.

Refer to FIG. 17. The first resource pool is [n+Q1, n+Q2], the first terminal apparatus selects an initial resource $R_0$ from the first resource pool, and a slot corresponding to the initial resource $R_0$ is $T_0$. Based on the first time gap $T_{gap}$, the first terminal apparatus moves the slot $T_0$ forward for $T_{gap}$ to obtain a slot $T_{1\_l}$, and moves $T_0$ backward for $T_{gap}$ to obtain a slot $T_{1\_r}$. Both the slot $T_{1\_l}$ and the slot $T_{1\_r}$ are time domain positions obtained through movement.

If no candidate resource $R_{1\_l}$ exists in the slot $T_{1\_l}$, no candidate resource $R_{1\_r}$ exists in the slot $T_{1\_r}$, and the latency requirement is still met after the time domain end position of the first resource pool is moved backward for $T_s$, the first resource pool may be replaced with the second resource pool [n+Q1, n+Q2+$T_s$]. The first terminal apparatus may reselect a resource $R_1$ from the second resource pool. Alternatively, if $R_0$ is also included in the second resource pool, the first terminal apparatus may continue to use $R_0$ as a selected resource. FIG. 17 uses an example in which the first terminal apparatus reselects $R_1$, where a slot corresponding to $R_1$ is $T_1$.

Based on the first time gap $T_{gap}$, the first terminal apparatus moves the slot $T_1$ forward for $T_{gap}$ to obtain a slot $T_{2\_l}$, and moves $T_1$ backward for $T_{gap}$ to obtain a slot $T_{2\_r}$. Both the slot $T_{2\_l}$ and the slot $T_{2\_r}$ are time domain positions obtained through movement.

If a candidate resource $R_{2\_l}$ exists in the slot $T_{2\_l}$, and a candidate resource $R_{2\_r}$ exists in the slot $T_{2\_r}$, based on the first time gap $T_{gap}$, the first terminal apparatus moves the slot $T_{2\_l}$ forward for $T_{gap}$ to obtain a slot $T_{3\_l}$, and moves the slot $T_{2\_r}$ backward for $T_{gap}$ to obtain a slot $T_{3\_r}$. Both the slot $T_{3\_l}$ and the slot $T_{3\_r}$ are time domain positions obtained through movement.

For example, if no candidate resource $R_{3\_l}$ exists in the slot $T_{3\_l}$, but a candidate resource $R_{3\_r}$ exists in the slot $T_{3\_r}$, the first terminal apparatus moves $T_{3\_r}$ backward for $T_{gap}$ based on the first time gap $T_{gap}$ to obtain a slot $T_{4\_r}$. For example, if no candidate resource exists in the slot $T_{4\_r}$, the first terminal apparatus may determine $R_1$, $R_{2\_l}$, $R_{2\_r}$, and $R_{3\_r}$ as finally selected resources.

The foregoing is some examples of the first case in the first selection manner. There may be further a second selection manner in which the first terminal apparatus selects the at least one resource for the first data from the candidate resource other than the first resource in the candidate resource based on the first resource and the first gap. The second selection manner is described below.

2. Second Selection Manner

In the second selection manner, a requirement on a gap between selected resources is low. For example, a time gap between adjacent resources does not need to be strictly the first time gap, but only needs to be greater than or equal to the first time gap. Alternatively, a frequency gap between adjacent resources does not need to be strictly the first frequency gap, but only needs to be greater than or equal to the first frequency gap. In this way, the selection condition is more relaxed, more facilitates the resource selection, and helps improve the resource selection success rate. In addition, the second selection manner is also classified into three cases.

In a first case, the first gap includes only the first time gap and does not include the first frequency gap; or the first gap includes the first time gap and the first frequency gap, but the first frequency gap is 0. This case may mean that frequencies of two adjacent resources in the resources that need to be selected are the same. In this case, the first terminal apparatus may move a time domain position of the second resource as a reference time domain position forward and/or backward in time domain for the first time gap. The first terminal apparatus may select a resource from a first range corresponding to a time domain position obtained through movement, where the selected resource is a part or all of the at least one resource. The first range does not include a time domain position between the reference time domain position and the time domain position obtained through movement. For specific description of this case, refer to related description of S72 in the embodiment shown in FIG. 7.

Figure 18:
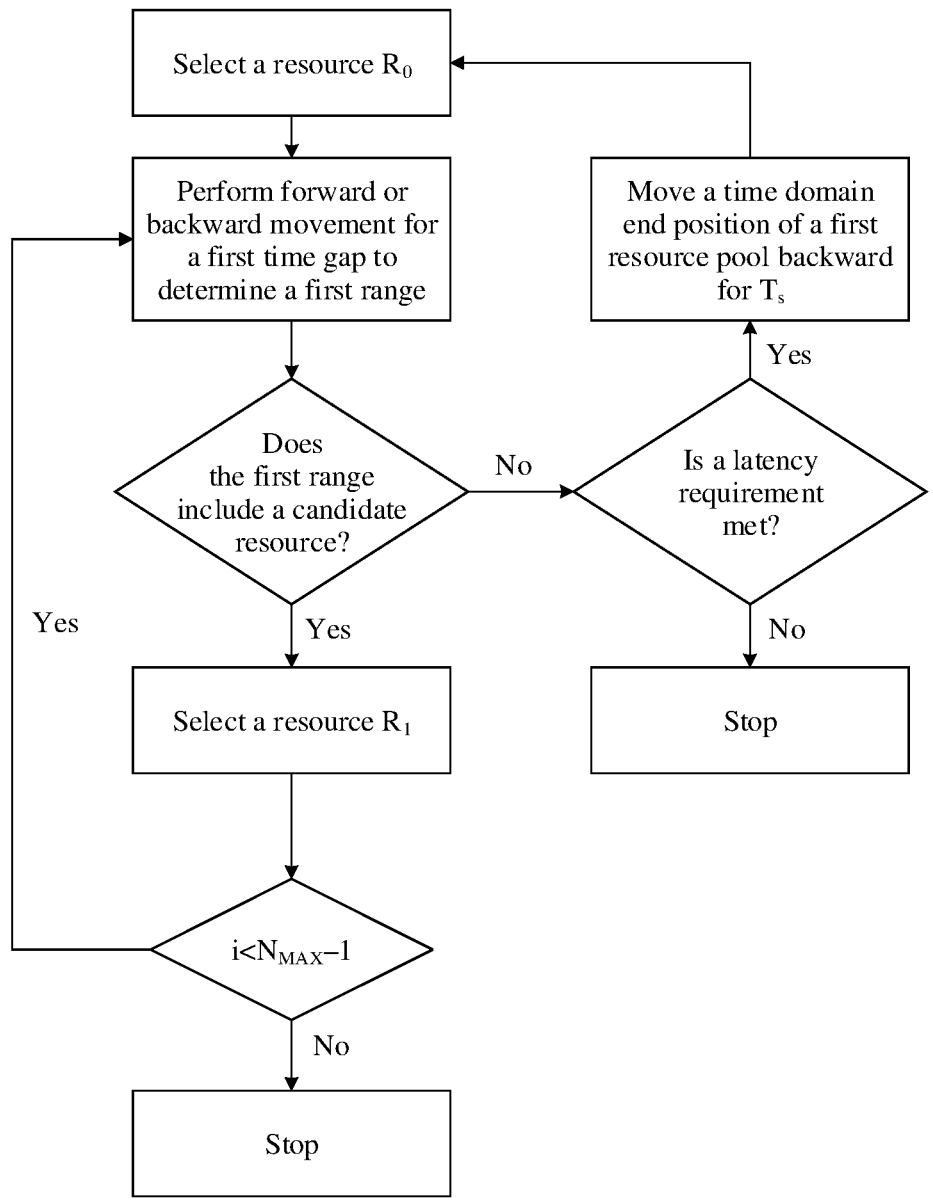
FIG. 18 is a flowchart of a resource selection method used by a first terminal apparatus if a first frequency gap is 0 according to an embodiment of this application.

It is assumed that the first frequency gap is 0. For a procedure for a resource selection method used by the first terminal apparatus under the selection condition of the first time gap, refer to FIG. 18.

The first terminal apparatus selects an initial resource $R_i$ for the first data from the candidate resource included in the resource pool. For example, a slot corresponding to the initial resource $R_i$ is $T_i$.

For example, the first terminal apparatus may randomly select the initial resource $R_i$, where i is, for example, 0. The initial resource $R_i$ is the first resource.

The first terminal apparatus moves $T_i$ forward or backward for the first time gap (for example, $T_{gap}$) based on $T_{gap}$ to obtain $T_{i+1}$, where $T_{i+1}$ is a time domain position obtained through movement, for example, a slot obtained through movement.

The first terminal apparatus may determine a first range. In this case, the first range does not include a candidate resource between $T_i$ and $T_{i+1}$.

If the first range includes no candidate resource, and the latency requirement is still met after the time domain end position of the first resource pool is moved backward for $T_s$, the first resource pool may be replaced with the second resource pool [n+Q1, n+Q2+$T_s$]. Then, the first step is repeatedly performed (that is, the first terminal apparatus selects an initial resource for the first data from the candidate resource included in the resource pool).

Alternatively, if the first range includes a candidate resource, the first terminal apparatus may select a next resource $R_{i+1}$ from the first range, where a slot corresponding to the resource $R_{i+1}$ is $T_{i+1}$.

If $i+1<N_{MAX}-1$, $i=i+1$, and the second step is repeated performed (that is, the first terminal apparatus moves $T_i$ forward or backward for $T_{gap}$ based on the first time gap to obtain $T_{i+1}$). If $i+1 \geq N_{MAX}-1$, it indicates that a quantity of selected resources is greater than or equal to the target quantity of resources, new resource selection may be stopped, and final resources are determined from selected candidate resources.

In a second case, the first gap includes only the first frequency gap and does not include the first time gap; or the first gap includes the first time gap and the first frequency gap, but the first time gap is 0. This case may mean that a time gap between two adjacent resources in the resources that need to be selected is 0. In this case, the first terminal apparatus may move a frequency domain position of the second resource as a reference frequency domain position upward and/or downward in frequency domain for the first frequency gap. The first terminal apparatus may select a resource from a second range corresponding to a frequency domain position obtained through movement, where the selected resource is a part or all of the at least one resource. The second range does not include a frequency domain position between the reference frequency domain position and the frequency domain position obtained through movement. Upward movement in frequency domain is understood as, for example, movement toward a high frequency direction, and downward movement in frequency domain is understood as, for example, movement toward a low frequency direction. For specific description of this case, refer to related description of S72 in the embodiment shown in FIG. 7.

In a third case, the first gap includes both the first frequency gap and the first time gap, and neither the first time gap nor the first frequency gap is 0. In this case, the first terminal apparatus needs to consider both a time domain condition and a frequency domain condition during resource selection. For example, the first terminal apparatus may move a time domain position of the second resource as a reference time domain position forward and/or backward in time domain for the first time gap, move a frequency domain position of the second resource as a reference frequency domain position upward and/or downward in frequency domain for the first frequency gap, and select a resource from a third range corresponding to a time domain position and a frequency domain position that are obtained through movement, where the selected resource is a part or all of the at least one resource. The third range includes neither a time domain position between the reference time domain position and the time domain position obtained through movement nor a frequency domain position between the reference frequency domain position and the frequency domain position obtained through movement.

Forward and/or backward movement for the first time gap includes, for example, forward movement for the first time gap, backward movement for the first time gap, or forward and backward movement for the first time gap. Similarly, upward and/or downward movement for the first frequency gap includes, for example, upward movement for the first frequency gap, downward movement for the first frequency gap, or upward and downward movement for the first frequency gap.

For specific description of this case, refer to related description of S72 in the embodiment shown in FIG. 7.

The following uses the foregoing first case (that is, the first gap includes only the first time gap and does not include the first frequency gap; or the first gap includes the first time gap and the first frequency gap, but the first frequency gap is 0) and $N_{MAX}=4$ as an example. $N_{MAX}$ indicates the target quantity of resources.

Figure 19:
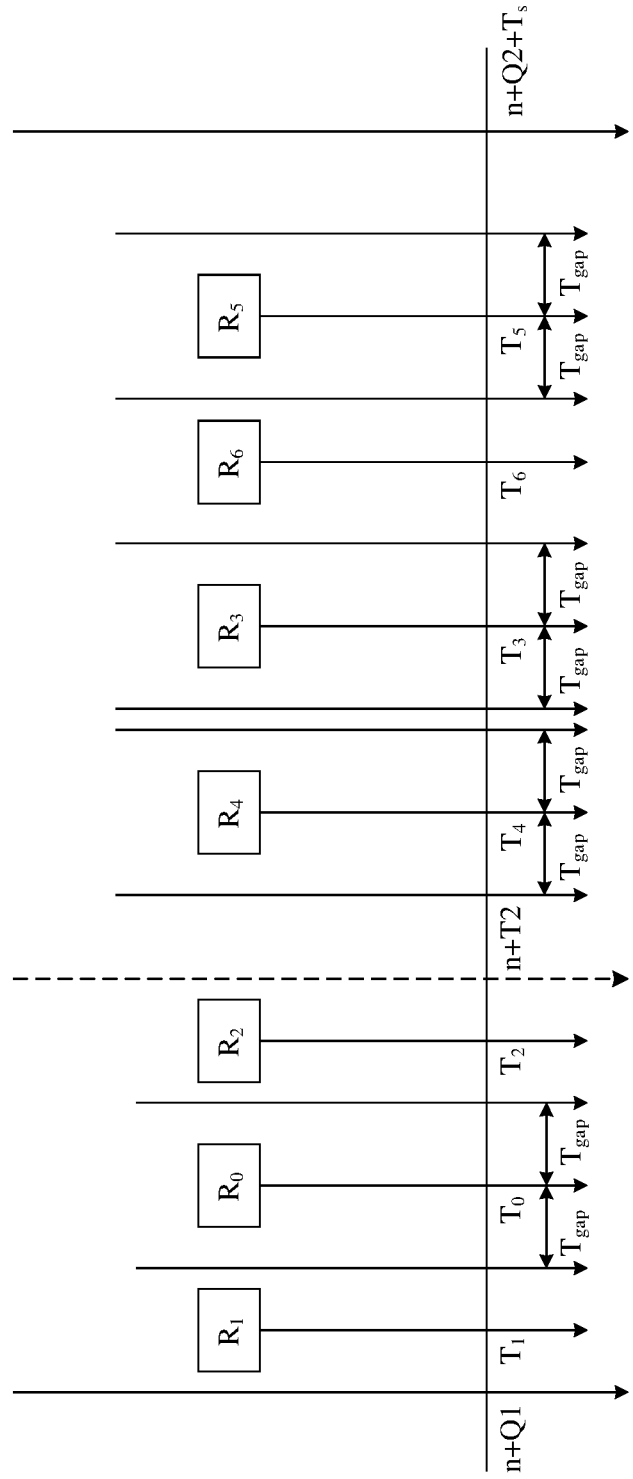
FIG. 19 is a schematic diagram of resource selection performed by a first terminal apparatus when a target quantity of resources is 4 according to an embodiment of this application.

Refer to FIG. 19. The first resource pool is [n+Q1, n+Q2], the first terminal apparatus selects an initial resource $R_0$, namely, the first resource, from the first resource pool, and a slot corresponding to the initial resource $R_0$ is $T_0$. Based on the first time gap $T_{gap}$, the first terminal apparatus moves the slot $T_0$ forward for $T_{gap}$ to obtain a slot $T_{1\_l}$, and moves $T_0$ backward for $T_{gap}$ to obtain a slot $T_{1\_r}$. Both the slot $T_{1\_l}$ and the slot $T_{1\_r}$ are time domain positions obtained through movement. The first terminal apparatus may determine a first range. In this case, the first range includes neither a candidate resource between the slot $T_0$ and the slot $T_{1\_r}$ nor a candidate resource between the slot $T_0$ and the slot $T_{1\_l}$. If the first range in this case includes a candidate resource, the first terminal apparatus may select a resource $R_1$ and a resource $R_2$ from the first range, where a slot corresponding to the resource $R_1$ is $T_1$, and a slot corresponding to the resource $R_2$ is $T_2$.

Based on the first time gap $T_{gap}$, the first terminal apparatus moves the slot $T_1$ forward for $T_{gap}$ to obtain a slot $T_{2\_l}$, and moves $T_2$ backward for $T_{gap}$ to obtain a slot $T_{2\_r}$. Both the slot $T_{2\_l}$ and the slot $T_{2\_r}$ are time domain positions obtained through movement. The first terminal apparatus may determine a first range. In this case, the first range includes neither a candidate resource between the slot $T_2$ and the slot $T_{2\_r}$ nor a candidate resource between the slot $T_1$ and the slot $T_{2\_l}$.

For example, if the first range in this case includes no candidate resource, and the latency requirement is still met after the time domain end position of the first resource pool is moved backward for $T_s$, the first resource pool may be replaced with the second resource pool [n+Q1, n+Q2+$T_s$]. The first terminal apparatus reselects an initial resource $R_3$, namely, the first resource, from the second resource pool, where a slot corresponding to the initial resource $R_3$ is $T_3$.

Based on the first time gap $T_{gap}$, the first terminal apparatus moves the slot $T_3$ forward for $T_{gap}$ to obtain a slot $T_{4\_l}$, and moves $T_3$ backward for $T_{gap}$ to obtain a slot $T_{4\_r}$. Both the slot $T_{4\_l}$ and the slot $R_{4\_r}$ are time domain positions obtained through movement. The first terminal apparatus may determine a first range. In this case, the first range includes neither a candidate resource between the slot $T_3$ and the slot $T_{4\_r}$ nor a candidate resource between the slot $T_3$ and the slot $T_{4\_l}$. If the first range in this case includes a candidate resource, the first terminal apparatus may select a next resource $R_4$ from the first range, where a slot corresponding to the resource $R_4$ is $T_4$.

Based on the first time gap $T_{gap}$, the first terminal apparatus moves the slot $T_4$ forward for $T_{gap}$ to obtain a slot $T_{5\_l}$, and moves $T_4$ backward for $T_{gap}$ to obtain a slot $T_{5\_r}$. Both the slot $T_{5\_l}$ and the slot $T_{5\_r}$ are time domain positions obtained through movement. The first terminal apparatus may determine a first range. In this case, the first range includes neither a candidate resource between the slot $T_4$ and the slot $T_{5\_r}$ nor a candidate resource between the slot $T_4$ and the slot $T_{5\_l}$. If the first range in this case includes a candidate resource, the first terminal apparatus may select a next resource $R_5$ from the first range, where a slot corresponding to the resource $R_5$ is $T_5$.

Based on the first time gap $T_{gap}$, the first terminal apparatus moves the slot $T_5$ forward for $T_{gap}$ to obtain a slot $T_{6\_l}$, and moves $T_5$ backward for $T_{gap}$ to obtain a slot $T_{6\_r}$. Both the slot $T_{6\_l}$ and the slot $T_{6\_r}$ are time domain positions obtained through movement. The first terminal apparatus may determine a first range. In this case, the first range includes neither a candidate resource between the slot $T_5$ and the slot $T_{6\_r}$ nor a candidate resource between the slot $T_5$ and the slot $T_{6\_l}$. If the first range in this case includes a candidate resource, the first terminal apparatus may select a next resource $R_6$ from the first range, where a slot corresponding to the resource $R_6$ is $T_6$.

In this case, the first terminal apparatus has selected four resources, and may use the four resources $R_3$, $R_4$, $R_5$, and $R_6$ as finally selected resources. Alternatively, the first terminal apparatus may continue to perform selection, so that a quantity of selected resources is greater than the target quantity of resources, and then the first terminal apparatus determines $N_{MAX}$ resources from selected resources.

The foregoing examples of the first selection manner and the second selection manner are merely for ease of understanding the technical solution in this embodiment of this application, but are not intended to limit the solution provided in this embodiment of this application. For example, a value of $N_{MAX}$ may be larger or smaller, only forward movement instead of backward movement may be performed during time domain movement, and both the time domain start position and the time domain end position of the first resource pool may be moved when the first resource pool is replaced. This is not limited in this embodiment of this application.

S145: The first terminal apparatus sends the first data to the second terminal apparatus on the selected resources, and the second terminal apparatus receives the first data from the first terminal apparatus on the selected resources.

After selecting the resources, the first terminal apparatus may send the first data to the second terminal apparatus on the selected resources. A quantity of resources used by the first terminal apparatus to send the first data may be equal to or less than the target quantity of resources. S145 is an optional step.

In the resource selection process provided in this embodiment of this application, if the quantity of selected resources is less than the target quantity of resources, and no candidate resource that meets the selection condition is available, reselection may be performed. For example, a new candidate resource may be introduced by moving the resource pool, so that sufficient resources can be selected as much as possible, to improve the resource selection success rate.

An overall resource allocation procedure and design in a mode-2 in NR-V2X are further improved in this embodiment of this application.

The following describes, with reference to the accompanying drawings, apparatuses configured to implement the foregoing methods in embodiments of this application. Therefore, all the foregoing content may be used in the following embodiments. Repeated content is not described again.

Figure 20:
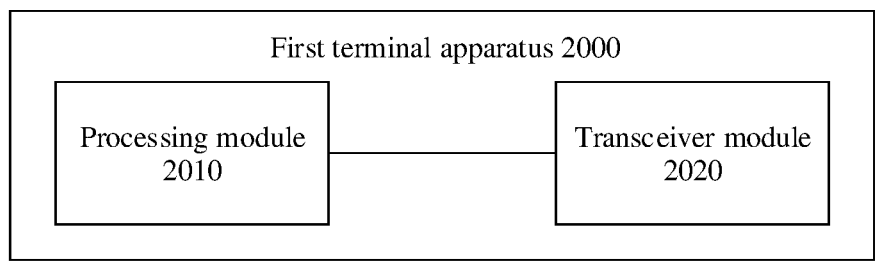
FIG. 20 is a schematic block diagram of a first type of first terminal apparatus according to an embodiment of this application.

FIG. 20 is a schematic block diagram of a communication apparatus 2000 according to an embodiment of this application. For example, the communication apparatus 2000 is a first terminal apparatus 2000.

The first terminal apparatus 2000 includes a processing module 2010 and a transceiver module 2020. For example, the first terminal apparatus 2000 may be a terminal device, or may be a chip used in the terminal device, or another combined device, another component, or the like that has functions of the terminal device. When the first terminal apparatus 2000 is the terminal device, the transceiver module 2020 may be a transceiver, where the transceiver may include an antenna, a radio frequency circuit, and the like; the processing module 2010 may be a processor, for example, a baseband processor, where the baseband processor may include one or more CPUs. When the first terminal apparatus 2000 is the component having the functions of the terminal device, the transceiver module 2020 may be a radio frequency unit, and the processing module 2010 may be a processor, for example, a baseband processor. When the first terminal apparatus 2000 is a chip system, the transceiver module 2020 may be an input/output interface of a chip (for example, a baseband chip), and the processing module 2010 may be a processor of the chip system, and may include one or more central processing units. It should be understood that the processing module 2010 in this embodiment of this application may be implemented by a processor or a processor-related circuit component, and the transceiver module 2020 may be implemented by a transceiver or a transceiver-related circuit component. Optionally, the first terminal apparatus 2000 may further include a storage module, and the storage module may be, for example, a memory. Alternatively, the first terminal apparatus 2000 may not include a storage module, and the storage module is located outside the first terminal apparatus 2000. Regardless of whether the storage module is located in the first terminal apparatus 2000 or outside the first terminal apparatus 2000, the storage module may be configured to store computer instructions. The processing module 2010 invokes the computer instructions stored in the storage module to perform operations performed by the first terminal apparatus in the embodiment shown in FIG. 7.

The processing module 2010 may be configured to perform all operations, except sending and receiving operations, that are performed by the first terminal apparatus in the embodiment shown in FIG. 7, for example, S71 and S72, and/or configured to support another process of the technology described in this specification. The transceiver module 2020 may be configured to perform all the receiving operations performed by the first terminal apparatus in the embodiment shown in FIG. 7, for example, S73, and/or configured to support another process of the technology described in this specification.

In addition, the transceiver module 2020 may be one functional module, and the functional module can complete both the sending operation and the receiving operation. For example, the transceiver module 2020 may be configured to perform all the sending and receiving operations performed by the first terminal apparatus in the embodiment shown in FIG. 7. For example, when performing the sending operation, the transceiver module 2020 may be considered as a sending module; when performing the receiving operation, the transceiver module 2020 may be considered as a receiving module. Alternatively, the transceiver module 2020 may be two functional modules, the transceiver module may be considered as a general term of the two functional modules, and the two functional modules are respectively a sending module (for example, corresponding to a transmitter, a radio frequency unit, or an output interface) and a receiving module (for example, corresponding to a receiver, a radio frequency unit, or an input interface). The sending module is configured to complete the sending operation, for example, may be configured to perform all the sending operations performed by the first terminal apparatus in the embodiment shown in FIG. 7. The receiving module is configured to complete the receiving operation, for example, may be configured to perform all the receiving operations performed by the first terminal apparatus in the embodiment shown in FIG. 7.

The processing module 2010 is configured to select a first resource for first data from candidate resources included in a resource pool, where the candidate resources include resources whose reference signal received power is less than or equal to a first threshold.

The processing module 2010 is further configured to select at least one resource for the first data from a candidate resource other than the first resource in the candidate resources based on the first resource and a first gap, where the first gap includes a first time gap satisfied by two adjacent resources in the selected first resource and the selected at least one resource, and/or includes a first frequency gap satisfied by two adjacent resources in the selected first resource and the selected at least one resource.

A quantity of candidate resources is greater than or equal to X % of a quantity of all resources included in the resource pool, and a value of X meets the following condition:
- the value of X is set based on a target quantity of resources;
- the value of X is set based on a target quantity of resources and the first time gap;
- the value of X is set based on a target quantity of resources, the first time gap, and the first frequency gap; or
- the value of X is set based on a service priority.

A total quantity of the first resource and the at least one resource is less than or equal to the target quantity of resources.

In an optional implementation, the transceiver module 2020 is configured to send the first data to a second terminal apparatus on selected resources. The selected resources include, for example, the first resource and the at least one resource.

In an optional implementation, the target quantity of resources is related to QoS of the first data and/or configuration information of the resource pool.

In an optional implementation, that the value of X is set based on a quantity of resources that need to be selected includes: a larger target quantity of resources indicates a larger value of X.

In an optional implementation, that the value of X is set based on a target quantity of resources and the first time gap includes: when the target quantity of resources is fixed, a smaller first time gap indicates a larger value of X.

In an optional implementation, that the value of X is set based on a target quantity of resources, the first time gap, and the first frequency gap includes: when the target quantity of resources and the first time gap are fixed, a smaller first frequency gap indicates a larger value of X.

In an optional implementation, that the value of X is set based on a service priority includes: a higher service priority indicates a larger value of X.

In an optional implementation, the processing module 2010 is further configured to:
- determine that there is no available candidate resource other than the first resource and a third resource in the candidate resources, and that a total quantity of the first resource and the third resource is less than the target quantity of resources, where the third resource includes a selected resource other than the first resource in the candidate resources;
- select a second resource from the candidate resources; and
- select one or more resources for the first data from a candidate resource other than the second resource in the candidate resources based on the second resource and the first gap.

In an optional implementation, the transceiver module 2020 is further configured to send the first data to the second terminal apparatus on selected resources. The selected resources include, for example, the second resource and the one or more resources.

In an optional implementation, the processing module 2010 is configured to select the at least one resource from the candidate resource other than the first resource in the candidate resources in the following manner based on the first resource and the first gap:
- moving a time domain position of the first resource as a reference time domain position forward and/or backward in time domain for the first time gap, and using a candidate resource corresponding to a time domain position obtained through movement as a part or all of the at least one resource, where the first gap includes the first time gap;
- moving a frequency domain position of the first resource as a reference frequency domain position upward and/or downward in frequency domain for the first frequency gap, and using a candidate resource corresponding to a frequency domain position obtained through movement as a part or all of the at least one resource, where the first gap includes the first frequency gap; or
- moving a time domain position of the first resource as a reference time domain position forward and/or backward in time domain for the first time gap, moving a frequency domain position of the first resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

In an optional implementation, the processing module 2010 is configured to select the at least one resource from the candidate resource other than the first resource in the candidate resources in the following manner based on the first resource and the first gap:
- moving a time domain position of the first resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;
- moving a frequency domain position of the first resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or
- moving a time domain position of the first resource as a reference time domain position forward and/or backward in time domain for the first time gap, moving a frequency domain position of the first resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

Figure 21:
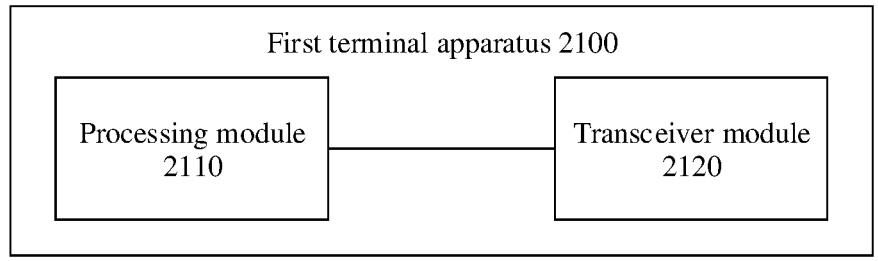
FIG. 21 is a schematic block diagram of a second type of first terminal apparatus according to an embodiment of this application.

FIG. 21 is a schematic block diagram of a communication apparatus 2100 according to an embodiment of this application. For example, the communication apparatus 2100 is a first terminal apparatus 2100.

The first terminal apparatus 2100 includes a processing module 2110 and a transceiver module 2120. For example, the first terminal apparatus 2100 may be a terminal device, or may be a chip used in the terminal device, or another combined device, another component, or the like that has functions of the terminal device. When the first terminal apparatus 2100 is the terminal device, the transceiver module 2120 may be a transceiver, where the transceiver may include an antenna, a radio frequency circuit, and the like; the processing module 2110 may be a processor, for example, a baseband processor, where the baseband processor may include one or more CPUs. When the first terminal apparatus 2100 is the component having the functions of the terminal device, the transceiver module 2120 may be a radio frequency unit, and the processing module 2110 may be a processor, for example, a baseband processor. When the first terminal apparatus 2100 is a chip system, the transceiver module 2120 may be an input/output interface of a chip (for example, a baseband chip), and the processing module 2110 may be a processor of the chip system, and may include one or more central processing units. It should be understood that the processing module 2010 in this embodiment of this application may be implemented by a processor or a processor-related circuit component, and the transceiver module 2120 may be implemented by a transceiver or a transceiver-related circuit component. Optionally, the first terminal apparatus 2100 may further include a storage module, and the storage module may be, for example, a memory. Alternatively, the first terminal apparatus 2100 may not include a storage module, and the storage module is located outside the first terminal apparatus 2100. Regardless of whether the storage module is located in the first terminal apparatus 2100 or outside the first terminal apparatus 2100, the storage module may be configured to store computer instructions. The processing module 2110 invokes the computer instructions stored in the storage module to perform operations performed by the first terminal apparatus in the embodiment shown in FIG. 14.

The processing module 2110 may be configured to perform all operations, except sending and receiving operations, that are performed by the first terminal apparatus in the embodiment shown in FIG. 14, for example, S141, S142, S143, and S144, and/or configured to support another process of the technology described in this specification. The transceiver module 2120 may be configured to perform all the receiving operations performed by the first terminal apparatus in the embodiment shown in FIG. 14, for example, S145, and/or configured to support another process of the technology described in this specification.

In addition, the transceiver module 2120 may be one functional module, and the functional module can complete both the sending operation and the receiving operation. For example, the transceiver module 2120 may be configured to perform all the sending and receiving operations performed by the first terminal apparatus in the embodiment shown in FIG. 14. For example, when performing the sending operation, the transceiver module 2120 may be considered as a sending module; when performing the receiving operation, the transceiver module 2120 may be considered as a receiving module. Alternatively, the transceiver module 2120 may be two functional modules, the transceiver module may be considered as a general term of the two functional modules, and the two functional modules are respectively a sending module (for example, corresponding to a transmitter, a radio frequency unit, or an output interface) and a receiving module (for example, corresponding to a receiver, a radio frequency unit, or an input interface). The sending module is configured to complete the sending operation, for example, may be configured to perform all the sending operations performed by the first terminal apparatus in the embodiment shown in FIG. 14. The receiving module is configured to complete the receiving operation, for example, may be configured to perform all the receiving operations performed by the first terminal apparatus in the embodiment shown in FIG. 14.

The processing module 2110 is configured to select a first resource for first data from a first candidate resource included in a first resource pool, where the first candidate resource includes a resource whose reference signal received power is less than or equal to a first threshold.

The processing module 2110 is further configured to determine, based on the first resource and a first gap, that there is no available candidate resource in a candidate resource other than the first resource and a third resource in the first candidate resource, and that a total quantity of the first resource and the third resource is less than a target quantity of resources, where the third resource includes a selected resource other than the first resource in the candidate resource, and the first gap includes a first time gap satisfied by two adjacent resources in the selected first resource and the selected third resource, and/or includes a first frequency gap satisfied by two adjacent resources in the selected first resource and the selected third resource.

The processing module 2110 is further configured to replace the first resource pool with a second resource pool.

The processing module 2110 is further configured to select, based on a second resource in the second resource pool and the first gap, at least one resource from a candidate resource other than the second resource in a second candidate resource included in the second resource pool, where the second candidate resource includes a resource whose reference signal received power is less than or equal to the first threshold.

In an optional implementation, the transceiver module 2120 is configured to send the first data to a second terminal apparatus on selected resources. The selected resources include, for example, the second resource and the at least one resource.

In an optional implementation, the target quantity of resources is related to QoS of the first data and/or configuration information of the first resource pool.

In an optional implementation, the second resource and the first resource are a same resource; or the processing module 2110 is further configured to select the second resource from the candidate resource included in the second resource pool.

In an optional implementation, the processing module 2110 is configured to replace the first resource pool with the second resource pool in the following manner:
  moving a time domain end position of the first resource pool backward in time domain for first duration, to obtain the second resource pool; or
  moving a time domain start position of the first resource pool backward in time domain for second duration, and moving a time domain end position of the first resource pool backward in time domain for third duration, to obtain the second resource pool.

In an optional implementation, the processing module 2110 is configured to select, in the following manner based on the second resource and the first gap, the at least one resource from the candidate resource other than the second resource in the second candidate resource included in the second resource pool:

moving a time domain position of the second resource as a reference time domain position forward and/or backward in time domain for the first time gap, and using a candidate resource corresponding to a time domain position obtained through movement as a part or all of the at least one resource, where the first gap includes the first time gap;

moving a frequency domain position of the second resource as a reference frequency domain position upward and/or downward in frequency domain for the first frequency gap, and using a candidate resource corresponding to a frequency domain position obtained through movement as a part or all of the at least one resource, where the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and using a candidate resource corresponding to both a time domain position and a frequency domain position that are obtained through movement as a part or all of the at least one resource, where the first gap includes the first time gap and the first frequency gap.

In an optional implementation, the processing module 2110 is configured to select, in the following manner based on the second resource and the first gap, the at least one resource from the candidate resource other than the second resource in the second candidate resource included in the second resource pool:

moving a time domain position of the second resource as a reference time domain position forward and/or backward in time domain for the first time gap, and selecting a resource from a first range corresponding to a time domain position obtained through movement, where the selected resource is a part or all of the at least one resource, the first range does not include a time domain position between the reference time domain position and the time domain position obtained through movement, and the first gap includes the first time gap;

moving a frequency domain position of the second resource as a reference frequency domain position upward and/or downward in frequency domain for the first frequency gap, and selecting a resource from a second range corresponding to a frequency domain position obtained through movement, where the selected resource is a part or all of the at least one resource, the second range does not include a frequency domain position between the reference frequency domain position and the frequency domain position obtained through movement, and the first gap includes the first frequency gap; or moving a time domain position of the second resource as a reference time domain position forward and/or backward in time domain for the first time gap, moving a frequency domain position of the second resource as a reference frequency domain position upward and/or downward in frequency domain for the first frequency gap, and selecting a resource from a third range corresponding to both a time domain position and a frequency domain position that are obtained through movement, where the selected resource is a part or all of the at least one resource, the third range does not include a time domain position between the reference time domain position and the time domain position obtained through movement or a frequency domain position between the reference frequency domain position and the frequency domain position obtained through movement, and the first gap includes the first time gap and the first frequency gap.

An embodiment of this application further provides a communication apparatus, and the communication apparatus may be a terminal device or a circuit. The communication apparatus may be configured to perform actions performed by the first terminal apparatus in the foregoing method embodiments.

Figure 22:
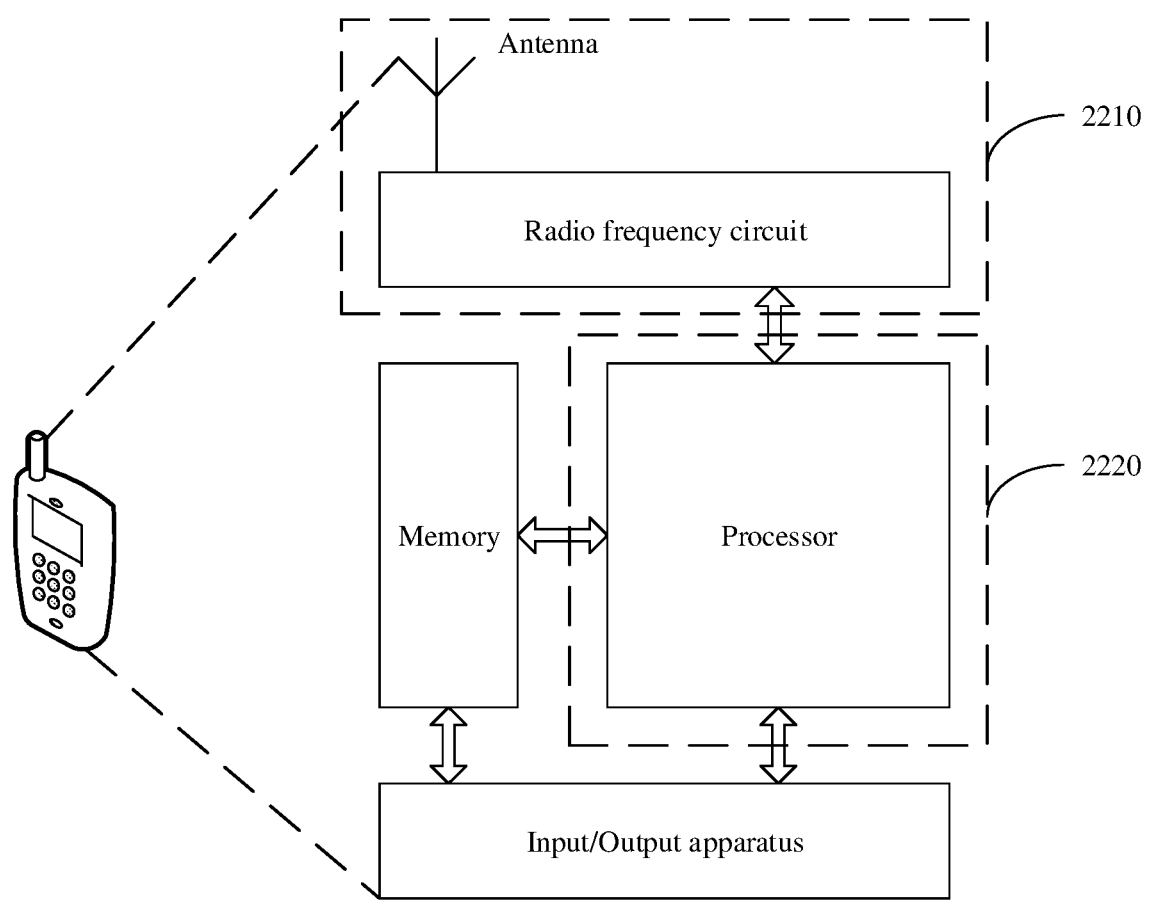
FIG. 22 is a schematic block diagram of a communication apparatus according to an embodiment of this application.

When the communication apparatus is a terminal device, FIG. 22 is a simplified schematic diagram of a structure of the terminal device. For ease of understanding and illustration, in FIG. 22, an example in which the terminal device is a mobile phone is used. As shown in FIG. 22, the terminal device includes a processor, a memory, a radio frequency circuit, an antenna, and an input/output apparatus. The processor is mainly configured to process a communication protocol and communication data, control the terminal device, execute a software program, process data of the software program, and so on. The memory is mainly configured to store the software program and data. The radio frequency circuit is mainly configured to perform conversion between a baseband signal and a radio frequency signal, and process the radio frequency signal. The antenna is mainly configured to send and receive the radio frequency signal in an electromagnetic wave form. The input/output apparatus, such as a touchscreen, a display, or a keyboard, is mainly configured to receive data entered by a user, and output data to the user. It should be noted that some types of terminal devices may not have an input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 22 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device (the transceiver unit may be one functional unit, and the functional unit can implement a sending function and a receiving function; or the transceiver unit may include two functional units: a receiving unit that can implement a receiving function and a sending unit that can implement a sending function), and the processor having a processing function may be considered as a processing unit of the terminal device. As shown in FIG. 22, the terminal device includes a transceiver unit 2210 and a processing unit 2220. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing the receiving function in the transceiver unit 2210 may be considered as the receiving unit, and a component for implementing the sending function in the transceiver unit 2210 may be considered as the sending unit. In other words, the transceiver unit 2210 includes the receiving unit and/or the sending unit. The transceiver unit may also be sometimes referred to as a transceiver, a transceiver machine, a transceiver circuit, or the like. The receiving unit may also be sometimes referred to as a receiver machine, a receiver, a receiving circuit, or the like. The sending unit may also be sometimes referred to as a transmitter machine, a transmitter, a transmitting circuit, or the like.

It should be understood that the transceiver unit 2210 is configured to perform a sending operation and a receiving operation on a first terminal apparatus side in the foregoing method embodiments, and the processing unit 2220 is configured to perform an operation other than the sending and receiving operations of the first terminal apparatus in the foregoing method embodiments.

For example, in an implementation, the transceiver unit 2210 is configured to perform all sending and receiving operations performed by the first terminal apparatus in the embodiment shown in FIG. 7, for example, S73, and/or the transceiver unit 2210 is further configured to perform another process supporting the technology described in this specification. The processing unit 2220 is configured to perform all operations, except the sending and receiving operations, that are performed by the first terminal apparatus in the embodiment shown in FIG. 7, for example, S71 and S72, and/or the processing unit 2220 is further configured to perform another process supporting the technology described in this specification.

For another example, in an implementation, the transceiver unit 2210 is configured to perform all sending and receiving operations performed by the first terminal apparatus in the embodiment shown in FIG. 14, for example, S145, and/or the transceiver unit 2210 is further configured to perform another process supporting the technology described in this specification. The processing unit 2220 is configured to perform all operations, except the sending and receiving operations, that are performed by the first terminal apparatus in the embodiment shown in FIG. 14, for example, S141 to S144, and/or the processing unit 2220 is further configured to perform another process supporting the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 23:
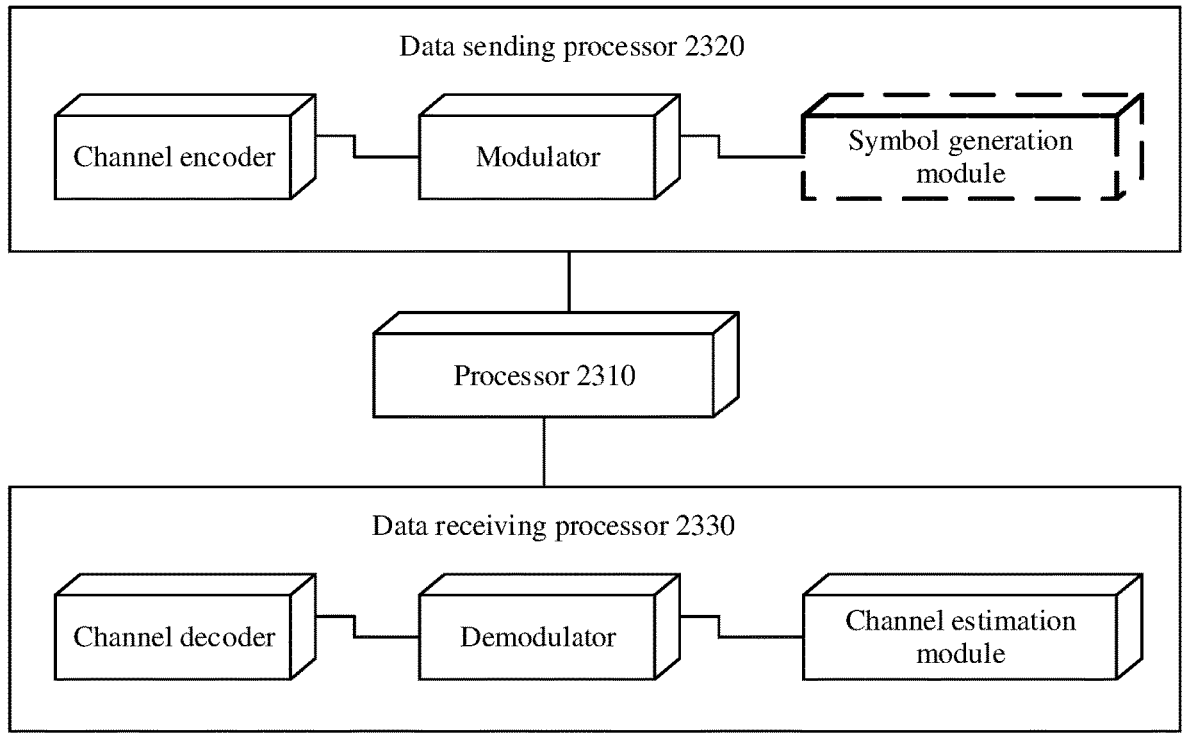
FIG. 23 is another schematic block diagram of a communication apparatus according to an embodiment of this application.

When the communication apparatus in this embodiment is the terminal device, refer to a device shown in FIG. 23. In an example, the device can implement a function similar to the function of the processing module 2010 in FIG. 20. In another example, the device can implement a function similar to the function of the processing module 2110 in FIG. 21. In FIG. 23, the device includes a processor 2310, a data sending processor 232*o*, and a data receiving processor 233*o*. The processing module 2010 in the foregoing embodiment may be the processor 2310 in FIG. 23, and completes a corresponding function. The transceiver module 2020 in the foregoing embodiment may be the data sending processor 2320 and/or the data receiving processor 2330 in FIG. 23, and completes a corresponding function. Alternatively, the processing module 2110 in the foregoing embodiment may be the processor 2310 in FIG. 23, and completes a corresponding function. The transceiver module 2120 in the foregoing embodiment may be the data sending processor 2320 and/or the data receiving processor 2330 in FIG. 23, and completes a corresponding function. Although FIG. 23 shows a channel encoder and a channel decoder, it may be understood that these modules are merely examples, and do not constitute a limitation on this embodiment.

Figure 24:
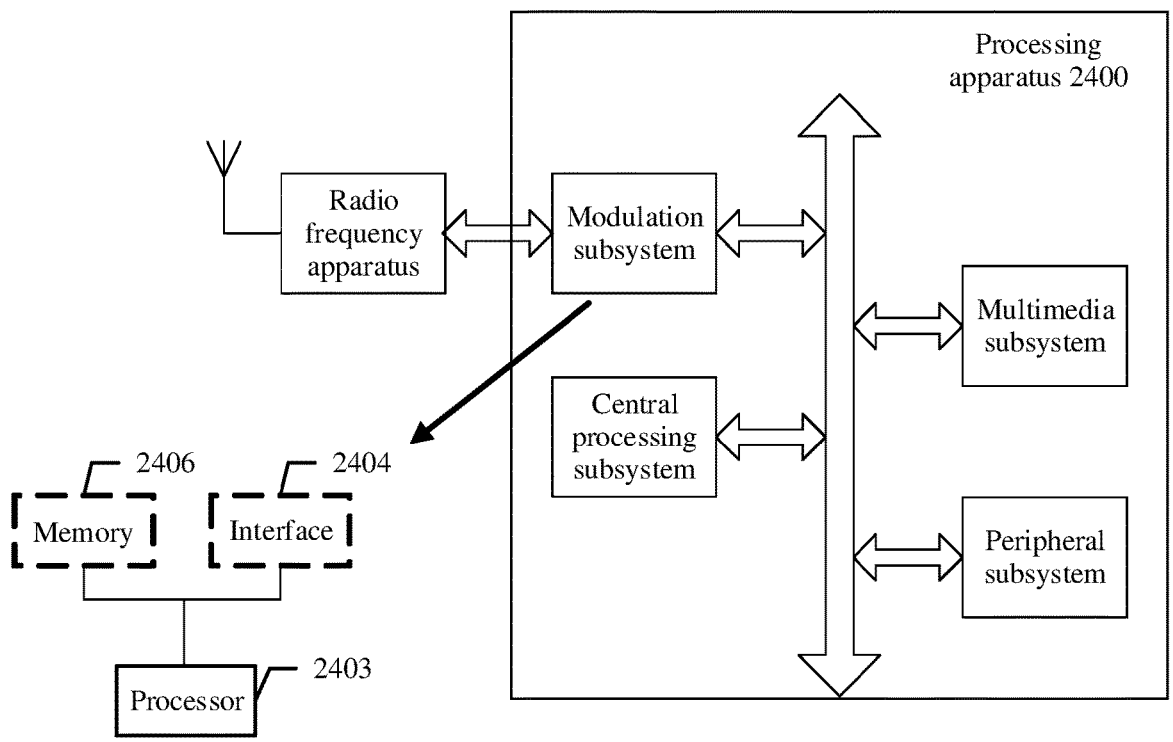
FIG. 24 is still another schematic block diagram of a communication apparatus according to an embodiment of this application.

FIG. 24 shows another form of this embodiment. A processing apparatus 2400 includes modules such as a modulation subsystem, a central processing subsystem, and a peripheral subsystem. The communication apparatus in this embodiment may be used as the modulation subsystem. Specifically, the modulation subsystem may include a processor 2403 and an interface 2404. The processor 2403 implements a function of the processing module 2010, and the interface 2404 implements a function of the transceiver module 2020. Alternatively, the processor 2403 implements a function of the processing module 2110, and the interface 2404 implements a function of the transceiver module 2120. In another variation, the modulation subsystem includes a memory 2406, a processor 2403, and a program that is stored in the memory 2406 and that can be run on the processor. When executing the program, the processor 2403 implements the method on a terminal device side in the foregoing method embodiments. It should be noted that the memory 2406 may be a nonvolatile memory, or may be a volatile memory. The memory 2406 may be located in the modulation subsystem, or may be located in the processing apparatus 2400, provided that the memory 2406 can be connected to the processor 2403.

An embodiment of this application provides a first communication system. The first communication system may include the first terminal apparatus in the embodiment shown in FIG. 7. The first terminal apparatus is, for example, the first terminal apparatus 2000 in FIG. 20.

An embodiment of this application provides a second communication system. The first communication system may include the first terminal apparatus in the embodiment shown in FIG. 14. The first terminal apparatus is, for example, the first terminal apparatus 2100 in FIG. 21.

The first communication system and the second communication system may be a same communication system, or may be different communication systems.

An embodiment of this application further provides a computer-readable storage medium. The computer-readable storage medium stores a computer program. When the computer program is executed by a computer, the computer may implement a procedure related to the first terminal apparatus in the embodiment shown in FIG. 7 in the foregoing method embodiments.

An embodiment of this application further provides a computer-readable storage medium. The computer-readable storage medium stores a computer program. When the computer program is executed by a computer, the computer may implement a procedure related to the first terminal apparatus in the embodiment shown in FIG. 14 in the foregoing method embodiments.

An embodiment of this application further provides a computer program product. The computer program product is configured to store a computer program. When the computer program is executed by a computer, the computer may implement a procedure related to the first terminal apparatus in the embodiment shown in FIG. 7 in the foregoing method embodiments.

An embodiment of this application further provides a computer program product. The computer program product is configured to store a computer program. When the computer program is executed by a computer, the computer may implement a procedure related to the first terminal apparatus in the embodiment shown in FIG. 14 in the foregoing method embodiments.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should also be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (the storage module) is integrated into the processor.

It should be noted that the memory described in this specification is intended to include, but is not limited to, these memories and any other appropriate types of memories.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electrical, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but is not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:
1. A method comprising:
   selecting, from candidate resources comprised in a resource pool, a first resource for transmission of first data, wherein the candidate resources comprise resources that have reference signal received power less than or equal to a first threshold;

selecting, based on the first resource and a first gap, at least one resource for the transmission of the first data from the candidate resources other than the first resource, wherein the first gap comprises a first time gap in a time domain or a first frequency gap in a frequency domain, and two respective resources in the first resource and the at least one resource satisfying the first gap;

determining that there is no available candidate resource in the candidate resources other than the first resource and a third resource, and that a total quantity of the first resource and the third resource is less than a target quantity of resources, wherein the third resource comprises a selected resource other than the first resource in the candidate resources;

selecting a second resource from the candidate resources; and selecting one or more resources for transmission of the first data from a candidate resource other than the second resource in the candidate resources based on the second resource and the first gap; and wherein:
a quantity of the candidate resources is greater than or equal to X % of a quantity of all resources comprised in the resource pool, and a value of X meets one or more of following conditions:
the value of X is set based on the target quantity of resources;
the value of X is set based on the target quantity of resources and the first time gap;
the value of X is set based on the target quantity of resources, the first time gap, and the first frequency gap; or
the value of X is set based on a service priority; and
a total quantity of the first resource and the at least one resource is less than or equal to the target quantity of resources.

2. The method according to claim 1, wherein the target quantity of resources is related to quality of service (QOS) of the first data, or configuration information of the resource pool.

3. The method according to claim 1, wherein a larger target quantity of resources corresponds to a larger value of X.

4. The method according to claim 1, wherein when the target quantity of resources is fixed, a smaller first time gap corresponds to a larger value of X.

5. The method according to claim 1, wherein when the target quantity of resources and the first time gap are fixed, a smaller first frequency gap corresponds to a larger value of X.

6. The method according to claim 1, wherein a higher service priority corresponds to a larger value of X.

7. The method according to claim 1, wherein selecting the at least one resource from the candidate resources other than the first resource based on the first resource and the first gap comprises:
when the first gap comprises the first time gap, selecting, from the candidate resources and based on a first time domain position of the first resource, a first candidate resource having a second time domain position, the first time domain position and the second time domain position satisfying the first time gap, and using the first candidate resource as a part or all of the at least one resource;
when the first gap comprises the first frequency gap, selecting, from the candidate resources and based on a first frequency domain position of the first resource, a second candidate resource having a second frequency domain position, the first frequency domain position and the second frequency domain position satisfying the first frequency gap, and using the second candidate resource as a part or all of the at least one resource; or
when the first gap comprises the first time gap and the first frequency gap, selecting, from the candidate resources and based on the first time domain position and the first frequency domain position of the first resource, a third candidate resource having a third time domain position and a third frequency domain position, the first time domain position and the third time domain position satisfying the first time gap, and the first frequency domain position and the third frequency domain position satisfying the first frequency gap, and using the third candidate resource as a part or all of the at least one resource.

8. The method according to claim 1, wherein selecting the at least one resource from the candidate resources other than the first resource based on the first resource and the first gap comprises:
when the first gap comprises the first time gap, selecting a first candidate resource from the candidate resources in a first range and based on a first time domain position of the first resource, wherein the first candidate resource is a part or all of the at least one resource, and the first range does not comprise a time domain position between the first time domain position and a second time domain position, a gap between the first time domain position and the second time domain position being the first time gap;
when the first gap comprises the first frequency gap, selecting a second candidate resource from the candidate resources in a second range and based on a first frequency domain position of the first resource, wherein the second candidate resource is a part or all of the at least one resource, and the second range does not comprise a frequency domain position between the first frequency domain position and a second frequency domain position, a gap between the first frequency domain position and the second frequency domain position being the first frequency gap; or
when the first gap comprises the first time gap and the first frequency gap, selecting a third candidate resource from the candidate resources in a third range and based on the first time domain position and the first frequency domain position of the first resource, wherein the third candidate resource is a part or all of the at least one resource, and the third range does not comprise a time domain position between the first time domain position and the second time domain position or does not comprise a frequency domain position between the first frequency domain position and the second frequency domain position.

9. A terminal apparatus, comprising:
a communication interface, configured to communicate with another apparatus; and
a processor, configured to:
select, from candidate resources comprised in a resource pool, a first resource for transmission of first data, wherein the candidate resources comprise resources that have reference signal received power less than or equal to a first threshold; and select, based on the first resource and a first gap, at least one resource for the transmission of the first data from the candidate resources other than the first resource, wherein the first gap comprises a first time gap in a time domain or a first frequency gap in a frequency domain, and two respective resources in the first resource and the at least one resource satisfying the first gap;

determine that there is no available candidate resource in the candidate resources other than the first resource and a third resource, and that a total quantity of the first resource and the third resource is less than a target quantity of resources, wherein the third resource comprises a selected resource other than the first resource in the candidate resources;

select a second resource from the candidate resources; and select one or more resources for transmission of the first data from a candidate resource other than the second resource in the candidate resources based on the second resource and the first gap; and wherein:

a quantity of the candidate resources is greater than or equal to X % of a quantity of all resources comprised in the resource pool, and a value of X meets one or more of following conditions:

the value of X is set based on the target quantity of resources;

the value of X is set based on the target quantity of resources and the first time gap;

the value of X is set based on the target quantity of resources, the first time gap, and the first frequency gap; or the value of X is set based on a service priority; and a total quantity of the first resource and the at least one resource is less than or equal to the target quantity of resources.

10. The terminal apparatus according to claim 9, wherein the target quantity of resources is related to quality of service (QOS) of the first data or configuration information of the resource pool.

11. The terminal apparatus according to claim 9, wherein a larger target quantity of resources corresponds to a larger value of X.

12. The terminal apparatus according to claim 9, wherein when the target quantity of resources is fixed, a smaller first time gap corresponds to a larger value of X.

13. The terminal apparatus according to claim 9, wherein when the target quantity of resources and the first time gap are fixed, a smaller first frequency gap corresponds to a larger value of X.

14. A non-transitory computer readable storage medium storing instructions that are executable by at least one processor, the instructions comprising instructions for:

selecting, from candidate resources comprised in a resource pool, a first resource for transmission of first data, wherein the candidate resources comprise resources that have reference signal received power less than or equal to a first threshold;

selecting, based on the first resource and a first gap, at least one resource for the transmission of the first data from the candidate resources other than the first resource, wherein the first gap comprises a first time gap in a time domain or a first frequency gap in a frequency domain, two respective resources in the first resource and the at least one resource satisfying the first gap;

determining that there is no available candidate resource in the candidate resources other than the first resource and a third resource, and that a total quantity of the first resource and the third resource is less than a target quantity of resources, wherein the third resource comprises a selected resource other than the first resource in the candidate resources;

selecting a second resource from the candidate resources; and selecting one or more resources for transmission of the first data from a candidate resource other than the second resource in the candidate resources based on the second resource and the first gap; and wherein:

a quantity of the candidate resources is greater than or equal to X % of a quantity of all resources comprised in the resource pool, and a value of X meets one or more of following conditions:

the value of X is set based on the target quantity of resources;

the value of X is set based on the target quantity of resources and the first time gap;

the value of X is set based on the target quantity of resources, the first time gap, and the first frequency gap; or the value of X is set based on a service priority; and a total quantity of the first resource and the at least one resource is less than or equal to the target quantity of resources.

15. The non-transitory computer readable storage medium according to claim 14, wherein the target quantity of resources is related to quality of service (QOS) of the first data, or configuration information of the resource pool.

16. The non-transitory computer readable storage medium according to claim 14, wherein a larger target quantity of resources corresponds to a larger value of X.

17. The non-transitory computer readable storage medium according to claim 14, wherein when the target quantity of resources is fixed, a smaller first time gap corresponds to a larger value of X.

18. The non-transitory computer readable storage medium according to claim 14, wherein when the target quantity of resources and the first time gap are fixed, a smaller first frequency gap corresponds to a larger value of X.

19. The non-transitory computer readable storage medium according to claim 14, wherein a higher service priority corresponds to a larger value of X.

20. The non-transitory computer readable storage medium according to claim 14, wherein selecting the at least one resource from the candidate resources other than the first resource based on the first resource and the first gap comprises:

when the first gap comprises the first time gap, selecting, from the candidate resources and based on a first time domain position of the first resource, a first candidate resource having a second time domain position, the first time domain position and the second time domain position satisfying the first time gap, and using the first candidate resource as a part or all of the at least one resource;

when the first gap comprises the first frequency gap, selecting, from the candidate resources and based on a first frequency domain position of the first resource, a second candidate resource having a second frequency domain position, the first frequency domain position and the second frequency domain position satisfying the first frequency gap, and using the second candidate resource as a part or all of the at least one resource; or when the first gap comprises the first time gap and the first frequency gap, selecting, from the candidate resources and based on the first time domain position and the first frequency domain position of the first resource, a third candidate resource having a third time domain position and a third frequency domain position, the first time domain position and the third time domain position satisfying the first time gap, and the first frequency domain position and the third frequency domain position satisfying the first frequency gap, and using the third candidate resource as a part or all of the at least one resource.

\* \* \* \* \*